(12) United States Patent
Ishiga

(10) Patent No.: US 7,565,007 B2
(45) Date of Patent: Jul. 21, 2009

(54) IMAGE PROCESSING METHOD, IMAGE PROCESSING PROGRAM, AND IMAGE PROCESSING APPARATUS

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 1332 days.

(21) Appl. No.: 10/470,102

(22) PCT Filed: Jan. 25, 2002

(86) PCT No.: PCT/JP02/00548

§ 371 (c)(1),
(2), (4) Date: Oct. 28, 2003

(87) PCT Pub. No.: WO02/060186

PCT Pub. Date: Aug. 1, 2002

(65) Prior Publication Data

US 2004/0080639 A1    Apr. 29, 2004

(30) Foreign Application Priority Data

Jan. 25, 2001  (JP) ............................. 2001-016729
Nov. 8, 2001   (JP) ............................. 2001-343392

(51) Int. Cl.
*G06K 9/00* (2006.01)
(52) U.S. Cl. ..................... 382/162; 382/165; 382/167
(58) Field of Classification Search ............... 382/162, 382/165, 167, 260, 262, 264, 274, 300
See application file for complete search history.

(56) References Cited

U.S. PATENT DOCUMENTS

| | | | |
|---|---|---|---|
| 5,506,619 A | 4/1996 | Adams, Jr. et al. | |
| 5,552,827 A | 9/1996 | Maenaka et al. | |
| 6,133,953 A * | 10/2000 | Okada | 348/272 |
| 6,295,087 B1 * | 9/2001 | Nohda | 348/234 |
| 6,628,327 B1 | 9/2003 | Aoki et al. | |
| 6,714,242 B1 * | 3/2004 | Kobayashi | 348/272 |
| 2001/0005429 A1 | 6/2001 | Ishiga et al. | |

FOREIGN PATENT DOCUMENTS

| | | |
|---|---|---|
| EP | 0 632 663 A2 | 1/1995 |
| EP | 0 800 317 A2 | 10/1997 |
| JP | A 11-177995 | 7/1999 |

(Continued)

*Primary Examiner*—Phuoc Tran
(74) *Attorney, Agent, or Firm*—Oliff & Berridge, PLC

(57) ABSTRACT

An image processing method for converting a first image that is expressed in a colorimetric system made up of a plurality of color components and comprises a plurality of pixels each having color information corresponding to one of the color components into a second image that comprises a plurality of pixels each having at least a common type of color information, includes: a color judgment step that includes a color difference information generation step in which color difference information is generated for a processing target pixel in the second image by using color information in the first image through one of at least three different methods and a color evaluation step in which a color evaluation is individually executed for each of processing target pixels in the second image by using the color difference information; and an image conversion step in which the first image is converted to the second image based upon results of the color evaluation executed in the color judgment step.

47 Claims, 30 Drawing Sheets

FOREIGN PATENT DOCUMENTS

| | | |
|---|---|---|
| JP | A 2000-197067 | 7/2000 |
| JP | A 2001-275126 | 10/2001 |
| JP | A 2001-285885 | 10/2001 |
| JP | A 2001-292452 | 10/2001 |
| JP | A 2001-339735 | 12/2001 |
| WO | WO99/63761 | 12/1999 |

* cited by examiner

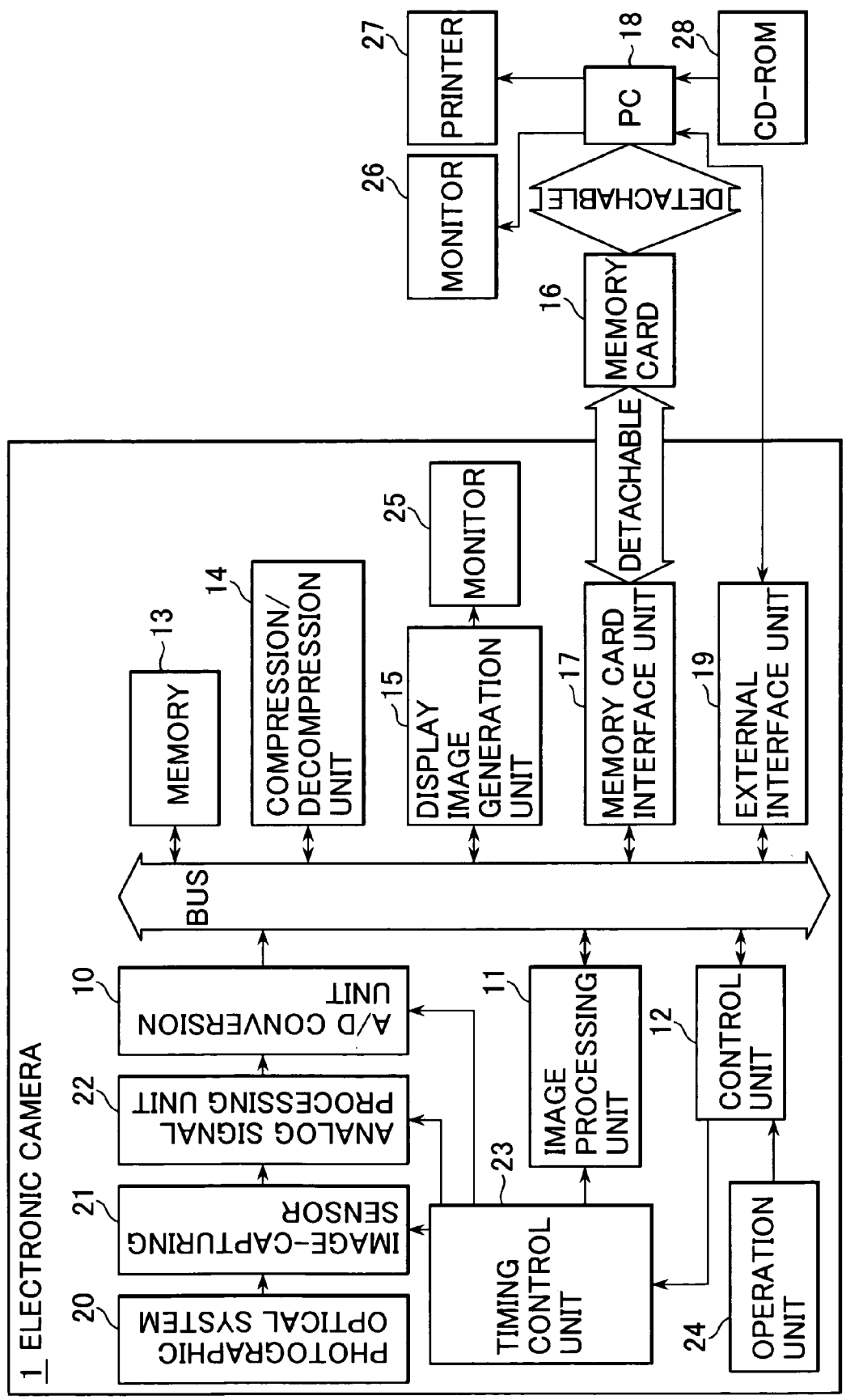

| COORDINATES [i,j] | i-3 | i-2 | i-1 | i | i+1 | i+2 | i+3 |
|---|---|---|---|---|---|---|---|
| j-3 | B | G | B | G | B | G | B |
| j-2 | G | R | G | R | G | R | G |
| j-1 | B | G | B | G | B | G | B |
| j | G | R | G | R | G | R | G |
| j+1 | B | G | B | G | B | G | B |
| j+2 | G | R | G | R | G | R | G |
| j+3 | B | G | B | G | B | G | B |

(b)

| COORDINATES [i,j] | i-3 | i-2 | i-1 | i | i+1 | i+2 | i+3 |
|---|---|---|---|---|---|---|---|
| j-3 | R | G | R | G | R | G | R |
| j-2 | G | B | G | B | G | B | G |
| j-1 | R | G | R | G | R | G | R |
| j | G | B | G | B | G | B | G |
| j+1 | R | G | R | G | R | G | R |
| j+2 | G | B | G | B | G | B | G |
| j+3 | R | G | R | G | R | G | R |

(c)

| COORDINATES [i,j] | i-3 | i-2 | i-1 | i | i+1 | i+2 | i+3 |
|---|---|---|---|---|---|---|---|
| j-3 | G | B | G | B | G | B | G |
| j-2 | R | G | R | G | R | G | R |
| j-1 | G | B | G | B | G | B | G |
| j | R | G | R | G | R | G | R |
| j+1 | G | B | G | B | G | B | G |
| j+2 | R | G | R | G | R | G | R |
| j+3 | G | B | G | B | G | B | G |

(d)

| COORDINATES [i,j] | i-3 | i-2 | i-1 | i | i+1 | i+2 | i+3 |
|---|---|---|---|---|---|---|---|
| j-3 | G | R | G | R | G | R | G |
| j-2 | B | G | B | G | B | G | B |
| j-1 | G | R | G | R | G | R | G |
| j | B | G | B | G | B | G | B |
| j+1 | G | R | G | R | G | R | G |
| j+2 | B | G | B | G | B | G | B |
| j+3 | G | R | G | R | G | R | G |

FIG.8

FIG.9
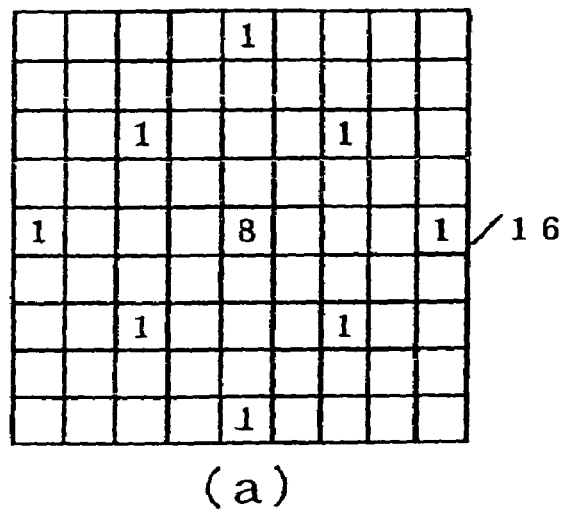
(a)
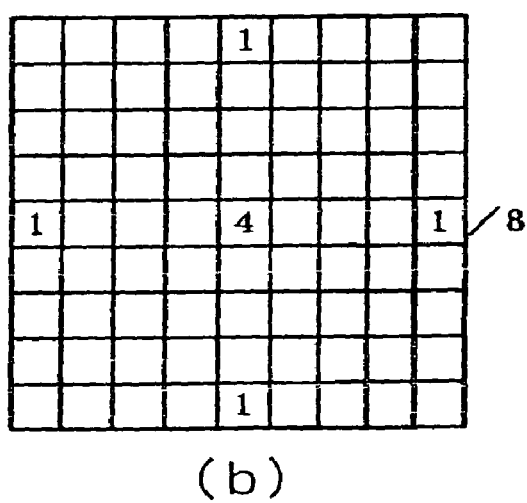
(b)
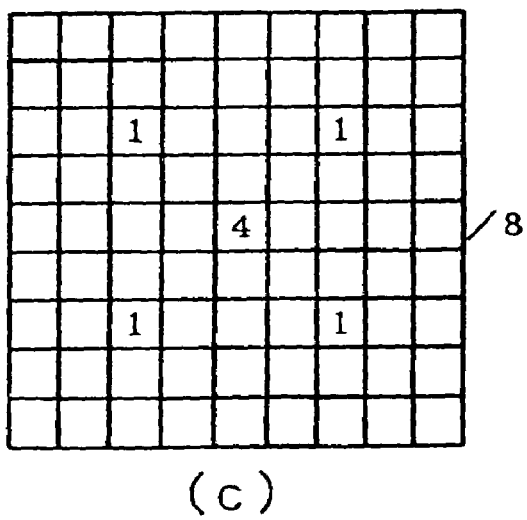
(c)

FIG.11
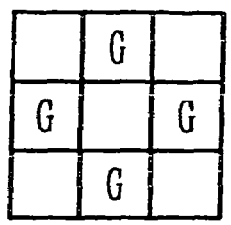
(a)
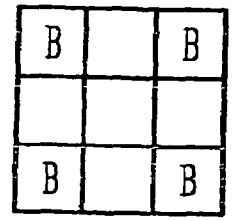
(b)
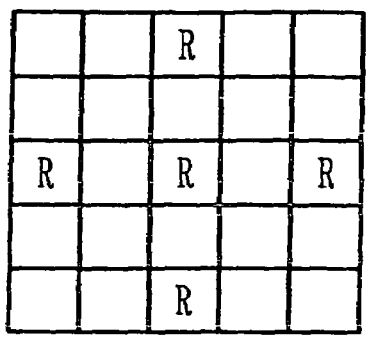
(c)
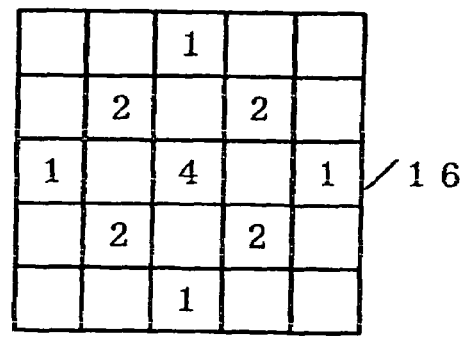
(d)
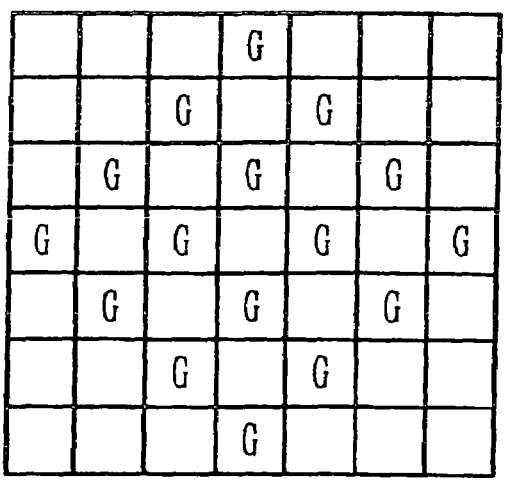
(e)
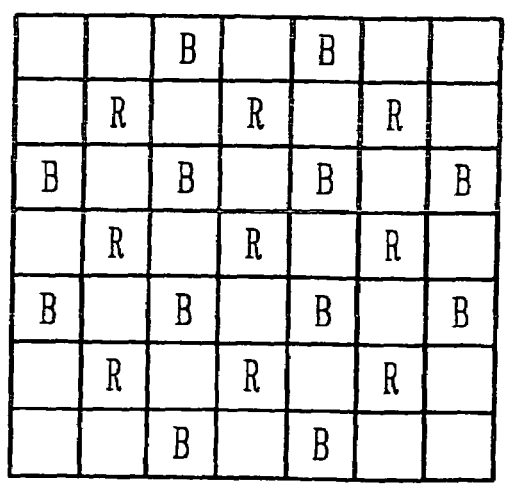
(f)

FIG.13

SPECIFIC DIRECTIONS ALONG WHICH MARKED SIMILARITY MANIFESTS, CORRESPONDING TO VARIOUS COMBINATIONS OF VALUES OF [HV, DN]

FIG.17
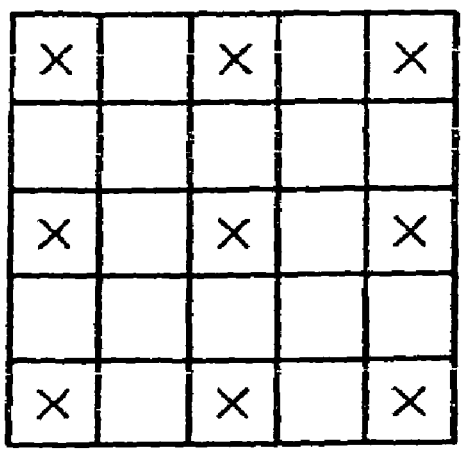
(a)
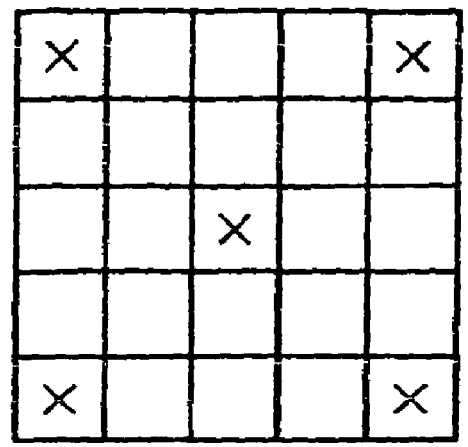
(b)
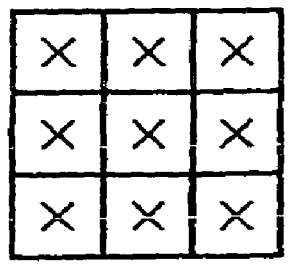
(c)
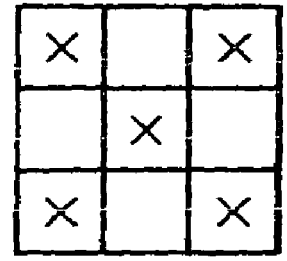
(d)

FIG.24

COLOR DIFFERENCE LOW-PASS FILTER 1

| 1 |  | 2 |  | 1 |
|---|---|---|---|---|
|   |   |   |   |   |
| 2 |   | 4 |   | 2 |
|   |   |   |   |   |
| 1 |   | 2 |   | 1 |

COLOR INFORMATION USED TO CALCULATE G INTERPOLATION VALUE FOR R PIXEL (HV,DN)=(1,1)   (HV,DN)=(1,0)   (HV,DN)=(1,-1)

G-POSITIONED LUMINANCE GENERATION COEFFICIENT PATTERN $Y_G$

| | $\beta/4$ | |
|---|---|---|
| $\beta/4$ | $\alpha$ | $\beta/4$ |
| | $\beta/4$ | |

FIG.29

R, B-POSITIONED LUMINANCE GENERATION COEFFICIENT $Y_{RB}v45$
(HV,DN)=(1,1)

|  | $\alpha u_1$ | $\beta t_1/2$ |
|---|---|---|
|  | $\beta/2$ |  |
| $\beta t_2/2$ | $\alpha u_2$ |  |

$Y_{RB}v$
(HV,DN)=(1,0)

| $\beta s_1/4$ | $\alpha u_1$ | $\beta t_1/4$ |
|---|---|---|
|  | $\beta/2$ |  |
| $\beta t_2/4$ | $\alpha u_2$ | $\beta s_2/4$ |

$Y_{RB}v135$
(HV,DN)=(1,-1)

| $\beta s_1/2$ | $\alpha u_1$ |  |
|---|---|---|
|  | $\beta/2$ |  |
|  | $\alpha u_2$ | $\beta s_2/2$ |

$Y_{RB}45$
(HV,DN)=(0,1)

|  | $\alpha u_1/2$ | $\beta t_1/2$ |
|---|---|---|
| $\alpha v_1/2$ | $\beta/2$ | $\alpha v_2/2$ |
| $\beta t_2/2$ | $\alpha u_2/2$ |  |

$Y_{RB}UNIb$
(HV,DN)=(0,0)

| $\beta s_1/4$ | $\alpha u_1/2$ | $\beta t_1/4$ |
|---|---|---|
| $\alpha v_1/2$ | $\beta/2$ | $\alpha v_2/2$ |
| $\beta t_2/4$ | $\alpha u_2/2$ | $\beta s_2/4$ |

$Y_{RB}135$
(HV,DN)=(0,-1)

| $\beta s_1/2$ | $\alpha u_1/2$ |  |
|---|---|---|
| $\alpha v_1/2$ | $\beta/2$ | $\alpha v_2/2$ |
|  | $\alpha u_2/2$ | $\beta s_2/2$ |

$Y_{RB}h45$
(HV,DN)=(-1,1)

|  |  | $\beta t_1/2$ |
|---|---|---|
| $\alpha v_1$ | $\beta/2$ | $\alpha v_2$ |
| $\beta t_2/2$ |  |  |

$Y_{RB}h$
(HV,DN)=(-1,0)

| $\beta s_1/4$ |  | $\beta t_1/4$ |
|---|---|---|
| $\alpha v_1$ | $\beta/2$ | $\alpha v_2$ |
| $\beta t_2/4$ |  | $\beta s_2/4$ |

$Y_{RB}h135$
(HV,DN)=(-1,-1)

| $\beta s_1/2$ |  |  |
|---|---|---|
| $\alpha v_1$ | $\beta/2$ | $\alpha v_2$ |
|  |  | $\beta s_2/2$ |

FIG.30

EDGE ENHANCEMENT FILTER (LAPLACIAN)

| -1 | -1 | -1 |
|---|---|---|
| -1 | 8 | -1 |
| -1 | -1 | -1 |

COLOR DIFFERENCE LOW-PASS FILTER 2

| 1 | 2 | 1 |
|---|---|---|
| 2 | 4 | 2 |
| 1 | 2 | 1 |

/16

IMAGE PROCESSING METHOD, IMAGE PROCESSING PROGRAM, AND IMAGE PROCESSING APPARATUS

The disclosures of the following priority applications are herein incorporated by reference:
Japanese Patent Application No. 2001-16729 filed Jan. 25, 2001
Japanese Patent Application No. 2001-343392 filed Nov. 8, 2001.

TECHNICAL FIELD

The present invention relates to an image processing method and the like, through which an image that is expressed in a colorimetric system made up of a plurality of color components and is constituted of a plurality of pixels each providing color information corresponding to a single color component is converted to an image constituted of a plurality of pixels each providing at least a common type of color information.

BACKGROUND ART

An image-capturing sensor such as a CCD is utilized in an electronic camera or the like to capture an image of a subject. At such an image-capturing sensor, color filters each corresponding to one of, for instance, three colors, R, G and B (red, green and blue) are arranged in a Bayer array, and image data containing color information corresponding to one of the color components, R, G and B are output from each pixel. In the image data a given pixel only contains color information on one color component. Accordingly, various methods for obtaining color information corresponding to color components missing at the pixel through interpolation processing or the like have been proposed.

Japanese Patent No. 2931520 discloses a technology whereby the color level of a given pixel is detected, a correlational value is adjusted in correspondence to the color level and interpolation processing is executed based upon the adjusted correlational value.

However, if the image being processed contains a structure, the value indicated by a color difference signal attributable to the structural factor cannot be distinguished from the value of the color difference signal generated due to the actual color of the image area in the color level detection method disclosed in Japanese Patent No. 2931520, and thus, there is a high risk of the correlational value being used incorrectly by mistake.

DISCLOSURE OF THE INVENTION

The present invention provides an image processing method and the like, through which a high quality color image can be provided by addressing the problem discussed above in an appropriate manner.

A first image processing method according to the present invention for converting a first image that is expressed in a colorimetric system made up of a plurality of color components and comprises a plurality of pixels each having color information corresponding to one of the color components into a second image that comprises a plurality of pixels each having at least a common type of color information, comprises: a color judgment step that includes a color difference information generation step in which color difference information is generated for a processing target pixel in the second image by using color information in the first image through one of at least three different methods and a color evaluation step in which a color evaluation is individually executed for each of processing target pixels in the second image by using the color difference information; and an image conversion step in which the first image is converted to the second image based upon results of the color evaluation executed in the color judgment step.

In the first image processing method, it is preferred that: the color judgment step further includes a similarity factor calculation step in which similarity factors corresponding to at least two directions are calculated for the processing target pixel in the second image by using the color information in the first image and a similarity judgment step in which a level of similarity manifesting along each direction is determined to be one of at least three levels based upon the similarity factors; and in the color difference information generation step, the color difference information is generated by using the color information in the first image through one of at least the three methods each corresponding to specific judgment results obtained in the similarity judgment step. In this case, it is preferred that: in the similarity factor calculation step executed during the color judgment step, different color similarity factors each constituted of color information corresponding to different color components are calculated as similarity factors.

In the first image processing method, it is preferred that the image conversion step includes: 1) a similarity factor calculation step in which different color similarity factors each constituted of color information corresponding to different color components and same color similarity factors each constituted of color information corresponding to a single color component are calculated along at least two directions for the processing target pixel by using the color information in the first image, and similarity factors are obtained by selectively using either the different color similarity factors or the same color similarity factors based upon the results of the color evaluation; 2) a similarity judgment step in which levels of similarity manifesting along the individual directions are judged based upon the similarity factors; and 3) a second image generation step in which color information for the second image is generated by using the color information in the first image based upon judgment results obtained in the similarity judgment step. In this case, it is preferred that: in the similarity factor calculation step executed during the image conversion step, the different color similarity factors are mainly used as the similarity factors when a saturation level is judged to be low in the color evaluation, and the same color similarity factors are mainly used as the similarity factors if the saturation level is judged to be high in the color evaluation.

In the first image processing method, it is preferred that the image conversion step includes: 1) a similarity factor calculation step in which different color similarity factors each constituted of color information corresponding to different color components and same color similarity factors each constituted of color information corresponding to a single color component are calculated along at least two directions for the processing target pixel by using the color information in the first image and similarity factors are calculated through weighted additions of the different color similarity factors and the same color similarity factors executed by varying a weighting ratio thereof based upon the results of the color evaluation; 2) a similarity judgment step in which levels of similarity manifesting along the individual directions are judged based upon the similarity factors; and 3) a second image generation step in which color information for the second image is generated by using the color information in the first image based upon judgment results obtained in the similarity judgment step. In this case, it is preferred that: in the similarity factor calculation step executed during the image conversion step, the different color similarity factors are mainly used as the similarity factors when a saturation level is judged to be low in the color evaluation, and the same color similarity factors are mainly used as the similarity factors if the saturation level is judged to be high in the color evaluation.

In the first image processing method, it is preferred that: the image conversion step includes a second image generation step in which color information for the second image is generated by using color information present at a pixel in the first image corresponding to the processing target pixel and color information present at nearby pixels in the first image with a make-up ratio of the color information adjusted in conformance to the results of the color evaluation. In this case, it is preferred that in the second image generation step executed during the image conversion step, the make-up ratio of the color information present at the pixel in the first image corresponding to the processing target pixel is raised if a saturation level is judged to be low in the color evaluation. Or it is preferred that: the image conversion step includes prior to the second image generation step 1) a similarity factor calculation step in which similarity factors along at least two directions are calculated for the processing target pixel by using the color information in the first image, and 2) a similarity judgment step in which levels of similarity manifesting along the individual directions are judged based upon the similarity factors for the processing target pixel; and the make-up ratio is adjusted based upon the results of the color evaluation only if judgment results obtained through the similarity judgment step indicate substantially equal levels of similarity manifesting along the individual directions.

In the first image processing method, it is preferred that the image conversion step includes: 1) a second image generation step in which color difference information for the second image is generated by using the color information in the first image; and 2) a color difference information correction step in which the color difference information for the second image is corrected based upon the results of the color evaluation. In this case, it is preferred that in the color difference information correction step executed during the image conversion step, wide range filter processing is executed on the color difference information for the second image when a saturation level is judged to be low in the color evaluation, and narrow range filter processing is executed on the color difference information for the second image when the saturation level is judged to be high in the color evaluation.

In the first image processing method, it is preferred that: 1) in color difference information generation step executed during the color judgment step, a plurality of types of color difference information are generated for a single processing target pixel; and 2) in the color evaluation step executed during the color judgment step, the color evaluation is executed by taking into consideration a new type of color difference information generated through a combination of the plurality of types of color difference information.

In the first image processing method, it is preferred that in the color evaluation step executed during the color judgment step, the color evaluation is executed by incorporating color difference information generated for nearby pixels through the color difference information generation step with the color difference information generated for the processing target pixel.

In the first image processing method, it is preferred that in the color evaluation step executed during the color judgment step, the color difference information is corrected and the color evaluation is executed by using the corrected color difference information. In this case, it is preferred that in the color evaluation step executed during the color judgment step, low-pass filter processing is executed to correct the color difference information.

In the first image processing method, it is preferred that: the color judgment step includes after the color evaluation step 1) a color difference information correction step in which the color difference information is corrected based upon the results of the color evaluation, and 2) a color re-evaluation step in which a color evaluation is re-executed in units of individual pixels by using the color difference information having been corrected through the color difference information correction step; and the first image is converted to the second image based upon results of the color evaluation executed in the color re-evaluation step. In this case, it is preferred that: the color judgment step includes prior to the color difference information correction step 1) a luminance information calculation step in which luminance information is calculated by using the color information in the first image, and 2) a luminance evaluation step in which a luminance evaluation is executed in units of individual pixels by using the luminance information; and in the color difference information correction step, the color difference information is corrected based upon the results of the color evaluation executed in the color re-evaluation step and results of the luminance evaluation executed in the luminance evaluation step. Also, it is preferred that it is preferred that in the color difference information correction step executed during the color judgment step, median filter processing is executed on the color difference information.

A second image processing method according to the present invention for converting a first image that is expressed in a colorimetric system made up of a plurality of color components and comprises a plurality of pixels each having color information corresponding to one of the color components into a second image that comprises a plurality of pixels each having a plurality of types of color information, comprises: an image acquisition step in which the first image is obtained; a color difference information generation step in which color difference information is generated in correspondence to positions of the pixels constituting the second image based upon color information corresponding to the color components of the obtained first image; a color evaluation step in which a color evaluation is executed in units of individual pixels by using the generated color difference information for the second image; a luminance information generation step in which luminance information is generated in correspondence to the positions of the pixels constituting the second image based upon results of the color evaluation executed in units of the individual pixels of the second image; and an output step in which the second image is output by using the color difference information generated in the color difference information generation step and the luminance information generated in the luminance information generation step.

In the second image processing method, it is preferred that: the color difference information at the position of a given pixel of the second image comprises a plurality of types of color difference information; and in the color evaluation step, the color evaluation is executed by taking into consideration a new type of color difference information generated through a combination of the plurality of types of color difference information. In this case, it is preferred that: the first image is expressed in a colorimetric system that is made up of a first color component, a second color component and a third color component, with pixels corresponding to the first color component set with a higher pixel density than pixels corresponding to the second color component or pixels corresponding to the third color component; the plurality of types of color difference information include first color difference information comprising a difference between color information corresponding to the first color component and color information corresponding to the second color component and second color difference information comprising a difference between the color information corresponding to the first color component and color information corresponding to the third color information; and the new type of color difference information comprises a difference between the second color difference information and the third color difference information.

In the second image processing method, it is preferred that in the color evaluation step, the generated color difference information for the second image is corrected and the color evaluation is executed by using the corrected color difference information. In this case, it is preferred that in the color evaluation step, the generated color difference information for the second image is corrected through low-pass filter processing.

In the second image processing method, it is preferred that there are further provided: a similarity factor calculation step executed before the luminance information generation step, in which different color similarity factors indicating similarity manifesting between a pixel of the first image corresponding to a pixel of the second image and nearby pixels along at least two directions are calculated by using color information corresponding to different color components in a local area containing the pixel and same color similarity factors indicating similarity manifesting between the pixel and nearby pixels along at least the two directions are calculated by using color information corresponding to a single color component in the local area containing the pixel; and a similarity judgment step executed before the luminance information generation step and after the color evaluation step, in which levels of similarity manifesting along at least the two directions between the pixel of the first image corresponding to the pixel of the second image and the nearby pixels are judged by selectively using either the different color similarity factors or the same color similarity factors calculated in the similarity factor calculation step based upon the results of the color evaluation, and in the luminance information generation step, the luminance information is generated in correspondence to the position of the pixel of the second image based upon judgment results obtained in the similarity judgment step.

In the second image processing method, it is preferred that the plurality of pixels of the first image and the plurality of pixels of the second image correspond to each other in a positional arrangement.

In the second image processing method, it is preferred that in the luminance information generation step, the luminance information is generated in correspondence to the position of a pixel of the second image by using color information at a pixel of the first image corresponding to the pixel of the second image and color information present at nearby pixels of the first image, and a make-up ratio of the color information present at the pixel of the first image corresponding to the pixel of the second image and the color information present at nearby pixels of the first image is adjusted based upon the results of the color evaluation executed in units of individual pixels constituting the second image.

In the second image processing method, it is preferred that: there is further provided a similarity judgment step executed before the color difference information generation step, in which levels of similarity manifesting between a pixel of the first image corresponding to a pixel of the second image and nearby pixels of the first image along at least two directions are judged by using color information present in a local area containing the pixel of the first image; and in the color difference information generation step, color difference information is generated in correspondence to a position of the pixel of the second image based upon judgment results obtained through the similarity judgment step. In this case, it is preferred that in the similarity judgment step, levels of similarity manifesting between the pixel of the first image corresponding to the pixel of the second image and the nearby pixels of the first image along at least two directions are judged by using color information corresponding to different color components present in the local area containing the pixel of the first image.

A third image processing method according to the present invention for converting a first image that is expressed in a colorimetric system made up of a plurality of color components and comprises a plurality of pixels each having color information corresponding to at least one of the color components into a second image that comprises a plurality of pixels each having at least a common type of color information that is not present in the first image, comprises: 1) a color difference information generation step in which color difference information is generated by using color information in the first image; 2) a color evaluation step in which a color evaluation is executed in units of individual pixels by using the color difference information; 3) a color difference information correction step in which the color difference information is corrected through a single type of correction selected from a plurality of types of correction based upon results of the color evaluation executed in the color evaluation step; and 4) an output step in which the second image is output by using the corrected color difference information, all executed for a processing target pixel in the second image.

In the third image processing method, it is preferred that: the plurality of types of correction include a first correction through which the color difference information that has been generated is corrected through wide-range low-pass filter processing and a second correction through which the color difference information that has been generated is corrected through narrow range low-pass filter processing; and in the color difference information correction step, the first correction is selected if the saturation level is judged to be low in the color evaluation and the second correction is selected if the saturation level is judged to be high in the color evaluation.

In the third image processing method, it is preferred that: the plurality of types of correction include a first correction through which the color difference information that has been generated is corrected through wide-range median filter processing and a second correction through which the color difference information that has been generated is corrected through narrow-range median filter processing; and in the color difference information correction step, the first correction is selected if a saturation level is judged to be low in the color evaluation and the second correction is selected if the saturation level is judged to be high in the color evaluation.

In the third image processing method, it is preferred that: the color difference information corresponding to a position of a given pixel of the second image comprises a plurality of types of color difference information; and in the color evaluation step, the color evaluation is executed by taking into consideration a new type of color difference information generated through a combination of the plurality of types of color difference information. In this case, it is preferred that: the first image is expressed in a colorimetric system that is made up of a first color component, a second color component and a third color component, with pixels corresponding to the first color component set with a higher pixel density than pixels corresponding to the second color component or pixels corresponding to the third color component; the plurality of types of color difference information include first color difference information comprising a difference between color information corresponding to the first color component and color information corresponding to the second color component and second color difference information comprising a difference between the color information corresponding to the first color component and color information corresponding to the third color information; and the new type of color difference information comprises a difference between the second color difference information and the third color difference information.

In the third image processing method, it is preferred that in the color evaluation step, the color evaluation is executed by incorporating color difference information generated for nearby pixels through the color difference information generation step with the color difference information generated for the processing target pixel.

In the third image processing method, it is preferred that in the color evaluation step, the color difference information is corrected and the color evaluation is executed by using the corrected color difference information. In this case, it is preferred that in the color evaluation step, low-pass filter processing is executed to correct the color difference information. Furthermore, it is preferred that the low-pass filter is a wide-range low-pass filter.

In the third image processing method, it is preferred that: there is further provided a similarity judgment step executed before the color difference information generation step, in which levels of similarity manifesting between a pixel of the first image corresponding to a pixel of the second image and nearby pixels of the first image along at least two directions are judged by using color information present in a local area containing the pixel of the first image; and in the color difference information generation step, color difference information is generated in correspondence to a position of the pixel of the second image based upon judgment results obtained through the similarity judgment step. In this case, it is preferred that: 1) in the similarity judgment step, the levels of similarity manifesting along the individual directions are each judged to be one of at least three different levels; and 2) in the color difference information generation step, the color difference information is generated by using the color information in the first image through one of at least three different methods each corresponding to specific judgment results obtained in the similarity judgment step.

A fourth image processing method according to the present invention for converting a first image that is expressed in a colorimetric system made up of a plurality of color components and comprises a plurality of pixels each having color information corresponding to at least one of the color components into a second image that comprises a plurality of pixels each having at least a common type of color information that is not present in the first image, comprises: 1) a luminance information generation step in which luminance information is generated by using color information in the first image; 2) a luminance evaluation step in which a luminance evaluation is executed in units of individual pixels by using the luminance information; 3) a second image generation step in which color information for the second image is generated by using the color information of the first image; and 4) a second image correction step in which the color information for the second image is corrected based upon results of the luminance evaluation executed in units of the individual pixels of the second image, and steps of 1) through 4) all are executed for a processing target pixel of the second image. In this case, it is preferred that in the luminance evaluation step, the luminance evaluation is executed by calculating a maximum value among values indicated in the luminance information of a plurality of pixels present within a local area containing the processing target pixel and a value representing a variance of the values indicated by the luminance information. Furthermore, it is preferred that: 1) in the luminance evaluation step, one of two decisions that are a decision that a condition in which the maximum value and the variance value of the values indicated by the luminance information are each equal to or greater than a predetermined value is satisfied and a decision that the condition is not satisfied, is made; and 2) in the second image correction step, the color information for the second image is corrected through one of two different types of correction selected in conformance to the decision made with regard to the condition, or the color information is corrected only if the condition is satisfied. Yet furthermore, it is preferred that in the second image correction step, wide range median filter processing is executed if the condition is determined to be satisfied in the luminance evaluation and narrow-range median filter processing is executed if the condition is determined not to be satisfied in the luminance evaluation, or median filter processing is executed only if the condition is determined to be satisfied.

An image processing program according to the present invention is used to execute the steps of the above image processing methods on a computer.

A computer-readable recording medium according to the present invention records the above image processing program.

An image processing apparatus according to the present invention comprises the above image processing program.

BRIEF DESCRIPTION OF THE DRAWINGS

FIG. 1 is a functional block diagram of an electronic camera that corresponds to first through ninth embodiments;

FIG. 2 shows the arrangement of the color components in the image data undergoing the interpolation processing;

FIG. 8 presents illustrations referred to in the explanation of the processing executed to generate an image used for color judgment;

FIG. 9 presents illustrations referred to in the explanation of the color index calculation;

FIG. 11 presents illustrations referred to in the explanation of the calculation of the same color similarity factors along the vertical and horizontal directions;

FIG. 13 presents illustrations referred to in the explanation of the calculation of same color similarity factors along diagonal directions;

FIG. 17 illustrates the median filter ranges;

FIG. 24 illustrates a wide-range low-pass filter;

FIG. 26 shows the positions and the color components of the pixels used in correspondence to a specific directional index when the conversion target pixel is an R pixel;

FIG. 28 shows the positions and the coefficient (G-positioned luminance generation coefficient pattern) of the pixels used when the conversion target pixel is a G pixel;

FIG. 29 shows the positions and the coefficients (R-positioned or B-positioned luminance generation coefficient pattern) of the pixels used in correspondence to a specific directional index when the conversion target pixel is an R pixel or a B pixel;

FIG. 30 shows an edge enhancing filter;

FIG. 33 shows a narrow range low-pass filter;

FIG. 35 shows how the program may be provided in a recording medium such as a CD-ROM or through a data signal on the Internet or the like.

BEST MODE FOR CARRYING OUT THE INVENTION

Figure 3:
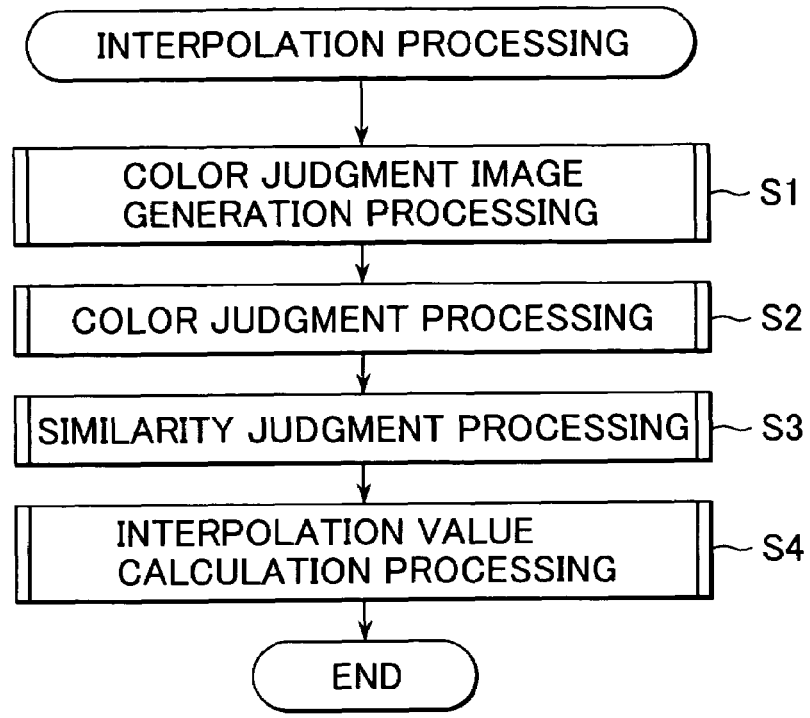
FIG. 3 presents a flowchart of the operations executed in the image processing unit in the first embodiment.

The following is a detailed explanation of the embodiments of the present invention. An explanation is given in reference to the first through fourth embodiments on an example in which the image restoration or reconstruction processing executed in the image processing apparatus according to the present invention is adopted in an electronic camera equipped with an interpolation processing function.

FIG. 1 is a functional block diagram of the electronic camera corresponding to the first through fourth embodiments.

The electronic camera 1 includes an A/D conversion unit 10, an image processing unit 11, a control unit 12, a memory 13, a compression/decompression unit 14 and a display image generation unit 15. It also includes a memory card interface unit 17 for achieving an interface with a memory card (a card type removable memory) 16 and an external interface unit 19 for achieving an interface with an external apparatus such as a PC (personal computer) 18 via a specific cable or a wireless transmission path. These blocks are connected with one another via a bus 29. The image processing unit 11 may be constituted of, for instance, a one-chip microprocessor dedicated to image processing.

In addition, the electronic camera 1 is provided with a photographic optical system 20, an image-capturing sensor 21, an analog signal processing unit 22 and a timing control unit 23. The output of the image-capturing sensor 21, at which an optical image of a subject obtained at the photographic optical system 20 is formed, is connected to the analog signal processing unit 22. The output of the analog signal processing unit 22, in turn, is connected to the A/D conversion unit 10. The output of the control unit 12 is connected to the timing control unit 23 and the output of the timing control unit 23 is connected to the image-capturing sensor 21, the analog signal processing unit 22, the A/D conversion unit 10 and the image processing unit 11. The image-capturing sensor 21 maybe constituted of, for instance, a CCD.

The electronic camera 1 is further provided with an operation unit 24 that is equivalent to a shutter release button, a selector button for mode switching and the like, and a monitor 25. The output of the operation unit 24 is connected to the control unit 12, whereas the output of the display image generation unit 15 is connected to the monitor 25.

It is to be noted that an application program recorded in a CD-ROM 28 is pre-installed in the PC 18 which is connected with a monitor 26, a printer 27 and the like. In addition, the PC 18 includes a memory card interface unit (not shown) for achieving an interface with the memory card 16 and an external interface unit (not shown) for achieving an interface with an external apparatus such as the electronic camera 1 via a specific cable or a wireless transmission path, in addition to a CPU, a memory and a hard disk (none shown).

As the operator selects a photographing mode and presses the shutter release button via the operation unit 24 in the electronic camera 1 structured as shown in FIG. 1, the control unit 12 implements timing control for the image-capturing sensor 21, the analog signal processing unit 22 and the A/D conversion unit 10 via the timing control unit 23. The image-capturing sensor 21 generates image signals corresponding to the optical image. These image signals undergo a specific type of signal processing at the analog signal processing unit 22, are digitized at the A/D conversion unit 10 and are provided to the image processing unit 11 as image data.

Since R (red), G (green) and B (blue) color filters are arranged in a Bayer array at the image-capturing sensor 21 of the electronic camera 1, the image data are provided to the image processing unit 11 in the RGB colorimetric system. Color information corresponding to one of the three color components, R, G and B is present at each of the numerous pixels constituting the image data.

In addition to the image data conversion processing which is to be detailed later, the image processing unit 11 executes image processing such as gradation conversion and edge enhancement on the image data. After such image processing is completed, the image data undergo a specific type of compression processing at the compression/decompression unit 14 as necessary and then are recorded into the memory card 16 via the memory card interface unit 17.

It is to be noted that the image data having undergone the image processing may be recorded into the memory card 16 in an uncompressed state, or they may be converted to image data to the colorimetric system adopted at the monitor 26 or the printer 27 connected to the PC 18 to be provided to the PC 18 via the external interface unit 19. In addition, if the operator selects a replay mode via the operation unit 24, the image data recorded in the memory card 16 are read out via the memory card interface unit 17, are decompressed at the compression/decompression unit 14 and are displayed at the monitor 25 via the display image generation unit 15.

It is to be noted that instead of displaying the decompressed image data at the monitor 25, the decompressed image data maybe converted to the colorimetric system adopted at the monitor 26 or the printer 27 connected to the PC 18 and may be provided to the PC 18 via the external interface unit 19. In addition, the processing for converting the image data having undergone the conversion processing to be detailed later into the colorimetric system adopted at the monitor 25 or 26 or the printer 27 may be achieved by adopting a technology in the known art.

FIG. 2 illustrates the arrangement of the color components of image data undergoing interpolation processing. It is to be noted that R, G and B indicate different color components and the positions of the pixels corresponding to the individual color components are indicated by using values of coordinates [x,y] in FIG. 2.

In the arithmetic expressions to be detailed later, R and B in FIG. 2 are replaced with Z and the color information corresponding to the color component at each pixel is expressed as Z[i,j].

First Embodiment

FIGS. 3 through 7 present flowcharts of operations executed in the image processing unit 11 in the first embodiment.

It is to be noted that FIGS. 3 through 7 show the flows of the operations executed in the interpolation processing which is part of the image processing executed by the image processing unit 11. FIG. 3 shows an overall flow of the interpolation processing operations, whereas FIGS. 4 through 7 respectively show operating flows of "color judgment image generation processing", "color judgment processing", "similarity judgment processing" and "interpolation value calculation processing" included in the interpolation processing.

In reference to the first embodiment, the operations of the interpolation processing which is part of the image processing executed by the image processing unit 11 are explained and an explanation of other operations is omitted.

Figure 4:
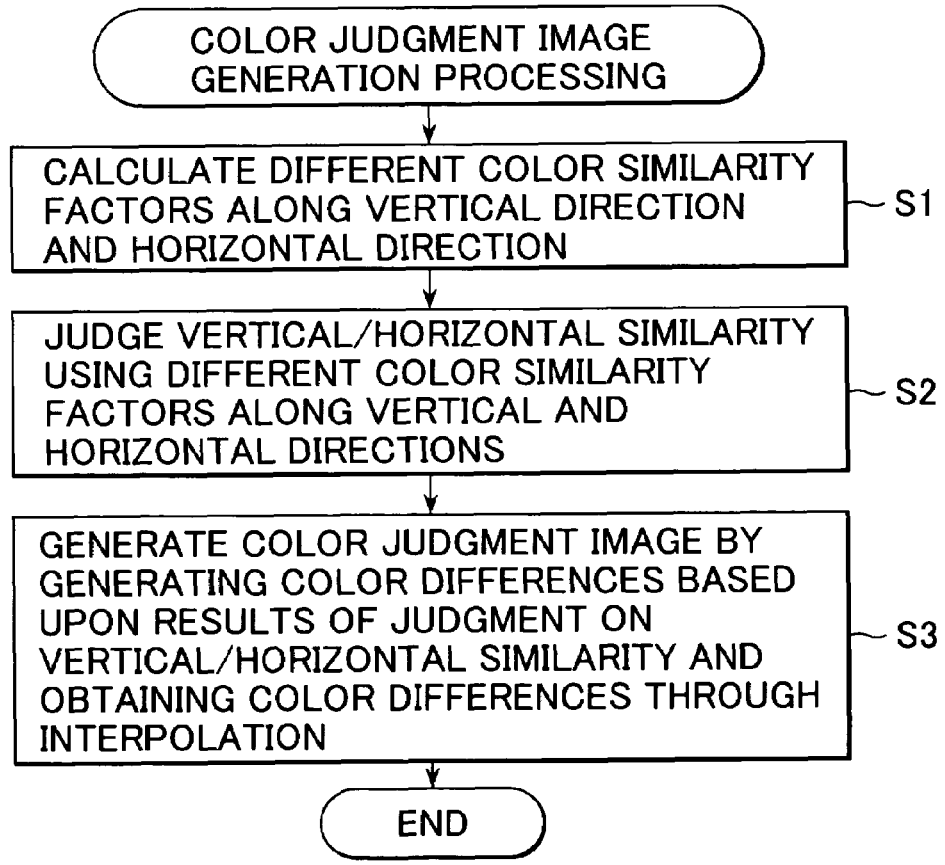
FIG. 4 presents a flowchart of an operation executed in the image processing unit in the first embodiment.

First, the image processing unit 11 generates a "color judgment image" by executing the "color judgment image generation processing" in FIG. 4 (FIG. 3, S1).

It is to be noted that the "color judgment image", which is an image used for the calculation of a "color index", comprises the color hue values at a single pixel. The phrase "hue values at a single pixel" in this context refers to color hue values that are calculated independently for each pixel. In addition, the "color index" is an index indicating the characteristics of the color at each pixel, which is referenced when judging whether the pixel undergoing the interpolation processing constitutes a chromatic image portion or an achromatic image portion (hereafter referred to as "color judgment"). Namely, the color judgment image is generated so as to enable an area classification of the colors of the image undergoing the interpolation in units of the individual pixels.

In the first embodiment, an image having color differences Cr and Cb (equivalent to the Cr component and the Cb component in the YCbCr colorimetric system; the color differences Cr and Cb are defined as Cr=R−G and Cb=B−G in this document) made to correspond to all the pixels is generated as the color judgment image. While the color judgment image generated for the purpose of color judgment is allowed to contain local color artifacts (false color) manifesting over several pixels, it is desirable to ensure that it does not include any color artifacts occurring in clusters due to periodic fine structures.

Accordingly, a judgment with regard to similarity is made by using "different color similarity factors" during the generation of the color differences Cr and Cb and during the interpolation processing so as to resolve an image area that is likely to manifest color artifacts in clusters by giving priority to the fine structure portion present in the image area and to faithfully reflect the characteristics of the color of the original image (the saturation level and the like) in the first embodiment. It is to be noted that a "different color similarity factor" refers to a similarity factor determined by using one or more similarity factor components constituted of color information representing different color components, which allows a judgment on similarity to be made over a pitch of 1 pixel.

(Color Judgment Image Generation Processing)

Now, in reference to FIG. 4, the "color judgment image generation processing" is explained.

First, the image processing unit 11 calculates different color similarity factors along the vertical direction and the horizontal direction for a pixel at which the green component is missing (FIG. 4, S1).

For instance, the image processing unit 11 calculates the values defined as in expression 1 and expression 2 below during the process of similarity factor calculation.

GR (GB) Similarity Factor Components $$Cv0[i,j]=(|G[i,j-1]-Z[i,j]|+|G[i,j+1]-Z[i,j]|)/2 \qquad \text{expression 1}$$

$$Ch0[i,j]=(|G[i-1,j]-Z[i,j]|+|G[i+1,j]-Z[i,j]|)/2 \qquad \text{expression 2}$$

Figure 8:
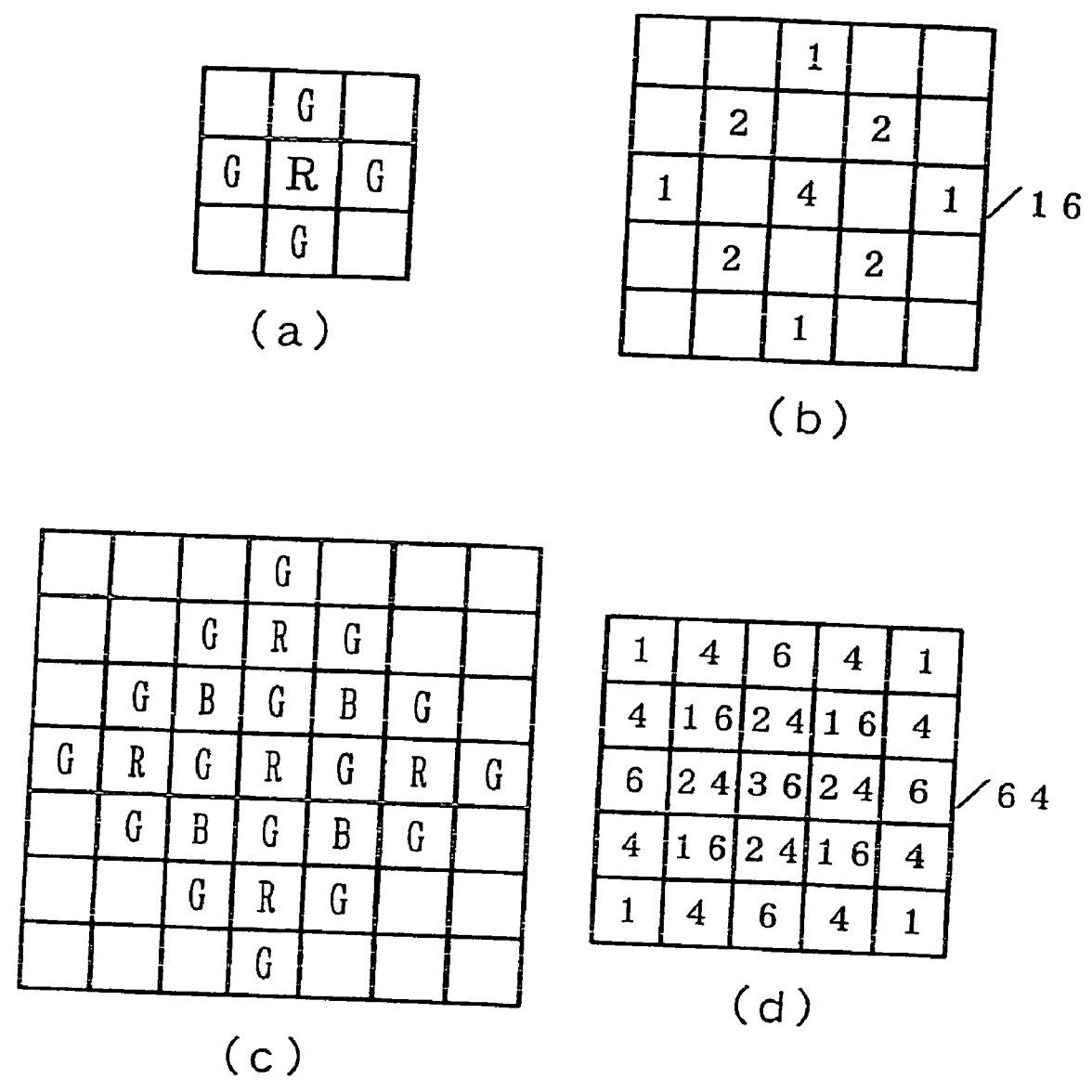

It is to be noted that if color information corresponding to the red color component is present at the coordinates [i,j] as in FIG. 2(*a*), the values of the similarity factor components are calculated by using the color information corresponding to the color components shown in FIG. 8(*a*) in expression 1 and expression 2.

In addition, in expression 1 and expression 2, each term inside the symbol representing an absolute value (hereafter referred to as a "similarity factor element") is constituted of color information provided at two adjacent pixels. For this reason, the different color similarity factors, which contain more information related to localized similarity compared to values such as Sv2 and Sh2 disclosed in Japanese Patent No. 2931520 that are obtained by applying a low-pass filter to color information over a wide range, enable a more accurate similarity judgment for an Nyquist frequency fine image structure manifesting changes over a single pixel pitch.

It is to be noted that the similarity factor elements may be calculated as squares of the absolute values or other powers of the absolute values instead of as the absolute values of color differences.

Alternatively, the similarity factor elements may each have a make-up as expressed in the expressions presented below.

$$Cv0[i,j]=|-G[i,j-1]+2 \cdot Z[i,j]-G[i,j+1]|/2 \qquad \text{expression 1'}$$

$$Ch0[i,j]=|-G[i-1,j]+2 \cdot Z[i,j]-G[i+1,j]|/2 \qquad \text{expression 2'}$$

While the values calculated by using expressions 1 and 2 (or expressions 1' and 2') may be directly utilized as the different color similarity factor along the vertical direction and the different color similarity factor along the horizontal direction for the pixel at which the green color component is missing, similar values are calculated for pixels set around the target pixel as well as for the target pixel and the ultimate different color similarity factors along the vertical direction and the horizontal direction are calculated for the target pixel at which the green color component is missing through weighted addition of the individual values executed along each direction (hereafter referred to as "peripheral addition") in this example.

Namely, based upon expressions 1 and 2 (or expressions 1' and 2'), the image processing unit 11 executes an arithmetic operation for pixels positioned at the coordinates [i,j], [i−1, j−1], [i+1,j−1], [i−1,j+1], [i+1,j+1], [i,j−2], [i,j+2], [i−2,j] and [i+2,j], and then calculates a different color similarity factor Cv[i,j] along the vertical direction and a different color similarity factor Ch[i,j] along the horizontal direction through peripheral additions equivalent to those expressed in expressions 3 and 4 below executed by using the values obtained through the arithmetic operation. The operations expressed in expression 3 and expression 4 are equivalent to peripheral additions executed as shown in FIG. 8(*b*). It is to be noted that the method adopted for the peripheral addition is not limited to the example presented here.

$$Cv[i,j]=(4 \cdot Cv0[i,j]+2 \cdot (Cv0[i-1,j-1]+Cv0[i+1,j-1]+Cv0[i-1,j+1]Cv0[i+1,j+1])+Cv0[i,j-2]+Cv0[i,j+2]+Cv0[i-2,j]+Cv0[i+2,j])/16 \quad \text{expression 3}$$

$$Ch[i,j]=(4 \cdot Ch0[i,j]+2 \cdot (Ch0[i-1,j-1]+Ch0[i+1,j-1]+Ch0[i-1,j+1]Ch0[i+1,j+1]) +Ch0[i,j-2]+Ch0[i,j+2]+Ch0[i-2,j]+Ch0[i+2,j])/16 \quad \text{expression 4}$$

It is to be noted that the similarity factors calculated through expressions 3 and 4 each indicate a higher degree of similarity as the value becomes smaller.

If color information corresponding to the red color component is present at the coordinates [i,j] as shown in FIG. 2(*a*), the operations expressed in expression 1 through expression 4 are executed by using the color information corresponding to the color components shown in FIG. 8(*c*).

Thus, the similarity factors obtained through the peripheral additions each contain similarity factor components each constituted of color information corresponding to the green color component and color information corresponding to the red color component and similarity factor components each constituted of color information corresponding to the green color component and color information corresponding to the blue color component. In other words, since the similarity factors are each calculated through peripheral addition by taking into consideration a plurality of color components and also taking into consideration continuity with surrounding pixels, the accuracy of the similarity factor is improved.

Next, the image processing unit 11 judges the similarity manifesting along the vertical direction and the horizontal direction (hereafter referred to as "vertical/horizontal similarity") for the pixel at which the green component is missing, based upon the different color similarity factor Cv[i,j] along the vertical direction and the different color similarity factor Ch[i,j] along the horizontal direction (FIG. 4, S2). Then, the image processing unit 11 sets the appropriate value as described below for an index HV[i,j] which indicates the vertical/horizontal similarity as the results of the judgment.

For instance, if a condition expressed as $$|Cv[i,j]-Ch[i,j]| \leq Th0 \quad \text{condition 1}$$

is satisfied with regard to an arbitrary threshold value Th0, the image processing unit 11 judges that "a high or low degree of similarity manifests along both the vertical direction and the horizontal direction" and sets 0 for the index HV[i,j]. If, on the other hand, condition 1 is not satisfied and, at the same time, a condition expressed as $$Cv[i,j]<Ch[i,j] \quad \text{condition 2}$$

is satisfied, the image processing unit 11 judges that "a high degree of similarity manifests along the vertical direction" and sets "1" for the index HV[i,j]. If neither condition 1 or condition 2 is satisfied, the image processing unit 11 judges that "a high degree of similarity manifests along the horizontal direction" and sets "−1" for the index HV[i,j].

Next, the image processing unit 11 generates the color judgment image by generating color differences corresponding to the specific color components of the pixels at each of which color information corresponding to the red color component or color information corresponding to the blue color component is present, based upon the results of the judgment made with regard to the vertical/horizontal similarity and obtaining through interpolation the color differences corresponding to the missing color components for each pixel at which at least either color information corresponding to the red color component or color information corresponding to the blue color component is not present (FIG. 4, S3).

For instance, if a condition expressed as $$HV[i,j]=1 \quad \text{condition 3}$$

is satisfied with regard to the index HV[i,j] of a pixel at which color information corresponding to the red color component is present (if a high degree of similarity manifests along the vertical direction), the image processing unit 11 calculates the color difference Cr[i,j] for the pixel through expression 5 presented below.

$$Cr[i,j]=(2 \cdot Z[i,j]+Z[i,j-2]+Z[i,j+2])/4-(G[i,j-1]+G[i,j+1])/2 \quad \text{expression 5}$$

If, on the other hand, condition 3 is not satisfied but a condition expressed as $$HV[i,j]=-1 \quad \text{condition 4}$$

is satisfied (if a high degree of similarity manifests along the horizontal direction) with regard to the index HV[i,j] of the pixel at which color information corresponding to the red color component is present, the image processing unit 11 calculates the color difference Cr[i,j] of the pixel through expression 6 presented below.

$$Cr[i,j]=(2 \cdot Z[i,j]+Z[i-2,j]+Z[i+2,j])/4-(G[i-1,j]+G[i+1,j])/2 \quad \text{expression 6}$$

If neither condition 3 nor condition 4 is satisfied (a high degree of similarity or a low degree of similarity manifests along both the vertical direction and the horizontal direction) with regard to the index HV[i,j] of the pixel at which color information corresponding to the red color component is present, the image processing unit 11 calculates the color difference Cr[i,j] of the pixel through expression 7 presented below.

$$Cr[i,j]=(4 \cdot Z[i,j]+Z[i,j-2]+Z[i,j+2]+Z[i-2,j]+Z[i+2,j])/8-(G[i,j-1]+G[i,j+1]+G[i-1,j]+G[i+1,j])/4 \quad \text{expression 7}$$

It is to be noted that the image processing unit 11 calculates the color difference Cb[i,j] for each pixel at which color information corresponding to the blue component is present through an operation similar to that expressed in one of expressions 5 through 7.

In addition, during the process of calculating color differences for pixels at each of which either color information corresponding to the red color component or color information corresponding to the blue color component is present as described above, the image processing unit 11 sets "0" for initialization for the color difference at pixels with no color information representing the corresponding color components.

Next, the image processing unit 11 obtains through interpolation the color difference (Cr[i,j] or Cb[i,j]) corresponding to the specific missing color component for each of the pixels at which color information corresponding to the red color component or color information corresponding to the blue color component is missing. While this interpolation is normally achieved through a method in which the average of color differences at adjacent pixels is used as an interpolation value, a method in which a low-pass filter is applied to all the pixels as well as calculating interpolation values is adopted in this example so as to reduce the extent of color artifacts due to color moire that manifests in an image having a periodic structure.

For instance; the image processing unit 11 calculates the color difference Cr[i,j] corresponding to the red color component through expression 8 presented below. It is to be noted that the operation expressed in expression 8 is equivalent to execute a weighted addition of color difference values Cr at the individual pixels as shown in FIG. 8(*d*).

$$Cr[i,j]=(36 \cdot Cr[i,j]+24 \cdot (Cr[i-1,j]+Cr[i+1,j]+Cr[i,j-1]+Cr[i,j+1])+16 \cdot (Cr[i-1,j-1]+Cr[i+1,j-1]+Cr[i-1,j+1]+Cr[i+1,j+1]) +6 \cdot (Cr[i-2,j]+Cr[i+2,j]+Cr[i,j-2]+Cr[i,j+2]) +4 \cdot (Cr[i-1,j-2]+Cr[i+1,j-2]+Cr[i-2,j-1]+Cr[i+2,j-1]+Cr[i-2,j+1]+Cr[i+2,j+1]+Cr[i-1,j+2]+Cr[i+1,j+2]) +1 \cdot (Cr[i-2,j-2]+Cr[i+2,j-2]+Cr[i-2,j+2]+Cr[i+2,j+2])) /64 \quad \text{expression 8}$$

In addition, the image processing unit 11 also calculates color difference Cb[i,j] through an operation similar to that expressed in expression 8.

Figure 5:
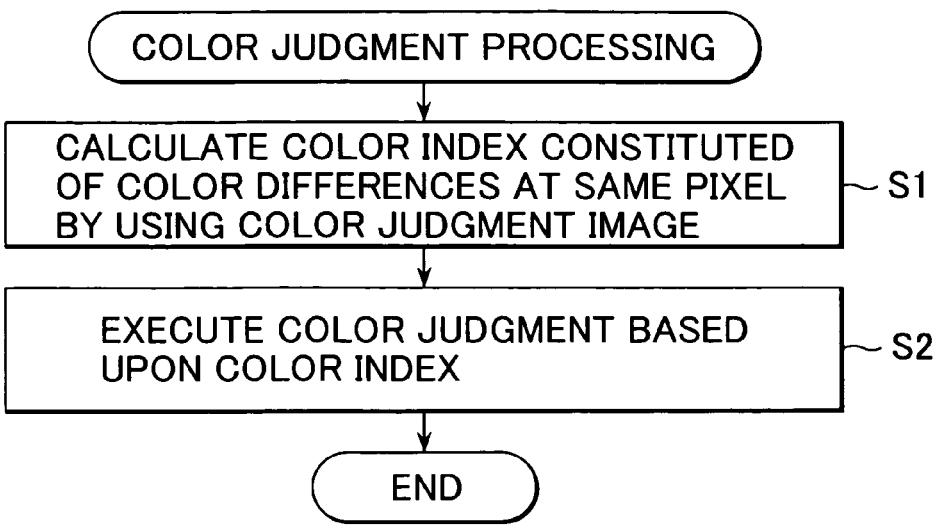
FIG. 5 presents a flowchart of an operation executed in the image processing unit in the first embodiment.

Once the "color judgment image generation processing" is completed as explained above, the image processing unit 11 executes the "color judgment processing" shown in FIG. 5 (FIG. 3, S2).

(Color Judgment Processing)

The "color judgment processing" is now explained in reference to FIG. 5.

First, the image processing unit 11 calculates a color index constituted of the color differences at the same pixel, as indicated below, by using the color judgment image generated through the "color judgment image generation processing" (FIG. 5, S1).

Namely, the image processing unit 11 calculates a color index Cdiff0[i,j] through expression 10 presented below.

$$Cdiff0[i,j]=(|Cr[i,j]|+|Cb[i,j]|+|Cr[i,j]-Cb[i,j]|)/3 \quad \text{expression 10}$$

Unlike the color level disclosed in Japanese Patent No. 2931520, the color index in the first embodiment can be regarded as a value calculated by using the hue values within the same pixel.

As a result, by using the color index achieved in the first embodiment, which eliminates structural factors of the image reflected in the color level in the related art, a color judgment closer to human visual perception can be realized. In addition, since the color index achieved in the first embodiment is calculated by taking into consideration the color difference between R and B, unlike in the related art, the risk of an erroneous judgment that the pixel constitutes an achromatic image portion being made due to a large color difference between R and B is eliminated to enable a highly reliable color judgment.

While Cdiff0[i,j] calculated through expression 10 may be directly used as the color index for the pixel positioned at the coordinates [i,j], the color index Cdiff[i,j] for the pixel at the coordinates [i,j] is calculated through a peripheral addition in this example.

Namely, the image processing unit 11 executes an arithmetic operation for the pixels positioned at the coordinates [i,j], [i−2,j−2], [i+2,j−2], [i−2,j+2], [i+2,j+2], [i,j−4], [i,j+4], [i−4,j] and [i+4,j] by using expression 10 and calculates the color index Cdiff[i,j] through a peripheral addition equivalent to that expressed in expression 11 below of the values obtained through the arithmetic operation.

$$Cdiff[i,j]=(8 \cdot Cdiff0[i,j]+Cdiff0[i-2,j-2]+Cdiff0[i+2,j-2]+Cdiff0[i-2,j+2]+Cdiff0[i+2,j+2]+Cdiff0[i,j-4]+Cdiff0[i,j+4]+Cdiff0[i-4,j]+Cdiff0[i+4,j])/16 \quad \text{expression 11}$$

It is to be noted that while the operation expressed in expression 11 is equivalent to executing a peripheral addition as indicated in FIG. 9(*a*), it may be calculated through a peripheral addition of Cdiff0 as indicated in FIG. 9(*b*) or FIG. 9(*c*).

By calculating the color index through the peripheral addition as described above, the adverse effect of color artifacts resulting from a local error having occurred in the color difference interpolation during the process of color judgment image generation can be reduced.

In addition, the peripheral addition is executed by using values calculated for pixels over a wide range and color moire components corresponding to colors complementary to each other are canceled out so as to reduce the adverse effect of color moire manifesting over long cycles of, for instance, 10 pixels, thereby improving the reliability of the color index.

After calculating the color indices Cdiff for the individual pixels as explained above, the image processing unit 11 executes a color judgment based upon the color indices Cdiff (FIG. 5, S2).

It is to be noted that in the first embodiment, processing for classifying each pixel into one of four groups (a fully achromatic portion, an achromatic portion, a lightly saturated (chromatic) portion and a saturated (chromatic) portion) based upon the level of the color index of the pixel through color judgment is executed. It is also to be noted that the values taken for threshold values ThBWz, ThBWa and ThBWb used in conditional expressions 10 through 12 below are each respectively set to 2, 5 and 10 through 15 when the color index Cdiff[i,j] indicates gradations within the range of 0 through 255.

If the color index Cdiff[i,j] of a given pixel satisfies a condition expressed as $$Cdiff[i,j] \leq ThBWz \quad \text{condition 10}$$

the image processing unit 11 judges that the pixel is a fully achromatic portion and accordingly sets "z" for a color classification index BW[i,j] which indicates the results of the color judgment. If, on the other hand, condition 10 is not satisfied and, at the same time, the color index of the pixel satisfies a condition expressed as $$Cdiff[i,j] \leq ThBWa \quad \text{condition 11}$$

the image processing unit 11 judges that the pixel is an achromatic portion and sets "a" for the color classification index BW[i,j]. If neither condition 10 nor condition 11 is satisfied but the color index satisfies a condition expressed as $$Cdiff[i,j] \leq ThBWb \quad \text{condition 12}$$

the image processing unit 11 judges that the pixel is a lightly saturated portion and sets "b" for the color classification index BW[i,j]. If none of the conditions 10 through 12 are satisfied, the image processing unit 11 judges that the pixel is a saturated portion and set "c" for the color classification index BW[i,j].

Figure 10:
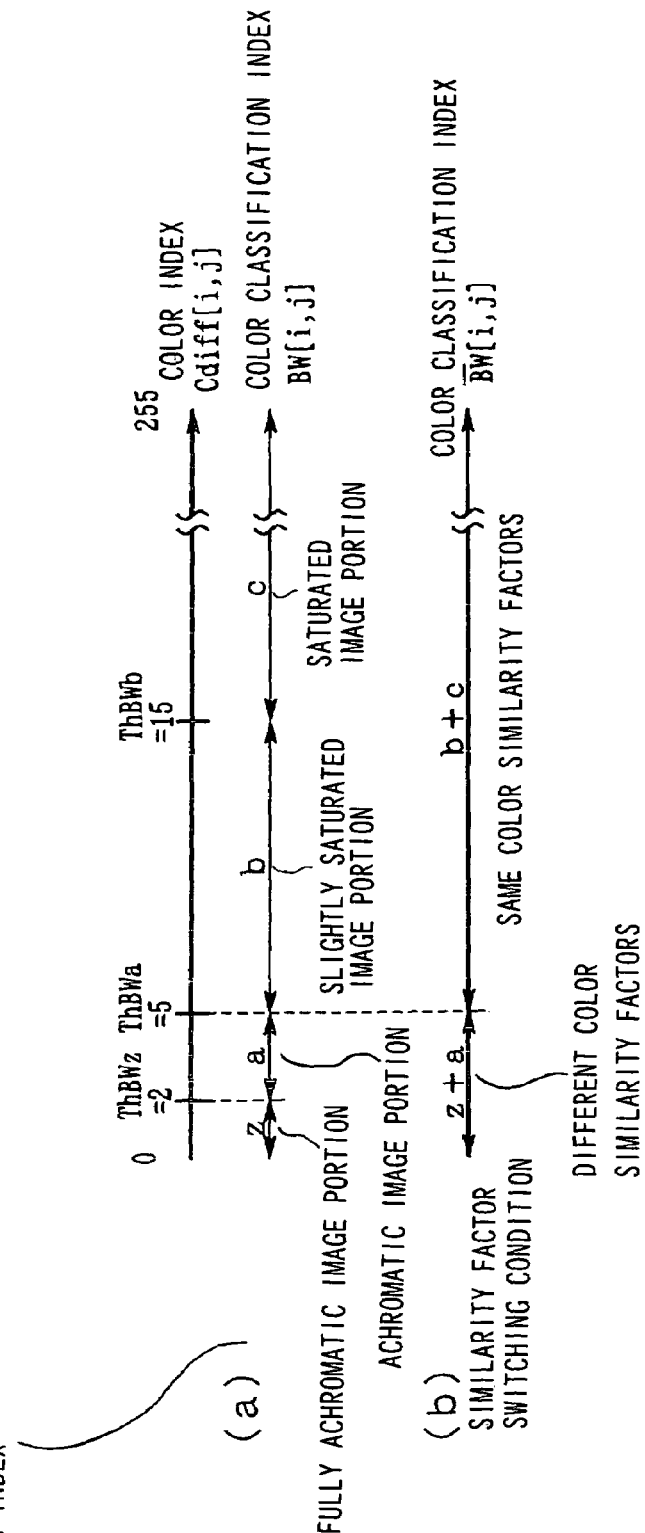
FIG. 10 presents an illustration provided to facilitate an explanation of the color index.

FIG. 10 presents charts that facilitate the explanation of the color index, and FIG. 10(*a*) in particular shows the relationship between the color index and the color classification index.

Figure 6:
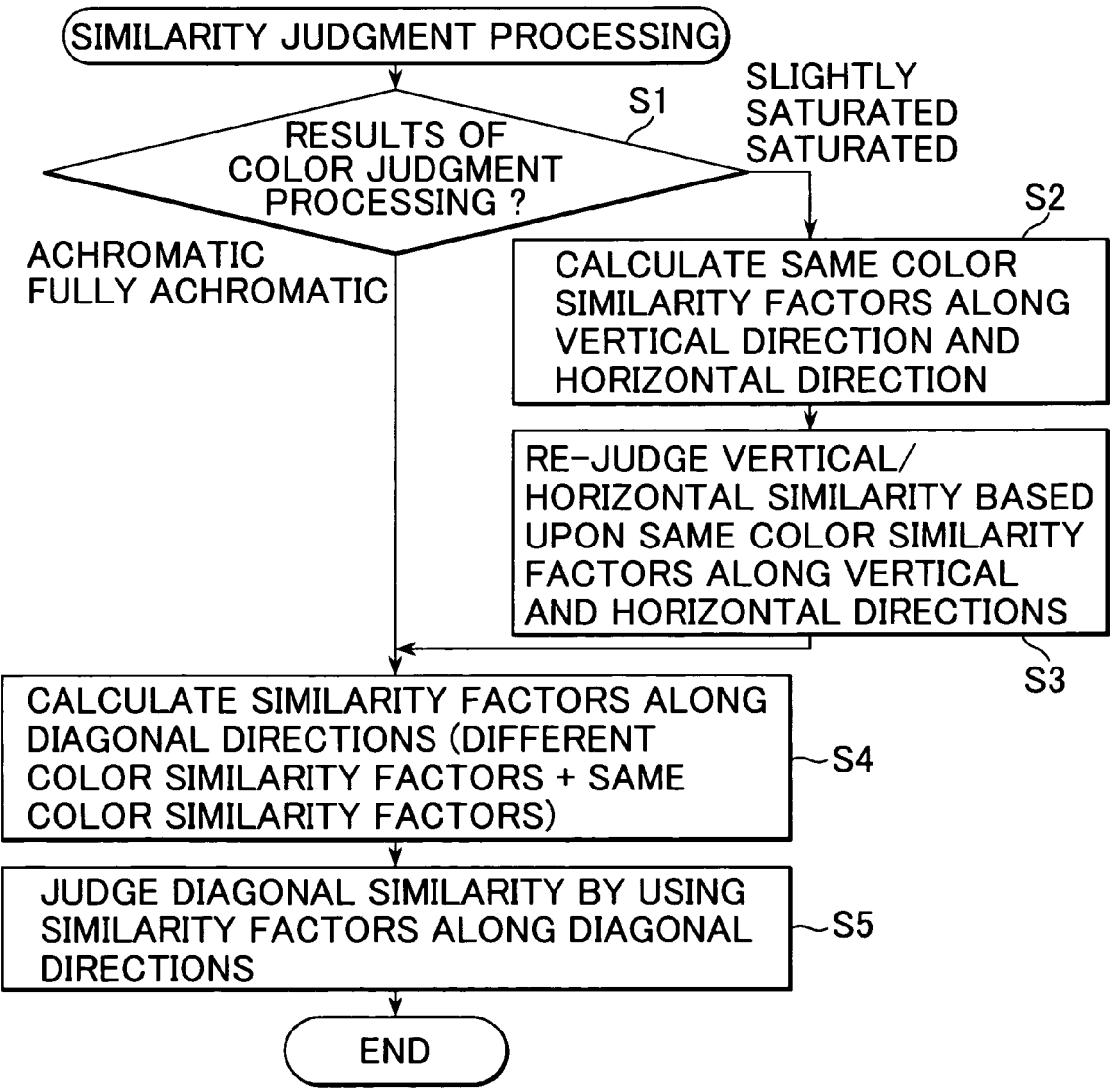
FIG. 6 presents a flowchart of an operation executed in the image processing unit in the first embodiment.

Once the "color judgment processing" is completed as explained above, the image processing unit 11 executes the "similarity judgment processing" shown in FIG. 6 (FIG. 3, S3).

(Similarity Judgment Processing)

In reference to FIG. 6, the "similarity judgment processing" is explained.

In the "similarity judgment processing", the similarity manifesting at each pixel at which the green color component is missing is judged based upon different color similarity factors (similarity factors each constituted of sets of color information representing different color components) and same color similarity factors (similarity factors each constituted of sets of color information representing a single color component). It is to be noted that the different color similarity factors have been calculated in the "color judgment image generation processing", whereas the same color similarity factors are newly defined here by using different expressions. Since the different color similarity factors are calculated by disregarding the specific color components of the individual pixels and the same color similarity factors are calculated by taking into consideration the specific color component corresponding to the individual pixels, it is desirable to use either the different color similarity factors or the same color similarity factors depending upon the value indicated by the color index or the color classification index. Through experiment, it has been confirmed that the different color similarity factors are more suited for judging the degree of vertical/horizontal similarity manifesting at a pixel which is either an achromatic image portion or a fully achromatic image portion, whereas the same color similarity factors are more suited for judging the degree of vertical/horizontal similarity manifesting at a pixel that is part of a lightly saturated image area or a saturated image area.

Accordingly, the judgment on the vertical/horizontal similarity manifesting at a pixel constituting part of an achromatic image area or a fully achromatic image area is executed by using the direct results of the judgment on the vertical/horizontal similarity obtained through the "color judgment image generation processing" in the first embodiment.

First, the image processing unit 11 verifies the results of the "color judgment processing" executed on the pixels at which the green color component is missing (FIG. 6, S1).

Then, the image processing unit 11 calculates same color similarity factors (similarity factors each calculated by using one or more similarity factor components constituted of color information corresponding to a single color component) along the vertical direction and the horizontal direction for each of pixels classified as lightly saturated image portions or saturated image portions (each pixel for which either "b" or "c" is set in the color classification index thereof) among the pixels at which the green color component is missing (FIG. 6, S2), and re-judges the vertical/horizontal similarity by using the same color similarity factors (FIG. 6, S3).

Namely, the image processing unit 11 calculates values defined in expressions 20 through 23 for each pixel having been classified as a lightly saturated image portion or a saturated image portion.

G-G Similarity Factor Components $$Cvs1[i,j] = |G[i,j-1] - G[i,j+1]| \quad \text{expression 20}$$

$$Chs1[i,j] = |G[i-1,j] - G[i+1,j]| \quad \text{expression 21}$$

B-B (R-R) Similarity Factor Components $$Cvs2[i,j] = (|Z[i-1,j-1] - Z[i-1,j+1]| + |Z[i+1,j-1] - Z[i+1,j+1]|)/2 \quad \text{expression 22}$$

$$Chs2[i,j] = (|Z[i-1,j-1] - Z[i+1,j-1]| + |Z[i-1,j+1] - Z[i+1,j+1]|)/2 \quad \text{expression 23}$$

It is to be noted that if color information corresponding to the red color component is present at the pixel positioned at the coordinates [i,j] as shown in FIG. 2(*a*), the values are calculated through expressions 20 and 21 by using the color information corresponding to the color component shown in FIG. 11(*a*), and the values are calculated through expressions 22 and 23 by using color information corresponding to the color component shown in FIG. 11(*b*).

Alternatively, the values of Cvs2[i,j] and Chs2[i,j] may be calculated as indicated below.

R-R(B-B) Similarity Factor Components $$Cv2[i,j] = (|Z[i,j-2] - Z[i,j]| + |Z[i,j+2] - Z[i,j]|)/2 \quad \text{expression 22'}$$

$$Ch2[i,j] = (|Z[i-2,j] - Z[i,j]| + |Z[i+2,j] - Z[i,j]|)/2 \quad \text{expression 23'}$$

$$Cv2[i,j] = |-Z[i,j-2] + 2 \cdot Z[i,j] - Z[i,j+2]|/2 \quad \text{expression 22''}$$

$$Ch2[i,j] = |-Z[i-2,j] + 2 \cdot Z[i,j] - Z[i+2,j]|/2 \quad \text{expression 23''}$$

If color information corresponding to the red color component is present at the pixel positioned at the coordinates [i,j] as shown in FIG. 2(*a*), the values are calculated through expressions 22' and 23' or expressions 22" and 23" by using the color information corresponding to color component shown in FIG. 11(*c*).

Next, the image processing unit 11 calculates values defined in expressions 24 and 25 presented below. Namely, the image processing unit 11 executes weighted addition of the values calculated through expressions 20 and 22 (or expression 22' or expression 22") and also executes a weighted addition of the values calculated through expressions 21 and 23 (or expression 21' or expression 23").

$$Cvs0[i,j] = (Cvs1 + Cvs2)/2 \quad \text{expression 24}$$

$$Chs0[i,j] = (Chs1 + Chs2)/2 \quad \text{expression 25}$$

It is to be noted that while the ratio used in the weighted additions is 1:1 in expressions 24 and 25, a ratio other than 1:1 may be used.

While the values calculated by using expressions 20 through 25 may be directly used as the same color similarity factors along the vertical direction and the horizontal direction of a "pixel classified as a lightly saturated image portion or a saturated image portion, at which color information corresponding to the green color component is not present", the same color similarity factor along the vertical direction and the same color similarity factor along the horizontal direction are calculated through peripheral additions in this example.

Namely, the image processing unit 11 executes an arithmetic operation for the pixels positioned at the coordinates

[i,j], [i−1,j−1], [i+1,j−1], [i−1,j+1], [i+1,j+1], [i,j−1], [i,j+2], [i−1,j] and [i+2,j] by using expressions 20 through 25 and calculates a same color similarity factor Cvs[i,j] along the vertical direction and a same color similarity factor Chs[i,j] along the horizontal direction through peripheral additions equivalent to the operations expressed in expressions 26 and 27 below by using the values obtained through the arithmetic operation. The operations expressed in expressions 26 and 27 are equivalent to executing peripheral additions as indicated in FIG. 11(d). It is to be noted that the method adopted to execute the peripheral additions is not limited to the example presented here.

$$Cvs[i,j]=(4 \cdot Cvs0[i,j]+2 \cdot (Cvs0[i−1,j−1]+Cvs0[i+1,j−1]+Cvs0[i−1,j+1]+Cvs0[i+1,j+1]) +Cvs0[i,j−2]+Cvs0[i,j+2]+Cvs0[i−2,j]+Cvs0[i+2,j])/16 \quad \text{expression 26}$$

$$Chs[i,j]=(4 \cdot Chs0[i,j]+2 \cdot (Chs0[i−1,j−1]+Chs0[i+1,j−1]+Chs0[i−1,j+1]+Chs0[i+1,j+1]) + Chs0[i,j−2]+Chs0[i,j+2]+Chs0[i−2,j]+Chs0[i+2,j])/16 \quad \text{expression 27}$$

The similarity factors calculated through expressions 26 and 27 each indicate a higher degree of similarity as the value of the similarity factor becomes smaller.

It is to be noted that if color information corresponding to the red color component is present at the pixel positioned at the coordinates [i,j] as shown in FIG. 2(a), the values are calculated through expressions 26 and 27 by using the color information corresponding to the color components shown in FIGS. 11(e) and 11(f).

Thus, the similarity factors obtained through the peripheral additions each contain a similarity factor component constituted entirely of color information corresponding to the green color component, a similarity factor component constituted entirely of color information corresponding to the blue color component and a similarity factor component constituted entirely of color information corresponding to the red color component. In other words, the similarity factors calculated through the peripheral additions by taking into consideration the plurality of color components and also the continuity with the surrounding pixels achieve a higher degree of accuracy of similarity.

Next, the image processing unit 11 makes another judgment on the vertical/horizontal similarity manifesting at the "pixel classified as a lightly saturated image portion or a saturated image portion, at which color information corresponding to the green color component is not present" based upon the same color similarity factor Cvs[i,j] along the vertical direction and the same color similarity factor Chs[i,j] along the horizontal direction and resets the index HV[i,j] that indicates the vertical/horizontal similarity.

For instance, if a condition expressed as $$|Cvs[i,j]−Chs[i,j]| \leq Th0 \quad \text{condition 20}$$

is satisfied with regard to an arbitrary threshold value Th0, the image processing unit 11 judges that "a high or low degree of similarity manifests along both the vertical direction and the horizontal direction" and sets 0 for the index HV[i,j]. If, on the other hand, condition 20 is not satisfied and, at the same time, a condition expressed as $$Cvs[i,j]<Chs[i,j] \quad \text{condition 21}$$

is satisfied, the image processing unit 11 judges that "a high degree of similarity manifests along the vertical direction" and sets "1" for the index HV[i,j]. If neither condition 20 nor condition 21 is satisfied, the image processing unit 11 judges that "a high degree of similarity manifests along the horizontal direction" and sets "−1" for the index HV[i,j].

When the processing explained above is completed, a value corresponding to the same color similarity factors is set for the index HV[i,j] for each "pixel classified as a lightly saturated image portion or a saturated image portion, at which color information corresponding to the green color component is not present", whereas the value corresponding to the different color similarity factors is set for the index HV[i,j] for each "pixel classified as an achromatic image portion or a fully achromatic image portion, at which color information corresponding to the green color component is not present".

In other words, the index HV[i,j] is calculated for a given pixel by using either the different color similarity factors or the same color similarity factors depending upon the value of the color index Cdiff[i,j] and the color classification index BW[i,j], as shown in FIG. 10(b).

It is to be noted that the similarity factors used to calculate the index HV[i,j] do not need to be of a single type, i.e., the different color similarity factors or the same color similarity factors. For instance, instead of the "similarity judgment processing" in FIG. 6, the "similarity judgment processing" shown in FIG. 12 maybe executed to judge the vertical/horizontal similarity by using similarity factors obtained through weighted additions of the different color similarity factors and the same color similarity factors.

Figure 12:
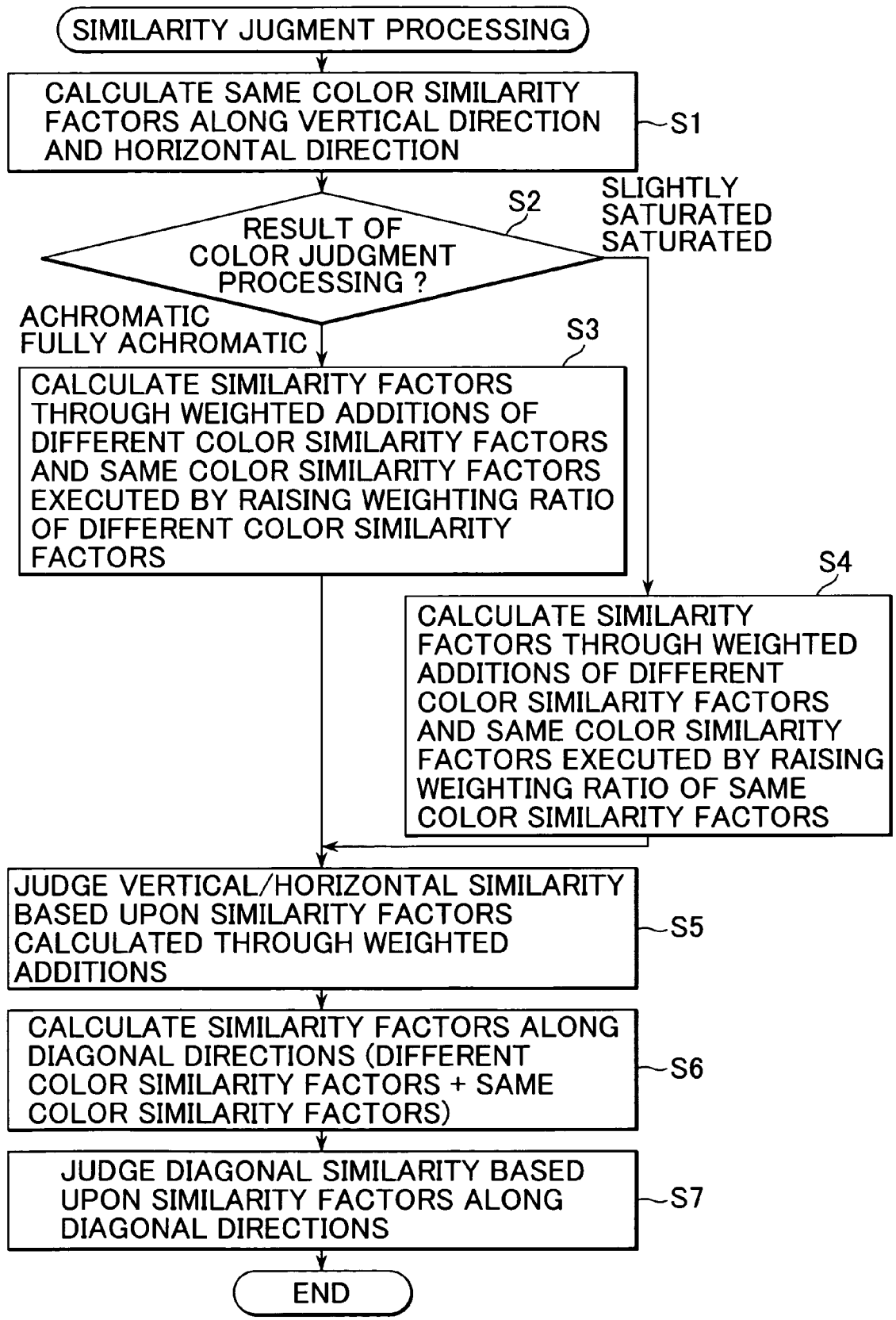
FIG. 12 presents another example of the similarity judgment processing that may be executed in the first embodiment.

In FIG. 12, before judging the results of the "color judgment processing", same color similarity factors along the vertical direction and the horizontal direction are calculated (FIG. 12, S1). Then, for each pixel classified as an achromatic image portion or a fully achromatic image portion through the "color judgment processing", similarity factors are calculated through weighted additions of the different color similarity factors and the same color similarity factors executed by raising the weighting ratio for the different color similarity factors calculated in FIG. 4, S1 (FIG. 12, S3). For each pixel classified as a lightly saturated image portion or a saturated image portion, on the other hand, similarity factors are calculated through weighted additions of the different color similarity factors and the same color similarity factors executed by raising the weighting ratio for the same color similarity factors (FIG. 12, S4). Then, the vertical/horizontal similarity is judged by using the similarity factors thus calculated (FIG. 12, S5).

It is to be noted that if the ratio of the weighting coefficients for the different color similarity factors and the same color similarity factors is set to 1:0 in FIG. 12, S3 and is also set to 0:1 in FIG. 12, S4, the results of the judgment made on the vertical/horizontal similarity are exactly the same as the results of the "similarity judgment processing" shown in FIG. 6.

Next, the image processing unit 11 calculates similarity factors (each constituted of a different color similarity factor and same color similarity factors) along a diagonal 45° direction and a diagonal 135° direction for each of the pixels at which the green color component is missing (FIG. 6, S4).

For instance, the image processing unit 11 may calculate values defined in expressions 30 through 35 presented below during the process of calculating the similarity factors.

R-B (B-R) Similarity Factor Components $$C45\_1[i,j]=(|Z[i+1,j−1]−Z[i,j]|+|Z[i−1,j+1]−Z[i,j]|)/2 \quad \text{expression 30}$$

$$C135\_1[i,j]=(|Z[i−1,j−1]−Z[i,j]|+|Z[i+1,j+1]−Z[i,j]|)/2 \quad \text{expression 31}$$

G-G Similarity Factor Components $$C45\_2[i,j]=(|G[i,j-1]-G[i-1,j]|+|G[i+1,j]-G[i,j+1]|)/2 \quad \text{expression 32}$$

$$C135\_2[i,j]=(|G[i,j-1]-G[i+1,j]|+|G[i-1,j]-G[i,j+1]|)/2 \quad \text{expression 33}$$

B-B (R-R) Similarity Factor Components $$C45\_3[i,j]=|Z[i+1,j-1]-Z[i-1,j+1]| \quad \text{expression 34}$$

$$C135\_3[i,j]=(|Z[i-1,j-1]-Z[i+1,j+1]|) \quad \text{expression 35}$$

Figure 13:
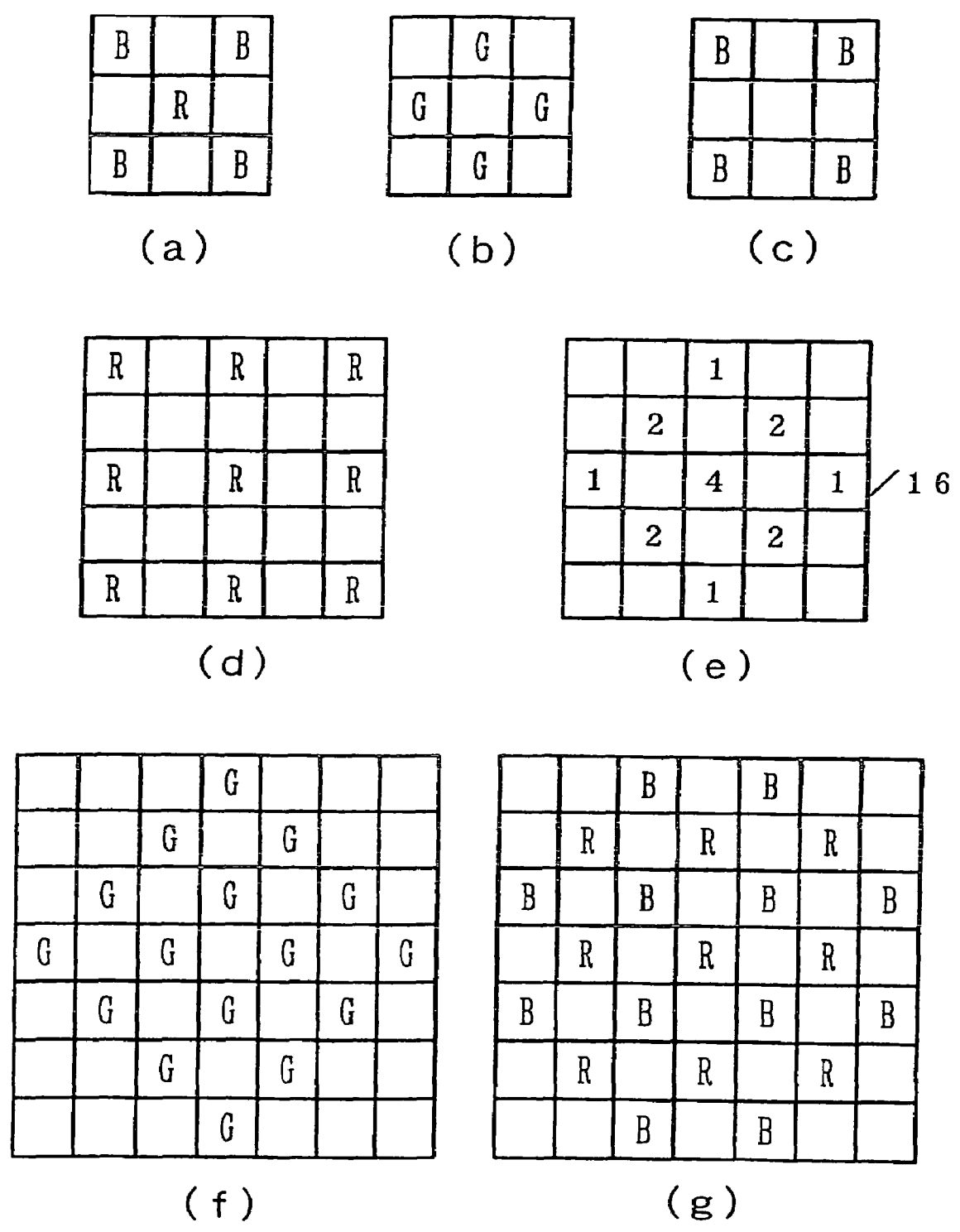

It is to be noted that if color information corresponding to the red color component is present at the pixel positioned at the coordinates [i,j] as shown in FIG. 2(a), the values are calculated through expressions 30 and 31 by using the color information corresponding to the color components shown in FIG. 13(a), the values are calculated through expressions 32 and 33 by using the color information corresponding to the color component shown in FIG. 13(b) and the values are calculated through expressions 34 and 35 by using the color information corresponding to the color components shown in FIG. 13(c).

Alternatively, C45_3[i,j] and C135_3[i,j] may be calculated as indicated below.

RR(BB) Similarity Factor Components $$C45\_3[i,j]=(|Z[i-1,j-2]-Z[i,j]|+|Z[i+2,j+2]-Z[i,j]|)/2 \quad \text{expression 34'}$$

$$C135\_3[i,j]=(|Z[i-1,j-1]-Z[i,j]|+|Z[i+2,j+2]-Z[i,j]|)/2 \quad \text{expression 35'}$$

$$C45\_3[i,j]=|-Z[i-2,j-2]+2\cdot Z[i,j]-Z[i+2,j+2]|/2 \quad \text{expression 34''}$$

$$C135\_3[i,j]=|-Z[i-2,j-2]+2\cdot Z[i,j]-Z[i+2,j+2]|/2 \quad \text{expression 35''}$$

If color information corresponding to the red color component is present at the pixel positioned at the coordinates [i,j] as shown in FIG. 2(a), the values are calculated through expressions 34' and 35' and expressions 34" and 35" by using the color information corresponding to the color component shown in FIG. 13(d).

Next, the image processing unit 11 calculates the values defined in expressions 36 and 37 presented below. Namely, the image processing unit 11 executes a weighted addition of the values calculated by using expression 30, expression 32 and expression 34 (or expression 34' or expression 34") and also executes a weighted addition of the values calculated by using expression 31, expression 33 and expression 35 (or expressions 35' or expressions 35").

$$C45\_0[i,j]=(B1\cdot C45\_1+B2\cdot C45\_2+B3\cdot C45\_3)/(B1+B2+B3) \quad \text{expression 36}$$

$$C135\_0[i,j]=(B1\cdot C135\_1+B2\cdot C135\_2+B3\cdot C135\_3)/(B1+B2+B3) \quad \text{expression 37}$$

It is to be noted that the ratio set for the weighted additions executed as indicated in expressions 36 and 37 may be, for instance, "B1:B2:B3=2:2:1"

While the values calculated by using expressions 30 through 37 may be directly used as the similarity factor along the diagonal 45° direction and the similarity factor along the diagonal 135° direction for the pixel at which color information corresponding to the green color component is missing, the diagonal 45° similarity factor and the diagonal 135° similarity factor are calculated through peripheral additions in this example.

Namely, the image processing unit 11 executes an arithmetic operation for the pixels positioned at the coordinates [i,j], [i−1,j−1], [i+1,j−1], [i−1,j+1], [i+1,j+1], [i,j−2], [i,j+2], [i−2,j] and [i+2,j] by using expressions 30 through 37 and calculates the similarity factor C45[i,j] along the diagonal 45° direction and the diagonal similarity factor C135[i,j] along the diagonal 135° direction through peripheral additions equivalent to the operations expressed in expressions 38 and 39 below by using the values obtained through the arithmetic operation. The operations expressed in expressions 38 and 39 are equivalent to executing peripheral additions as indicated in FIG. 13(e). It is to be noted that the method adopted to execute the peripheral additions is not limited to the example presented here.

$$C45[i,j]=(4\cdot C45\_0[i,j]+2\cdot(C45\_0[i-1,j-1]+C45\_0[i+1,j-1]+C45\_0[i-1,j+1]+C45\_0[i+1,j+1]) + C45\_0[i,j-2]+C45\_0[i,j+2]+C45\_0[i-2,j]+C45\_0[i+2,j])/16 \quad \text{expression 38}$$

$$C135[i,j]=(4\cdot C135\_0[i,j]+2\cdot(C135\_0[i-1,j-1]+C135\_0[i+1,j-1]+C135\_0[i-1,j+1]+C135\_0[i+1,j+1]) +C135\_0[i,j-2]+C135\_0[i,j+2]+C135\_0[i-2,j]+C135\_0[i+2,j])/16 \quad \text{expression 39}$$

The similarity factors calculated through expressions 38 and 39 each indicate a higher degree of similarity as the value of the similarity factor becomes smaller.

It is to be noted that if color information corresponding to the red color component is present at the pixel positioned at the coordinates [i,j] as shown in FIG. 2(a), the values are calculated through expressions 38 and 39 by using the color information corresponding to the color components shown in FIGS. 13(f) and 13(g).

Thus, the similarity factors obtained through the peripheral additions each contain a similarity factor component constituted of color information corresponding to the blue color component and color information corresponding to the red color component, a similarity factor component constituted entirely of color information corresponding to the green color component, a similarity factor component constituted entirely of color information corresponding to the blue color component and a similarity factor component constituted entirely of color information corresponding to the red color component. In other words, the similarity factors calculated through the peripheral additions by taking into consideration a plurality of color components and also the continuity with the surrounding pixels achieve a higher degree of accuracy.

Next, the image processing unit 11 judges the similarity manifesting along the diagonal directions at each pixel at which the green color component is missing (hereafter referred to as "diagonal similarity") based upon the diagonal 45° similarity factor C45[i,j] and the diagonal 135° similarity factor C135[i,j] (FIG. 6, S5). Then, the image processing unit 11 sets one of the following values for an index DN[i,j] indicating the diagonal similarity based upon the results of the judgment.

For instance, if a condition expressed as $$|C45[i,j]-C135[i,j]|\leq Th2 \quad \text{condition 30}$$

is satisfied with regard to an arbitrary threshold value Th2, the image processing unit 11 judges that "a high or low degree of similarity manifests along both the diagonal 45° direction and the diagonal 135° direction" and sets "0" for the index DN[i,j]. If, on the other hand, condition 30 is not satisfied and, at the same time, a condition expressed as $$C45[i,j]<C135[i,j] \quad \text{condition 31}$$

is satisfied, the image processing unit 11 judges that "a high degree of similarity manifests along the diagonal 45° direction" and sets "1" for the index DN[i,j]. If neither condition 30 nor condition 31 is satisfied, the image processing unit 11 judges that "a high degree of similarity manifests along the diagonal 135° direction and it sets "−1" for the index DN[i,j].

It is to be noted that while the diagonal similarity is judged by executing weighted additions of different color similarity factors and same color similarity factors in the first embodiment, the diagonal similarity may be judged instead by selectively using either the different color similarity factors or the same color similarity factors as in the judgment executed with regard to the vertical/horizontal similarity.

Figure 7:
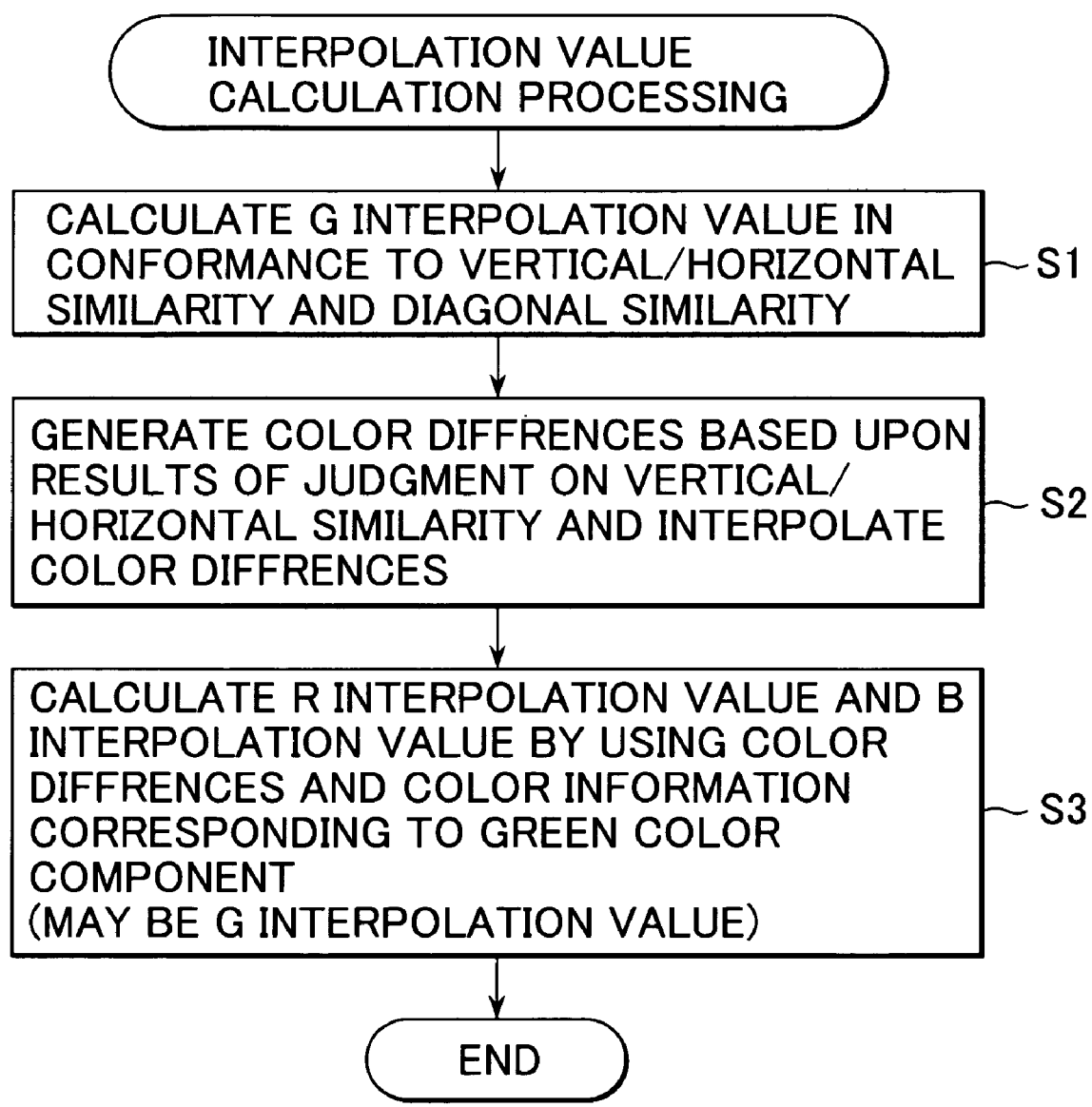
FIG. 7 presents a flowchart of an operation executed in the image processing unit in the first embodiment.

After the "similarity judgment processing" explained above is completed, the image processing unit 11 executes the "interpolation value calculation processing" shown in FIG. 7 (FIG. 3, S4).

(Interpolation Value Calculation Processing)

Now, in reference to FIG. 7, the "interpolation value calculation processing" is explained.

First, the image processing unit 11 calculates a G interpolation value (an interpolation value for the green color component) based upon the vertical/horizontal similarity and the diagonal similarity (FIG. 7, S1). Namely, the image processing unit 11 calculates the G interpolation value in correspondence to the index HV[i,j] indicating the vertical/horizontal similarity and the index DN[i,j] indicating the diagonal similarity set as explained earlier.

It is to be noted that while the G interpolation value may be calculated as in the related art, a phenomenon in which the average term of the green color component is over-corrected by the term of another color component (the same color component as that at the pixel undergoing the interpolation processing) occurs (hereafter referred to as "over-correction") in such a calculation of the G interpolation value if it cannot be assumed that the color differences are constant or if there is a chromatic aberration. Accordingly, in the first embodiment, the G interpolation value is calculated while minimizing such an over-correction.

Figure 14:
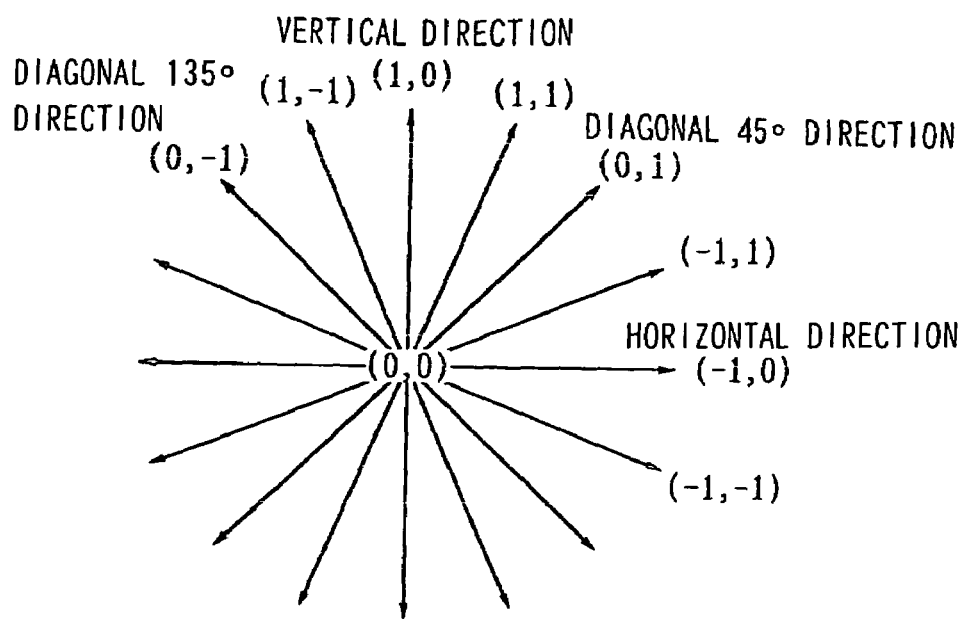
FIG. 14 shows directions along which a high degree of similarity manifests as indicated by the values of [HV,DN]

First, the image processing unit 11 ascertains the values of the index HV[i,j] indicating the vertical/horizontal similarity and the index DN[i,j] indicating the diagonal similarity, and classifies the specific intensity of the similarity manifesting at the pixel undergoing the interpolation processing as one of cases 1 through 9 below.

case 1: (HV[i,j],DN[i,j])=(1,1): marked similarity manifests along the vertical direction and the diagonal 45° direction case 2: (HV[i,j],DN[i,j])=(1,0): marked similarity manifests along the vertical direction case 3: (HV[i,j],DN[i,j])=(1,−1): marked similarity manifests along the vertical direction and the diagonal 135° direction case 4: (HV[i,j],DN[i,j])=(0,1): marked similarity manifests along the diagonal 45° direction case 5: (HV[i,j],DN[i,j])=(0,0): marked similarity manifests along all directions or only a low degree of similarity manifests in all directions (a specific direction along which marked similarity manifests cannot be ascertained)

case 6: (HV[i,j],DN[i,j])=(0,−1): marked similarity manifests along the diagonal 135° direction case 7: (HV[i,j],DN[i,j])=(−1,1): marked similarity manifests along the horizontal direction and the diagonal 45° direction case 8: (HV[i,j],DN[i,j])=(−1,0): marked similarity manifests along the horizontal direction case 9: (HV[i,j],DN[i,j])=(−1,−1): marked similarity manifests along the horizontal direction and the diagonal 135° direction FIG. 14 shows directions along which marked similarity manifests, each corresponding to a specific set of values set for HV[i,j]0 and DN[i,j].

Next, the G interpolation value G[i,j] is calculated as indicated below, based upon the results of the judgment described above.

| | | |
|---|---|---|
| In case 1: $G[i,j]=Gv45$ | | expression 40 |
| In case 2: $G[i,j]=Gv$ | | expression 41 |
| In case 3: $G[i,j]=Gv135$ | | expression 42 |
| In case 4: $G[i,j]=(Gv45+Gh45)/2$ | | expression 43 |
| In case 5: $G[i,j]=(Gv+Gh)/2$ | | expression 44 |
| In case 6: $G[i,j]=(Gv135+Gh135)/2$ | | expression 45 |
| In case 7: $G[i,j]=Gh45$ | | expression 46 |
| In case 8: $G[i,j]=Gh$ | | expression 47 |
| In case 9: $G[i,j]=Gh135$ | | expression 48 | with $Gv=(G[i,j-1]+G[i,j+1])/2+(2\cdot Z[i,j]-Z[i,j-2]-Z[i,j+2])/8+(2\cdot G[i-1,j]-G[i-1,j-2]-G[i-1,j+2]+2\cdot G[i+1,j]-G[i+1,j-2]-G[i+1,j+2])/16$     expression 50

$Gv45=(G[i,j-1]+G[i,j+1])/2+(2\cdot Z[i,j]-Z[i,j-2]-Z[i,j+2])/8+(2\cdot Z[i-1,j+1]-Z[i-1,j-1]-Z[i-1,j+3]+2\cdot Z[i+1,j-1]-Z[i+1,j-3]-Z[i+1,j+1])/16$     expression 51

$Gv135=(G[i,j-1]+G[i,j+1])/2+(2\cdot Z[i,j]-Z[i,j-2]-Z[i,j+2])/8+(2\cdot Z[i-1,j-1]-Z[i-1,j-3]-Z[i-1,j+1]+2\cdot Z[i+1,j+1]-Z[i+1,j-1]-Z[i+1,j+3])/16$     expression 52

$Gh=(G[i-1,j]+G[i+1,j])/2+(2\cdot Z[i,j]-Z[i-2,j]-Z[i+2,j])/8+(2\cdot G[i,j-1]-G[i-2,j-1]-G[i+2,j-1]+2\cdot G[i,j+1]-G[i-2,j+1]-G[i+2,j+1])/16$     expression 53

$Gh45=(G[i-1,j]+G[i+1,j])/2+(2\cdot Z[i,j]-Z[i-2,j]-Z[i+2,j])/8+(2\cdot Z[i+1,j-1]-Z[i-1,j-1]-Z[i+3,j-1]+2\cdot Z[i-1,j+1]-Z[i-3,j+1]-Z[i+1,j+1])/16$     expression 54

$Gh135=(G[i-1,j]+G[i+1,j])/2+(2\cdot Z[i,j]-Z[i-2,j]-Z[i+2,j])/8+(2\cdot Z[i-1,j-1]-Z[i-3,j-1]-Z[i+1,j-1]+2\cdot Z[i+1,j+1]-Z[i-1,j+1]-Z[i+3,j+1])/16$     expression 55

It is to be noted that the arithmetic operations defined in expressions 50 through 55 are each equivalent to correcting the average value of the green color component (corresponds to the first term in each expression) by using correction terms (corresponds to the second and third terms in each expression) each constituted of a quadratic differential (a second derivative).

Once the G interpolation value is calculated as explained above, the image processing unit 11 calculates an R interpolation value (an interpolation value for the red color component) and a B interpolation value (an interpolation value for the blue color component).

First, the image processing unit 11 generates color differences corresponding to the specific color components of the pixels at each of which color information corresponding to the red color component or color information corresponding to the blue color component is present based upon the results of the judgment on the vertical/horizontal similarity and obtains through interpolation the color difference corresponding to the missing color component for each pixel at which color information corresponding to the red color component or color information corresponding to the blue color component is not present (FIG. 7, S2).

It is to be noted that the image processing unit 11 also executes low-pass filter processing for applying a low-pass filter to the color differences at the individual pixels in addition to the calculation of the color difference interpolation values so as to reduce the extent of color artifacts attributable to color moire occurring over an area where the image includes a periodic structure, as in the "color judgment image generation processing".

Since the color differences can be generated or obtained through interpolation in a manner similar to that with which the color judgment image is generated (expressions 5 through 8) in step S3 in FIG. 4, a detailed explanation is omitted. However, while the color differences are generated by using the index HV[i,j] set in correspondence to the different color similarity factors during the color judgment image generation, the color differences are generated in this processing by using the index HV[i,j] reset in correspondence to the same color similarity factors for pixels each classified as a lightly saturated image portion or a saturated image portion in the "color judgment processing".

In addition, by storing the color differences generated or obtained through interpolation into the storage area in which the color judgment image has been stored, it is possible to reduce the size of the storage area required during the interpolation processing. However, it is to be noted that when reducing the size of the storage area in this manner, it is necessary to initialize the storage area in which the color judgment image has been stored as preliminary processing preceding the "interpolation value calculation processing".

Next, the image processing unit 11 calculates the R interpolation value and the B interpolation value through the arithmetic operations expressed in expressions 60 and 61 presented below by using the color differences and the color information corresponding to the green color component (it may be a G interpolation value) (FIG. 7, S3). While the arithmetic operations defined in expressions 60 and 61 only need to be executed for pixels at which color information corresponding to the red color component or color information representing blue color component is missing when directly utilizing the original color information corresponding to the red color component or the original color information corresponding to the blue color component, the arithmetic operations defined in expressions 60 and 61 must be executed for all the pixels in the first embodiment since the color difference signals are corrected so as to reduce the extent of color artifacts attributable to color moire occurring over image areas that include periodic image structures.

$$R[i,j]=Cr[i,j]+G[i,j] \quad \text{expression 60}$$

$$B[i,j]=Cb[i,j]+G[i,j] \quad \text{expression 61}$$

As explained above, the first embodiment, which enables a calculation of a highly reliable color index, makes it possible to realize a type of interpolation processing that has not been achieved in the related art, i.e., interpolation processing through which a fine image structure can be successfully restored and, at the same time, defects such as false image structures and color artifacts (false color) can be effectively minimized, by using the color index in the similarity judgment.

It is to be noted that while an image constituted of color components (the Cr component and the Cb component in a colorimetric system other than the RGB colorimetric system is generated as the color judgment image in the first embodiment, the color judgment image may be instead an image constituted of the three color components R, G and B, calculated through interpolation processing in the related art or through expressions 60 and 61. However, if an image constituted of the three color components R, G and B is used as the color judgment image, an arithmetic operation expressed in expression 10' below instead of expression 10 must be executed.

$$Cdiff0[i,j]=(|R[i,j]-G[i,j]|+|B[i,j]-G[i,j]|+|R[i,j]-B[i,j]|)/3 \quad \text{expression 10'}$$

Namely, a color index is obtained by using the color hues between different color components within the same pixel calculated as |R[i,j]−G[i,j]|, |B[i,j]−G[i,j]| and |R[i,j]−B[i,j]| in expression 10'.

Second Embodiment

The following is an explanation of the second embodiment.

Since the only difference between the second embodiment and the first embodiment is in the "interpolation value calculation processing" executed by the image processing unit 11 and the other aspects of the processing executed in the second embodiment are all identical to those in the first embodiment, the following explanation focuses on the "interpolation value calculation processing" and a repeated explanation of the other processing operations is not provided. It is to be noted that the "interpolation value calculation processing" as referred to in this context includes image processing such as filtering executed following the interpolation value calculation.

Figure 15:
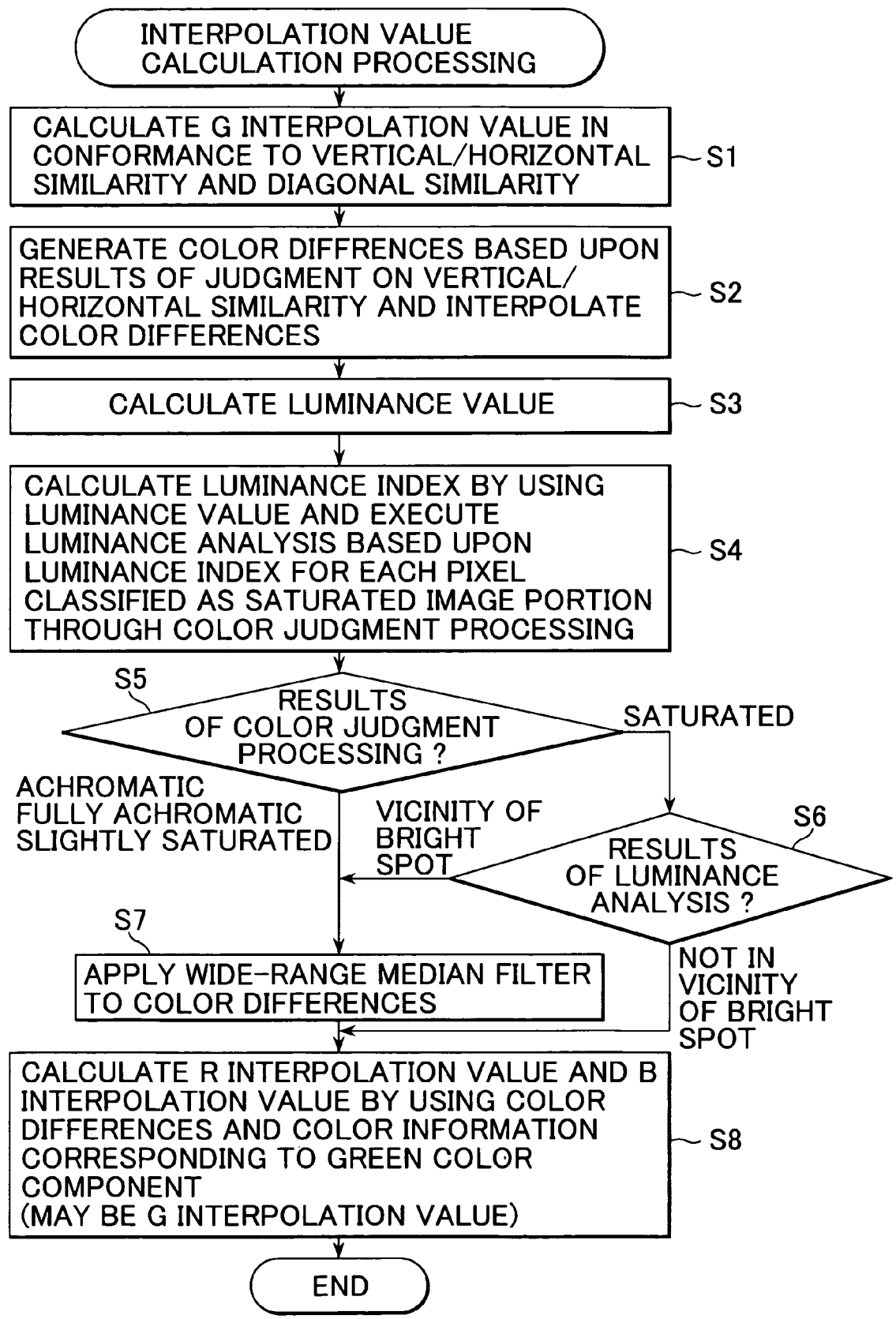
FIG. 15 presents a flowchart of an operation executed in the image processing unit in the second embodiment.

FIG. 15 presents a flowchart of a specific operation, i.e., the "interpolation value calculation processing", executed by the image processing unit 11 in the second embodiment.

It is inevitable that the phenomenon of color artifacts occurs due to color filter array sampling at the image capturing sensor regardless of the type of interpolation processing, including that executed in the first embodiment, is implemented. Under normal circumstances, the extent of such color artifacts is reduced by applying a median filter having a wide range of approximately 5×5 to color differences or the hue values of "a" and "b" planes, for instance, obtained by converting the image data to image data in a Lab colorimetric system. However, there is also a disadvantage to applying a wide-range median filter over the entire image plane in that fine color structures in saturated image portions are lost.

Accordingly, in the "interpolation value calculation processing" executed in the second embodiment, a wide-range median filter is adaptively applied only to image portions that require such median filtering.

The concepts of the "achromatic area median" and the "bright spot vicinity median" are explained.

(Achromatic Area Median)

Applying a median filter to color hue values normally equates to achromatizing the hue values of color artifacts manifesting in close proximity to each other and complementary to each other by replacing the hue values with a median value, and through such achromatization, the extent of color artifacts can be reduced. Thus, if color artifacts having occurred in a nearly achromatic image area are achromatized, no adverse effect results.

For instance, while color artifacts may be effectively eliminated by applying a median filter with a wide range of approximately 5×5 to the hues, it has been proved through experiment that the adverse effect of such a wide-range median filter manifests in areas (saturated image areas) for which "c" is set in the color classification index BW through the "color judgment processing" in the first embodiment.

Accordingly, it is desirable to adaptively apply the median filter to areas with colors that are almost achromatic based upon the corresponding color indices.

In the following explanation, the application of a wide-range median filter to hues in an area which is not a saturated (chromatic) image area is referred to as "achromatic area median".

(Bright Spot Vicinity Median)

Color artifacts that cannot be completely eliminated by using the "achromatic area median" described above alone among color artifacts which pose problems under normal circumstances includes color artifacts that remains around a bright, isolated white spot (hereafter referred to as bright spot vicinity). The extent of such color artifacts, too, can be reduced by applying a wide-range median filter to the hues.

Accordingly, in the second embodiment, processing during which a wide-range median filter is applied to hues in bright spot vicinities as well as in areas other than saturated image areas as described above, is executed. A bright spot vicinity is detected by using luminance (or brightness) indices which are obtained independently of the color index used in the "achromatic area median" processing.

It is to be noted that in the following explanation, the application of a wide-range median filter to hues in the bright spot vicinity is referred to as a "bright spot vicinity median". The detection of a bright spot vicinity is executed by taking advantage of the following characteristics of bright spot vicinities.

There is at least one pixel with a high luminance value present in the vicinity.

The extent to which the luminance fluctuates due to the image structure is far greater compared to other image areas.

(Interpolation Value Calculation Processing)

The following is an explanation of the operations executed in the "interpolation value calculation processing in the second embodiment."

First, the image processing unit 11 calculates the G interpolation value in conformance to the vertical/horizontal similarity and the diagonal similarity as in step S1 in FIG. 7, in the first embodiment (FIG. 15, S1).

In addition, the image processing unit 11 generates color differences corresponding to the specific color components of the pixels at each of which color information corresponding to the red color component or color information corresponding to the blue color component is present based upon the results of the judgment on the vertical/horizontal similarity and obtains through interpolation the color difference corresponding to the missing color component for each pixel at which at least color information corresponding to the red color component or color information corresponding to the blue color component is not present as in FIG. 7, S2 (FIG. 15, S2). It is to be noted that in the first embodiment, low pass processing is also executed on the color differences.

Next, the image processing unit 11 calculates a luminance value by using the color differences and the color information corresponding to the green color component (FIG. 15, S3).

For instance, the image processing unit 11 may calculate the luminance value $Y[i,j]$ through an arithmetic operation expressed in expression 70 below.

$$Y[i,j]=(Cr[i,j]+4 \cdot G[i,j]+Cb[i,j])/4 \quad \text{expression 70}$$

It is to be noted that the arithmetic operation defined in expression 70 is equivalent to calculating the luminance value at an RGB ratio of R:G:B=1:2:1.

Next, the image processing unit 11 calculates a "luminance index" based upon the luminance value only for each of the pixels having been classified as saturated image portions (pixels for which "c" is set in the color classification index BW) through the "color judgment processing", which require additional median filter processing, and executes a luminance analysis based upon the "luminance index", so as to reduce the volume of bright spot vicinity detection processing (FIG. 15, S4).

It is to be noted that in this example, the luminance analysis is executed by using the luminance index that includes two values, i.e., the maximum value max among the luminance values of a plurality of pixels within a local area surrounding each pixel and a local variance value var of the luminance values of the plurality of pixels, and the color classification index $BW[i,j]$ is set based upon the results of the luminance analysis.

First, the image processing unit 11 calculates the luminance indices max and var through arithmetic operations executed by using expressions 71 through 73 presented below for each of pixels with respect to which condition 40 indicated below is achieved.

$$BW[i,j]='c' \quad \text{condition 40}$$

$$\text{max}=\text{Max\_of } \{Y[i,j],Y[i,j-1],Y[i,j+1],Y[i-1,j],Y[i+1,j],Y[i-1,j-1],Y[i+1,j-1],Y[i-1,j+1],Y[i+1,j+1]\} \quad \text{expression 71}$$

It is to be noted that Max_of { } indicates a function used to calculate the maximum value among the plurality of luminance values.

$$\text{ave}=(Y[i,j]+Y[i,j-1]+Y[i,j+1]+Y[i-1,j]+Y[i+1,j]+Y[i-1,j-1]+Y[i+1,j-1]+Y[i-1,j+1]+Y[i+1,j+1])/9 \quad \text{expression 72}$$

$$\text{var}=(Y[i,j-1]-\text{ave})^2+(Y[i,j+1,]-\text{ave})^2+(Y[i-1,j]-\text{ave})^2+(Y[i+1,j]-\text{ave})^2+(Y[i-1,j-1]-\text{ave})^2+(Y[i+1,j-1]-\text{ave})^2+(Y[i-1,j+1]-\text{ave})^2+(Y[i+1,j+1]-\text{ave})^2)/9 \quad \text{expression 73}$$

Next, the image processing unit 11 judges that any pixel whose luminance indices max and var satisfy a condition expressed as;

$$\text{max}>\text{ThLmax and var}>\text{ThLdev}^2 \quad \text{condition 41}$$

is in a bright spot vicinity and sets "m" for the color classification index $BW[i,j]$. It is to be noted that when the gradation of the luminance indices is indicated within the range of 0 through 255, the threshold value ThLmax should preferably be set to, for instance, approximately 220 and the threshold value $\text{ThLdev}^2$ should preferably be set to, for instance, approximately $45^2$.

"c" is continuously set and no setting adjustment is made for the color classification index $BW[i,j]$ of pixels that do not satisfy condition 41 (these pixels are not in bright spot vicinities).

Figure 16:
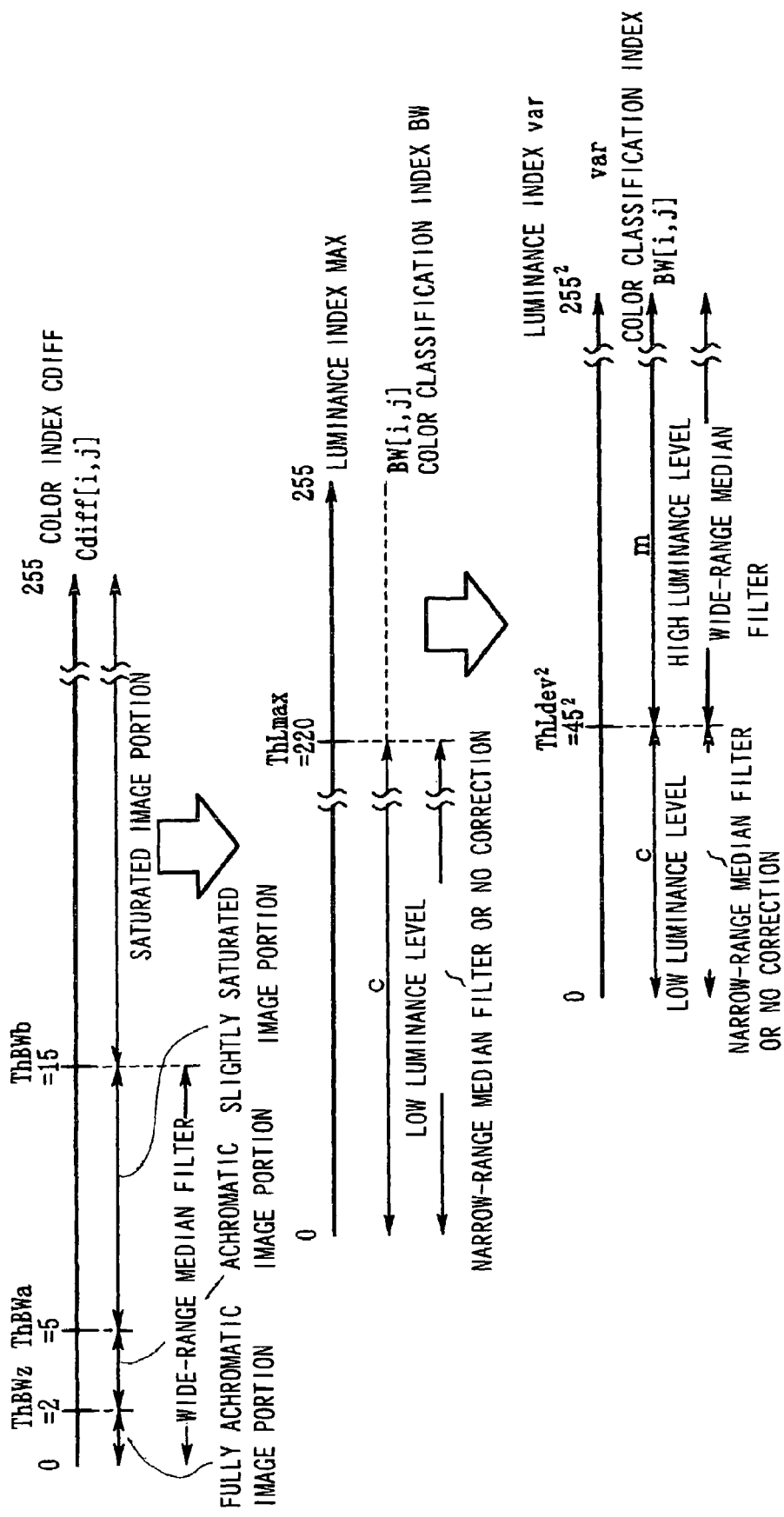
FIG. 16 shows the relationship between the color index and the luminance indices.

FIG. 16 shows the relationship between the color index and the luminance indices.

Next, the image processing unit 11 ascertains the results of the "color judgment processing" (FIG. 15, S5) and ascertains the results of the luminance analysis with regard to the pixels classified as saturated image portions based upon the results of the "color judgment processing" (FIG. 15, S6).

Then, the image processing unit 11 applies to a wide-range median filter to the color differences of pixels having been classified as fully achromatic image portions, achromatic image portions and lightly saturated image portions based upon the results of the "color judgment processing" (pixels each having "z", "a" or "b" set for the color classification index BW thereof) in the "achromatic area median processing", and applies a wide-range median filter to the color differences of pixels having been classified as bright spot vicinity image portions based upon the results of the luminance analysis (pixels each having "m" set for the color classification index BW thereof) in the "bright spot vicinity median" processing (FIG. 15, S7).

For instance, the image processing unit 11 may achieve processing for applying a wide-range median filter to the color differences of each of the pixels that satisfy condition 42 indicated below by recalculating its color differences Cr[i,j] and Cb[i,j] through arithmetic operations defined in the following expressions 74 and 75.

$$BW[i,j] \neq \text{'c'} \qquad \text{condition 42}$$

$$Cr[i,j]=\text{Median\_of } \{Cr[i,j],Cr[i,j-2],Cr[i,j+2],Cr[i-2,j],Cr[i+2,j],Cr[i-2,j-2],Cr[i+2,j-2],Cr[i-2,j+2],Cr[i+2,j+2]\} \qquad \text{expression 74}$$

$$Cb[i,j]=\text{Median\_of } \{Cb[i,j],Cb[i,j-2],Cb[i,j+2],Cb[i-2,j],Cb[i+2,j],Cb[i-2,j-2],Cb[i+2,j-2],Cb[i-2,j+2],Cb[i+2,j+2]\} \qquad \text{expression 75}$$

It is to be noted that Median_of { } above indicates a function used to calculate the median value of a plurality of elements and that Cr on the left side represents a value which is temporarily obtained by buffering the results of the arithmetic operation expressed on the right-hand side over the entire pixels and is then used for substitution on the Cr plane.

While the arithmetic operations expressed in expressions 74 and 75 are equivalent to applying a median filter over the range indicated in FIG. 17(a), the processing for applying a wide-range median filter to the color differences may instead be realized by applying a median filter over the range indicated in FIG. 17(b) so as to achieve a higher speed.

Next, the image processing unit 11 calculates the R interpolation value and the B interpolation value as in FIG. 7, S3 in the first embodiment (FIG. 15, S8).

Thus, since the R interpolation value and the B interpolation value are calculated for the individual pixels by using the color differences to which a wide-range median filter has been adaptively applied, the occurrence of color artifacts attributable to the interpolation processing can be reduced while preventing any loss of fine color structures in saturated image areas in the second embodiment.

Figure 18:
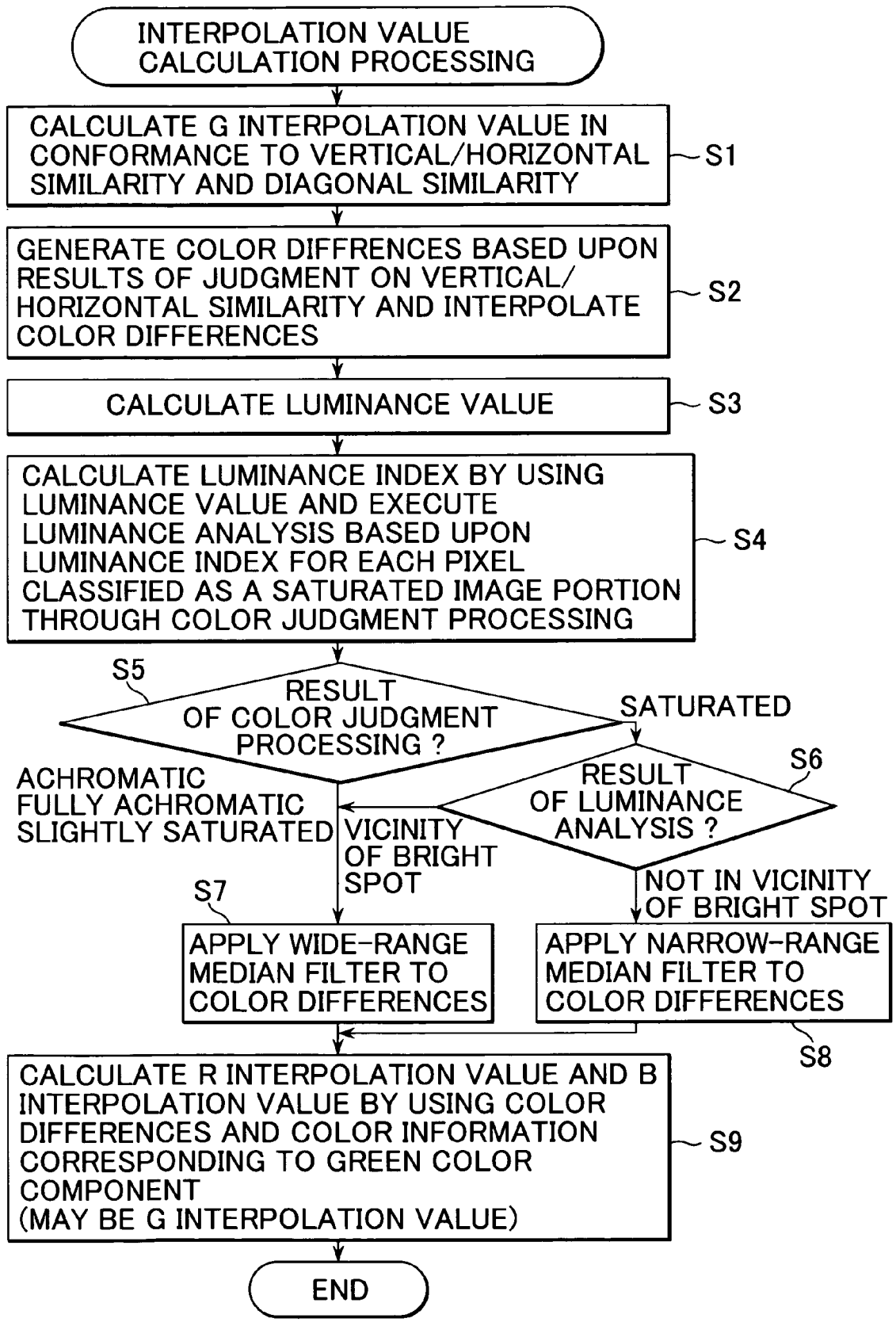
FIG. 18 presents another example of the interpolation value calculation processing that may be executed in the second embodiment.

It is to be noted that while the color differences of a pixel having been classified as an image portion other than a bright spot vicinity through the luminance analysis are directly used for the calculation of the R interpolation value and the B interpolation value without applying any wide-range median filter in the second embodiment, they may instead undergo processing during which a narrow-range median filter is applied to them as in FIG. 18, S8 first and then may be used for the calculation of the R interpolation value and the B interpolation value. In other words, the interpolation processing may be achieved by executing the "interpolation value calculation processing" shown in FIG. 18 instead of the interpolation value calculation processing shown in FIG. 15.

For instance, the processing for applying a narrow-range median filter to the color differences of each pixel having been classified as an image portion other than a bright spot vicinity may be realized by recalculating the color differences Cr[i,j] and Cb[i,j] of pixels that satisfy the following condition 43 through the arithmetic operations expressed in expressions 76 and 77 below.

$$BW[i,j]=\text{'c'} \qquad \text{condition 43}$$

$$Cr[i,j]=\text{Median\_of } \{Cr[i,j],Cr[i,j-1],Cr[i,j+1],Cr[i-1,j],Cr[i+1,j],Cr[i-1,j-1],Cr[i+1,j-1],Cr[i-1,j+1],Cr[i+1,j+1]\} \qquad \text{expression 76}$$

$$Cb[i,j]=\text{Median\_of } \{Cb[i,j],Cb[i,j-1],Cb[i,j+1],Cb[i-1,j],Cb[i+1,j],Cb[i-1,j-1],Cb[i+1,j-1],Cb[i-1,j+1],Cb[i+1,j+1]\} \qquad \text{expression 77}$$

While the arithmetic operations expressed in expressions 76 and 77 are equivalent to applying a median filter over the range indicated in FIG. 17(c), the processing for applying a narrow-range median filter to the color differences may instead be realized by applying a median filter over the range indicated in FIG. 17(d) so as to achieve a higher speed.

The interpolation processing which includes the "interpolation value calculation processing" shown in FIG. 18 is particularly effective if executed in a situation in which noticeable color artifacts would manifest over saturated image areas after the interpolation processing that includes the "interpolation value calculation processing" shown in FIG. 15.

In addition, while median filters are adaptively applied to the color differences based upon the results of the color judgment and the luminance analysis in the second embodiment, such median filter processing can be implemented in a similar manner as additional correcting processing for an image having undergone image restoration processing achieved through the interpolation technology in the related art and executed by using data obtained at a single-substrate image-capturing sensor. However, when executing such additional correction processing subsequently, the color judgment image should be generated with the color information of the image having undergone the image restoration processing and the color index should be calculated by using this color judgment image. The image having undergone image restoration processing that will benefit from the additional correction processing may be an image obtained through image restoration processing executed by using data generated at a 2-substrate type image-capturing sensor, an image obtained through image restoration processing executed by using data at a Y:Cb:Cr ratio of 4:1:1 or the like.

Third Embodiment

The following is an explanation of the third embodiment.

Since the only difference between the third embodiment and the first and second embodiments is in the "color judgment processing" executed by the image processing unit 11 and the other aspects of the processing executed in the second embodiment are all identical to those in the first and second embodiments, the following explanation focuses on the "color judgment processing" and a repeated explanation of the other processing operations is not provided.

Figure 19:
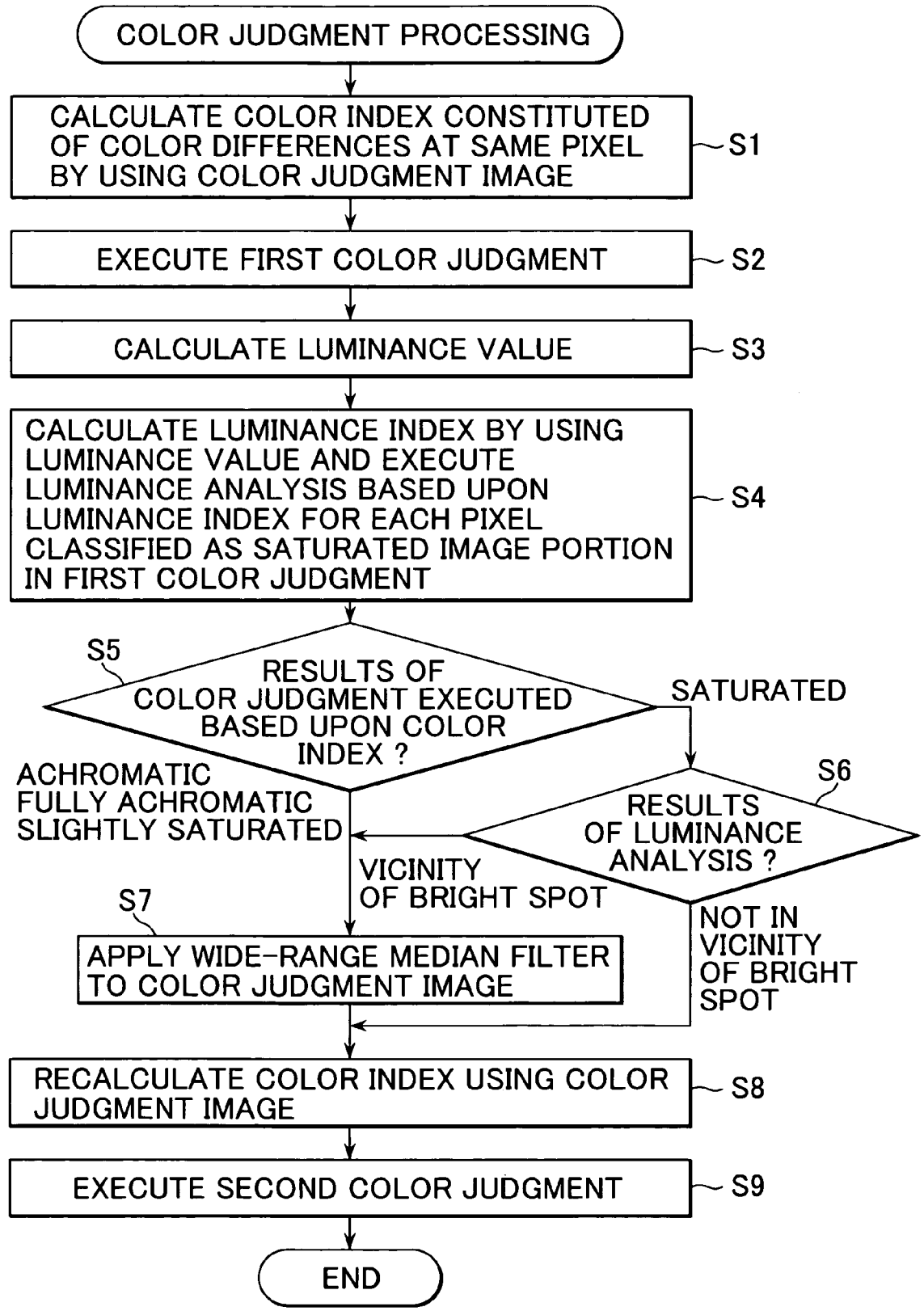
FIG. 19 presents a flowchart of an operation executed in the image processing unit in the third embodiment.

FIG. 19 presents a flowchart of a specific operation, i.e., the "color judgment processing", executed by the image processing unit 11 in the third embodiment.

There is still a risk that an achromatic image portion is erroneously judged to be a saturated portion because of color artifacts occurring in the color judgment image in the "color judgment processing" executed in the first embodiment in which the color index is calculated by using the color judgment image generated through the "color judgment image generation processing" and the color judgment is made based upon the color index. For instance, a pixel which should be classified as an achromatic image portion and accordingly should undergo a vertical/horizontal similarity judgment by using the different color similarity factors may be erroneously classified as a saturated image portion due to the occurrence of color artifacts such as color moire and thus, its vertical/horizontal similarity may be judged based upon the same color similarity factors.

Accordingly, in the "color judgment processing" in the third embodiment, the method explained in reference to the second embodiment is also adopted in conjunction with the "color judgment image" and the color judgment is executed twice, so as to improve the accuracy of the similarity judgment.

(Color Judgment Processing)

The following is an explanation of the operation executed in the "color judgment processing" in the third embodiment, given in reference to FIG. 19.

First, the image processing unit 11 calculates a color index Cdiff as in FIG. 5, S1 in the first embodiment by using the color judgment image generated through the "color judgment image generation processing" (FIG. 19, S1).

In addition, the image processing unit 11 executes a first color judgment based upon the color index Cdiff[i,j] calculated for each pixel (FIG. 19, S2) as in FIG. 5, S2 in the first embodiment and sets a color classification index BW[i,j].

Next, the image processing unit 11 calculates a G interpolation value to enable calculation of a luminance value, and then calculates the luminance value by using a G plane image, which is constituted of the G interpolation value and the original color information corresponding to the green color component, and the color judgment images (Cr, Cb plane images) (FIG. 19, S3).

For instance, the image processing unit 11 calculates the average of the values indicated by the color information corresponding to the green color component at the adjacent pixels as the G interpolation value of each pixel at which color information corresponding to the green color component is missing. It is to be noted that the G interpolation value may instead be calculated as in the related art. In addition, the luminance value Y[i,j] should be calculated through an arithmetic operation similar to that expressed in expression 70 used in the second embodiment.

Next, the image processing unit 11 calculates the luminance indices by using the luminance value as in FIG. 15, S4 in the second embodiment for each pixel having been classified as a saturated image portion in the first color judgment (each pixel having "c" set in the color classification index BW thereof) and executes a luminance analysis based upon the luminance indices (FIG. 19, S4).

Next, the image processing unit 11 executes a color judgment based upon the color index Cdiff (FIG. 19, S5) and ascertains the results of the luminance analysis for each pixel having been classified as a saturated image portion based upon the results of the color judgment (FIG. 19, S6).

Then, the image processing unit 11 executes processing for applying wide-range median filters to the color differences constituting the color judgment image, through arithmetic operations similar to those expressed in expressions 74 and 75 used in the second embodiment for pixels having been classified as fully achromatic image portions, achromatic image portions and lightly saturated image portions based upon the results of the color judgment (pixels each having "z", "a" or "b" set in the color classification index BW thereof) and pixels having been classified as bright spot vicinities based upon the results of the luminance analysis (pixels each having "m" set in the color classification index BW thereof) (FIG. 19, S7).

Next, the image processing unit 11 recalculates the color index Cdiff as in FIG. 5, S1 in the first embodiment (FIG. 19, S8).

In addition, the image processing unit 11 executes a second color judgment as in FIG. 5, S2 in the first embodiment based upon the recalculated color index Cdiff (FIG. 19, S9) and resets the color classification index BW.

Namely, the color index Cdiff is recalculated by using the color judgment image having undergone the adaptive median filter processing and the second color judgment is executed based upon the recalculated color index Cdiff in the third embodiment. Consequently, pixels having been erroneously classified as saturated image portions in the first color judgment due to color artifacts manifesting in the color judgment image can be correctly classified as achromatic image portions through the second color judgment.

Thus, in the third embodiment, the occurrence of the error in which the vertical/horizontal similarity of a pixel that should be classified as an achromatic image portion is judged by using the same color similarity factors by mistake and the occurrence of the error in which the vertical/horizontal similarity of a pixel that should be classified as a saturated image portion is not correctly judged by using the same color similarity factors can be reduced in the "similarity judgment processing". As a result, the accuracy of the similarity judgment executed during the interpolation processing improves and the occurrence of color artifacts can be reduced.

Figure 20:
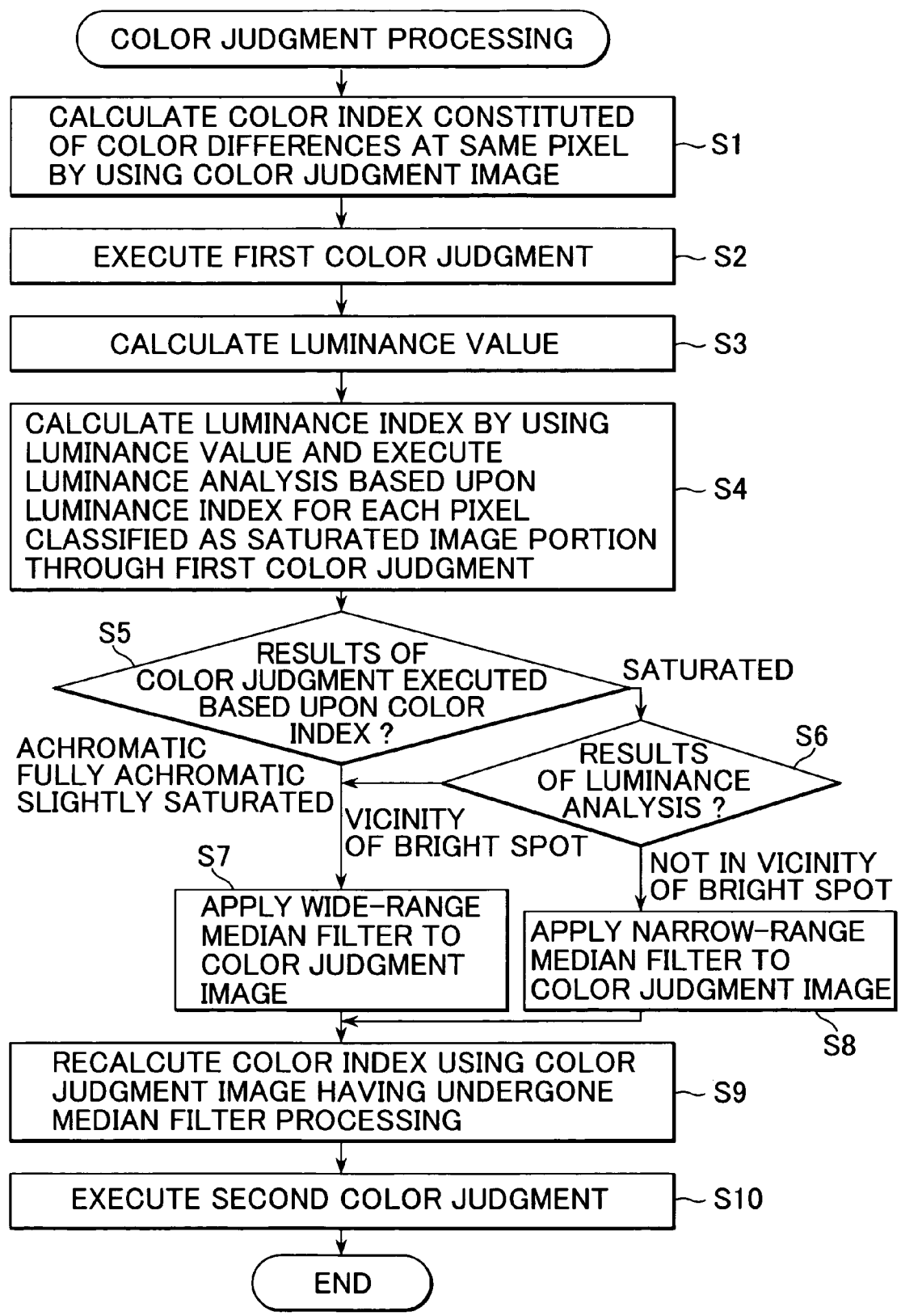
FIG. 20 presents another example of the judgment processing that may be executed in the third embodiment.

It is to be noted that while the color differences of a pixel having been classified as an image portion other than a bright spot vicinity image through the luminance analysis are directly used to generate the color judgment image without applying any wide-range median filter in the third embodiment, they may instead undergo processing during which a narrow-range median filter is applied to them as in FIG. 20, S8 and then used to generate the color judgment image. In other words, the interpolation processing may be achieved by executing the "color judgment processing" shown in FIG. 20 instead of the color judgment processing shown in FIG. 19. For instance, processing for applying a narrow-range median filter to the color differences of each pixel having been classified as an image portion other than a bright spot vicinity image may be realized by recalculating the color differences Cr[i,j] and Cb[i,j] of pixels that satisfy the condition 43 through the arithmetic operations expressed in expressions 76 and 77 presented earlier.

Furthermore, while bright spot vicinity median pixels are additionally extracted through the luminance analysis in the third embodiment, a higher priority may be given to faster processing by using achromatic area median pixels alone, and in such a case, the necessity for calculating the luminance value (FIG. 19, S3) or executing the luminance analysis (FIG. 19, S4 and S6) is eliminated to simplify the "color judgment processing".

Fourth Embodiment

No illustrates are provided with respect to the fourth embodiment and its explanation provided below focuses on the "G interpolation value calculation processing" executed by the image processing unit 11, since the fourth embodiment only differs from the preceding embodiments described earlier in the "G interpolation value calculation processing" (S1 in FIG. 7, S1 in FIG. 15) executed as part of the "interpolation value calculation processing" by the image processing unit.

There is a problem in the related art technology in that Nyquist frequency level fine structures such as check patterns are not reflected in the interpolation values. Such fine structures in the image can be restored by replacing the interpolation values with the original color information. However, while such a replacement is effective over areas containing Nyquist frequency level fine image structures, an indiscriminate replacement is likely to cause highly undesirable consequences (such as breakdown of the image).

Accordingly, in the fourth embodiment, the interpolation values are replaced with the original color information only over areas that require such a replacement. However, since a full replacement of an interpolation value of the pixel undergoing the interpolation processing with the original color information initially present at the pixel may sometimes result in the Nyquist frequency level fine image structure becoming too noticeable, and for this reason, an acceptable level of continuity with the surrounding image structure is assured in the fourth embodiment by using the average of the interpolation value calculated through any of the embodiments explained earlier and the value indicated in the original color information as the interpolation value of the interpolation target pixel. Hereafter, the term "replacement interpolation" is used to collectively refer to both a full replacement and an interpolation value calculation executed through a partial replacement corresponding to a specific ratio.

Now, an explanation is given with regard to areas for which the "replacement interpolation" should be executed.

While areas over which the "replacement interpolation" can be executed include fully achromatic image areas, these areas have been proven through experiment to correspond to areas (fully achromatic areas) containing pixels with "z" set in the color classification index BW thereof through the "color judgment processing" executed in the first embodiment or the third embodiment. It is to be noted that since strict control is implemented to ensure that the color differences of pixels in areas with "z" set for the color classification index BW thereof are never higher than 2 when the gradations of the color differences are within the range of 0 through 255, the "replacement interpolation" is only allowed to be executed for areas manifesting color differences which are less than 1% of the maximum gradation.

It is to be noted that the vertical/horizontal similarity at fully achromatic image portions is judged by using the different color similarity factors in the embodiments explained earlier and that since the image structure in a given area for which the direction(s) along which marked similarity manifests is identified through such a judgment is highly likely to be a fine structure with a longer cycle frequency than the Nyquist frequency, information indicating the irregularity (or curvature) in the fine image structure can be considered to be reflected in the interpolation values through the correction terms in expressions 50 through 55.

Namely, areas that require the "replacement interpolation" are limited to those areas for which a specific direction along which marked similarity manifests cannot be identified (pixels classified as case 5 through the "similarity judgment processing") among the fully achromatic areas.

(G Interpolation Value Calculation Processing)

The following is an explanation of the "G interpolation value calculation processing" executed in the fourth embodiment.

First, after the "color judgment processing" (S1 and S2 in FIG. 5, S1 through S11 in FIG. 19) and the "similarity judgment processing" (FIG. 6, S1 through S5) are completed, the image processing unit 11 ascertains the exact value set for the index HV[i,j] indicating the vertical/horizontal similarity and the index DN[i,j] indicating the diagonal similarity and classifies the type of the similarity manifesting at the interpolation target pixel as one of; case 1 through case 9, as in the first embodiment.

Then, the image processing unit 11 calculates the G interpolation values G[i,j] for interpolation target pixels classified as cases 1 through 4 and cases 6 through 9 respectively through arithmetic operations expressed in expressions 40 through 43 and expressions 45 through 49 used in the first embodiment.

In addition, the image processing unit 11 makes a decision as to whether or not each of the interpolation target pixels classified as case 5 has been classified as a fully achromatic image portion based upon the results of the color judgment (equivalent to making a decision as to whether or not "z" is set in the color classification index BW).

Then, the image processing unit 11 executes the "replacement interpolation" for each pixel having been classified as case 5 and also classified as a fully achromatic image portion by calculating the G interpolation value G[i,j] through an arithmetic operation expressed in expression 80 presented below. In addition, the image processing unit 11 calculates the G interpolation value G[i,j] for each pixel having been classified as case 5 but also classified as an image portion other than a fully achromatic image portion through expression 44 used in the first embodiment.

$$G[i,j]=(Z[i,j]+(Gv+Gh))/2 \qquad \text{expression 80}$$

Gv and Gh above are the values calculated through expressions 50 and 53 respectively.

As explained above, Nyquist frequency level fine image structures can be restored through the "replacement interpolation" which is executed adaptively in the fourth embodiment.

It is to be noted that while the average value of an interpolation value calculated in any of the preceding embodiments and the value indicated in the original color information is used as an interpolation value of the interpolation target pixel in the fourth embodiment, the interpolation value of the interpolation target pixel may instead be completely replaced with the value indicated in the original color information initially present at the pixel if low-pass filtering is executed for the green color component or the luminance component after the interpolation processing is completed since an averaging operation is executed in such a case.

Fifth Embodiment

The following is an explanation of the operations executed in the fifth embodiment.

It is assumed that an image processing program (an image processing program that executes interpolation processing in a manner similar to that with which the interpolation processing is executed by the image processing unit 11 in one of the embodiments explained earlier) recorded in a recording medium such as a CDROM 28 is pre-installed at a PC 18. Namely, such an image processing program is stored in a hard disk (not shown) within the PC 18 in an execution-enabled state in which the program can be executed by the CPU (not shown).

The following is an explanation of the operations executed in the fifth embodiment, given in reference to FIG. 1.

As the photographing mode has been selected by the operator and the shutter release button has been pressed via the operation unit 24 in the electronic camera 1, image signals having been generated at the image-capturing sensor 21 and having undergone a specific type of analog signal processing at the analog signal processing unit 22 are digitized at the A/D conversion unit 10, and thus, the digital image signals are provided as image data to the image processing unit 11. The image processing unit 11 executes image processing such as gradation conversion and γ correction on the image data thus provided. Upon completion of the image processing, the image data are recorded into the memory card 16 via the memory card interface unit 17.

Next, in response to an instruction for an image data transfer issued by the PC 18 via the external interface unit 19 while the current mode selected by the operator via the operation unit 24 is a PC communication mode, the electronic camera 1 reads out the image data corresponding to the instruction from the memory card 16 via the memory card interface unit 17. Then, it provides the image data thus read out to the PC 18 via the external interface unit 19.

Upon receiving the image data thus provided, the CPU (not shown) inside the PC 18 executes the image processing program. It is to be noted that the image data having undergone the interpolation processing in conformance to the image processing program in this manner may be compressed as necessary and recorded into a hard disk (not shown) or they may be converted to the colorimetric system adopted at the monitor 26 or the printer 27 and be provided to the corresponding device.

As explained above, interpolation processing similar to the interpolation processing achieved in any of the embodiments explained earlier can be realized on the PC 18 in the fifth embodiment.

It is to be noted that the CPU (not shown) inside the PC 18 may read out image data from the memory card 16 and execute the image processing program when the memory card 16 having the image data recorded therein as described above is loaded into the PC.

Furthermore, such an image processing program may be downloaded to the PC 18 accessing a specific homepage via the Internet.

Moreover, instead of executing the image processing program on the PC 18, it may be executed at a remote server or the like connected via the Internet or the like. In this case, the PC 18 only needs to transfer image data provided by the electronic camera 1 to a server or the like capable of executing the image processing program via the Internet or the like to have interpolation processing similar to the interpolation processing in any of the embodiments explained earlier executed on the image data.

In addition, while an explanation is given above in reference to the embodiments on an example in which the interpolation processing is executed on an image expressed in the RGB colorimetric system with color information corresponding to one of the three color components, R, G and B, present at each pixel, similar interpolation processing may be executed on an image expressed in another colorimetric system.

Furthermore, while an explanation is given above in reference to the embodiments on an example in which the interpolation processing is executed on image data with the various color components arrayed as illustrated in FIG. 2, image data that are processed by adopting the present invention may assume an array other than that shown in FIG. 2.

Through the interpolation processing explained earlier in reference to each of the embodiments, which is part of the image restoration processing, color information corresponding to all of the three color components, R, G and B, is ultimately set for each pixel. However, the present invention is not limited to interpolation processing, and it may be equally effectively adopted in image restoration processing through which color information corresponding to all the color components in a colorimetric system other than the RGB colorimetric system is set in correspondence to each pixel.

For instance, in the eighth embodiment to be detailed later, color information corresponding to three color components, Y, Cb and Cr is set for all the pixels. In other words, the present invention is adopted in image restoration processing for setting color information corresponding to all the color components constituting a colorimetric system (the YCbCr colorimetric system in this case), other than the RGB colorimetric system (the colorimetric system in which the image undergoing the image restoration processing is expressed) for each pixel in the eighth embodiment.

Namely, the "similarity judgment processing" achieved in any of the embodiments explained above can be adopted in image restoration processing through which color information corresponding to the color components constituting another colorimetric system is newly generated as well as in the image restoration processing for interpolating the RGB colorimetric system.

In addition, processing equivalent to the "replacement interpolation" achieved in the fourth embodiment can be adopted in image restoration processing for newly generating color information corresponding to the color components constituting another colorimetric system as well as in the image restoration processing for interpolating image data in the RGB colorimetric system.

For instance, when color information corresponding to the Y component is calculated for a pixel at which the color information originally present corresponds to the red color component as "(R+2·G+B)/4" by using nearby color information corresponding to the green color component and the blue color component in image restoration processing executed to set color information corresponding to the Y, Cb and Cr components for each of the pixels of an image constituted of color information corresponding to the three color components R, G and B arranged in a Bayer array, executing processing equivalent to the "replacement interpolation" equates to calculating the Y component as "(2·R+G+B)/4". In other words, half of the color information corresponding to the G color component is replaced with the color information corresponding to the red color component in this case.

The following advantages are achieved in the electronic camera in the embodiments described above.

Since the image restoration processing is executed by switching to a more desirable restoration value generation method, fine image structures can be restored and, at the same time, defects such as false image structures and color artifacts is minimized to obtain a restored image achieving a good overall balance.

The accuracy with which the color index is calculated is improved by increasing the accuracy of the hue values within a given pixel, and thus, the occurrence of color artifacts attributable to the execution of the image restoration processing can be further reduced.

Since the similarity is judged adaptively in conformance to the color index and the restoration values are generated accordingly, defects such as false structures and color artifacts can be even more effectively prevented.

Since a restoration value is adaptively replaced with the original color information, the accuracy with which fine image structures are restored is improved.

The accuracy of the similarity factor calculation executed in the image restoration processing is improved.

By adaptively executing correction in the image restoration processing, any loss of fine color structures is avoided and the occurrence of color artifacts is reduced. As a result, the image restoration processing is executed while the image maintains a good overall balance.

The accuracy with which the color index is calculated is improved.

Correction can be made in a desirable manner during the image restoration processing and, at the same time, the adverse effect of over-correction is minimized.

The correction can be executed in a desirable manner during the image restoration processing.

The accuracy with which the luminance indices calculated is improved.

Sixth Embodiment (Structure of Electronic Camera)

Since the structure of the electronic camera 1 achieved in the sixth embodiment is similar to that shown in the functional block diagram presented in FIG. 1 in reference to which the electronic camera corresponding to the first through fourth embodiments has been explained and its explanation is omitted.

(Conversion of Image Data)

Figure 21:
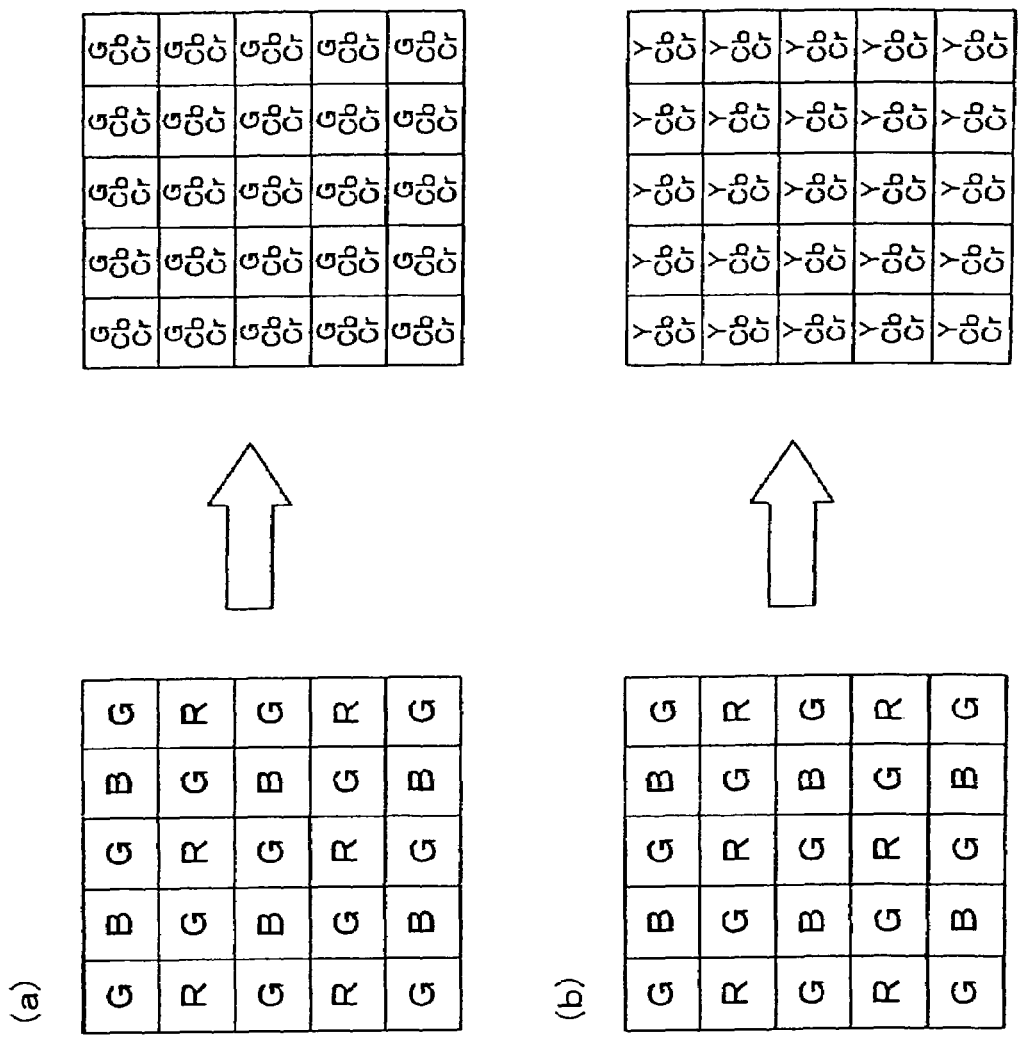
FIG. 21 illustrates the concept of image data conversion.

Processing through which image data in the RGB colorimetric system obtained via the image-capturing sensor 21 are converted to image data expressed in a GCrCb colorimetric system is explained. Image data obtained through an image-capturing operation executed at the image-capturing sensor 21 and input to the image processing unit 11 via the analog signal processing unit 22 and the A/D conversion unit 10 are expressed in the RGB colorimetric system assuming a Bayer array and, as explained earlier, color information corresponding to a single color component is present at each pixel. Hereafter, such image data may also be referred to as pre-conversion RGB image data. The pre-conversion RGB image data are converted to image data that include information G corresponding to the luminance component (referred to as luminance information G or a luminance signal G) and information Cr and Cb corresponding to the color difference components (chrominance) (referred to as color difference information Cr and Cb or color difference signals Cr and Cb) for each pixel. The image data resulting from the conversion are referred to as post-conversion GCrCb image data. FIG. 21 shows different concepts of data conversion, with FIG. 21(a) presenting a conceptual diagram of the conversion implemented in the sixth embodiment and FIG. 21(b) presenting a conceptual diagram of the conversion executed in the eighth embodiment to be detailed later. It is to be noted that since sets of color information each corresponding to a color components that are present at the individual pixels are separated from one another in the pre-conversion RGB image data, the pre-conversion RGB image data may be regarded as data constituting a multispectral image obtained through spatial spectral separation.

The pre-conversion RGB image data are now explained in reference to FIGS. 2(a) through 2(d). FIGS. 2(a) through 2(d) each show the specific arrangement of the color components at the pixels surrounding the conversion target pixel corresponding to a given color component. The coordinates of the conversion target pixel are indicated as [i,j]. FIG. 2(a) shows the conversion target pixel [i,j] having color information corresponding to the R color component and FIG. 2(b) shows the conversion target pixel [i,j] having color information corresponding to the B color component. FIG. 2(c) shows the conversion target pixel [i,j] having color information corresponding to the G color component with pixels adjacent along the vertical direction having color information corresponding to the B color components and pixels adjacent along the horizontal direction having color information corresponding to the R color component, whereas FIG. 2(d) shows the conversion target pixel [i,j] having color information corresponding to the G color component with the pixels adjacent along the vertical direction having color information corresponding to the R color component and the pixels adjacent along the horizontal direction having color information corresponding to the B color component.

A pixel having color information corresponding to the R color component, a pixel having color information corresponding to the B color component and a pixel having color information corresponding to the G color component in the pre-conversion RGB image data are respectively referred to as an R pixel, a B pixel and a G pixel.

Figure 23:
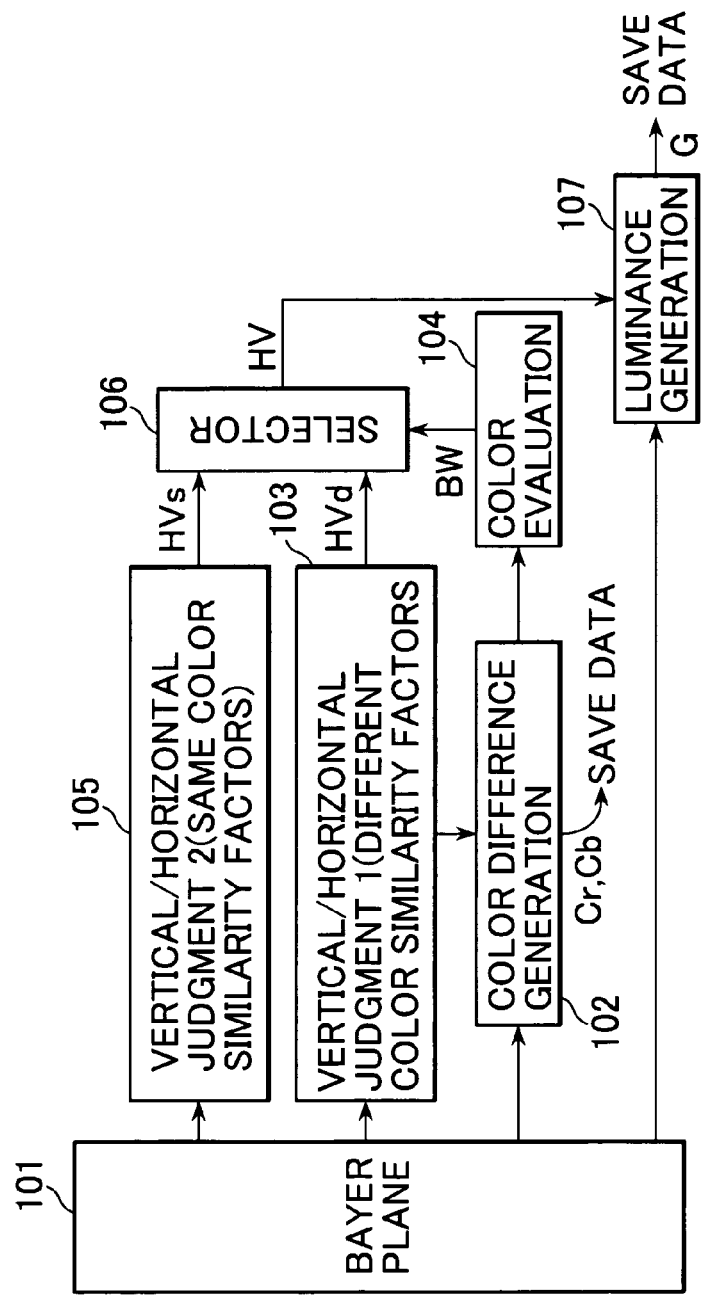
FIG. 23 is a block diagram provided to facilitate an explanation of the relationship among the various types of processing executed in the sixth embodiment.
Figure 22:
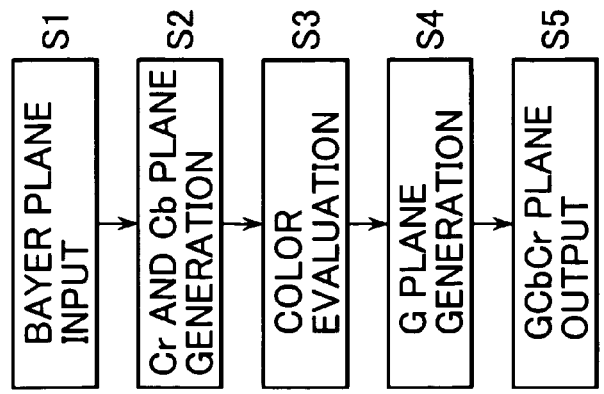
FIG. 22 presents a schematic flowchart of the image data conversion processing executed in the image processing unit.

FIG. 22 presents a flowchart of the overall image data conversion processing executed by the image processing unit 11. FIG. 23 is a block diagram provided to facilitate the explanation of the relationship among various types of processing. Now, the image data conversion processing executed by the image processing unit 11 is outlined in reference to FIGS. 22 and 23.

In step S1, a Bayer plane (101 in FIG. 23), i.e., the pre-conversion RGB image data, is input. In step S2, by using the color information corresponding to the various color components in the pre-conversion RGB image data, a Cr plane and a Cb plane, i.e., color difference information Cr and Cb, are generated for all the pixels (102 in FIG. 23). At this time, a vertical/horizontal judgment 1 is executed (103 in FIG. 23) by using different color similarity factors and the color difference information Cr and the color difference information Cb are generated based upon the results of the vertical/horizontal judgment 1. In step S3, a color evaluation is performed by using the color difference information Cr and the color difference information Cb (104 in FIG. 23). In the color evaluation, an evaluation is made with regard to the target pixel as to whether it is an achromatic pixel or a color pixel and extent of the saturation if the pixel is judged to be a chromatic pixel.

In step S4, a G plane, i.e., luminance information G, is generated for all the pixels. When generating the luminance information G, a selection is made as to whether the results of the vertical/horizontal judgment 1 (103 in FIG. 23) executed by using different color similarity factors should be used or the results of the vertical/horizontal judgment 2 (105 in FIG. 23) executed by the using the same color similarity factors should be used based upon the results of the color evaluation obtained in step S3 (106 in FIG. 26). Then, the luminance information G is generated in conformance to the results of the vertical/horizontal judgment executed by using either the different color similarity factors or the same color similarity factors selected based upon the results of the color evaluation (FIG. 23, 107). Namely, based upon the results of the judgment made with regard to the extent of similarity manifesting along the vertical/horizontal directions, the luminance information G is generated by utilizing the color information present within a local area containing the target pixel. The local area in this context refers to an area ranging over, for instance, several pixels to several tens of pixels. The local area may even range over 100 pixels or more. In other words, the local area is an area constituted of pixels, the number of which justifies the use of the adjective "local" relative to the overall size of the image.

In step S5, the color difference information Cr and Cb generated in step S2 and the luminance information G generated in step S4 are output as image data which then undergo various types of image processing or are stored into a memory or the like.

It is to be noted that the number of pixels constituting the pre-conversion RGB image data and the number of pixels in the post-conversion GCrCb image data are equal to each other, and the positions of the individual pixels in these data have a 1-to-1 correspondence in a two-dimensional plane.

The image data conversion processing executed on all the pixels as mentioned earlier is achieved by repeatedly executing specific types of image data conversion processing in different target local areas. Accordingly, the following explanation proceeds by referring to relational expressions that are satisfied locally in the individual target areas. A detailed explanation of these specific types of processing is provided below. The explanation is given in the following order.

| (1 | Cr and Cb plane generation) |
|---|---|
| (1-1 | Vertical/horizontal judgment 1) |
| (1-1-1 | Calculation of similarity factors) |
| (1-1-1-1 | Different color similarity factors) |
| (1-1-1-2 | Peripheral additions of similarity factors) |
| (1-1-2 | Similarity judgment) |
| (1-2 | Color difference generation) |
| (1-2-1 | R-positioned Cr plane generation) |
| (1-2-2 | Cr plane interpolation) |
| (1-2-3 | B-positioned Cb plane generation and interpolation) |
| (2 | Color evaluation) |
| (2-1 | Color difference correction) |
| (2-2 | Color index calculation) |
| (2-3 | Color judgment) |
| (3 | G plane generation) |
| (3-1 | Vertical/horizontal judgment 2) |
| (3-1-1 | Calculation of similarity factors) |
| (3-1-1-1 | Same color similarity factors) |
| (3-1-1-2 | Peripheral additions of similarity factors) |
| (3-1-2 | Similarity judgment) |
| (3-2 | Directional index selection) |
| (3-3 | G calculation) |
| (4 | Color image output) |

The explanation is given as follows.

| (1 | Cr and Cb plane generation) |
|---|---|
| (1-1 | Vertical/horizontal judgment 1) |
| (1-1-1 | Calculation of similarity factors) |
| (1-1-1-1 | Different color similarity factors) |

The vertical/horizontal judgment 1 is executed based upon different color similarity factors calculated by using the color information corresponding to the various color components in the pre-conversion RGB image data having been input. First, "different color similarity factors" are calculated for R pixels and B pixels. A different color similarity factor indicates the level of similarity manifesting between the conversion target pixel and surrounding pixels, which is expressed as a numerical value calculated by using the color information corresponding to different color components present within a local area containing the conversion target pixel. In this embodiment, the different color similarity factor along the vertical direction and the different color similarity factor along the horizontal direction are ascertained and a judgment is made as to whether marked similarity manifests along the vertical direction or the horizontal direction. Each set of color information indicates a value obtained by digitizing a color signal generated at the image-capturing sensor 21 through a specific type of processing. Such color information may be represented in, for instance, one byte 256 gradations.

[x,y] indicates the coordinates of a given pixel and the coordinates of the conversion target pixel are indicated as [i,j]. Color information present at a G pixel is indicated as $G[x, y]$, color information present at an R pixel is indicated as $R[x, y]$, color information present at a B pixel is indicated as $B[x,y]$, and color information present at either an R pixel or a B pixel is summarily indicated as $Z[x,y]$. The different color similarity factor $Cv0[i,j]$ along the vertical direction can be ascertained through an arithmetic operation executed as defined in expression (101), whereas the different color similarity factor $Ch0[i,j]$ along the horizontal direction can be ascertained through an arithmetic operation as defined in expression (102). If the conversion target pixel is an R pixel, the similarity factors are determined by calculating GR similarity factor components, whereas if the conversion target pixel is a B pixel, the similarity factors are determined by calculating GB similarity factor components. The term "similarity factor component" is used in this explanation to refer to a specific combination of color components constituting a given similarity factor.

GR (GB) Similarity Factor Components $$Cv0[i,j]=(|G[i,j-1]-Z[i,j]|+|G[i,j+1]-Z[i,j]|)/2 \qquad (101)$$

$$Ch0[i,j]=(|G[i-1,j]-Z[i,j]|+|G[i+1,j]-Z[i,j]|)/2 \qquad (102)$$

The vertical different color similarity factor $Cv0[x,y]$ and the horizontal different color similarity factor $Ch0[x,y]$ are determined for the R pixels and the B pixels present in the target area in the pre-conversion RGB image data.

It is to be noted that when the conversion target pixel is an R pixel or a B pixel, the G pixels directly adjacent to the conversion target pixel constitute different color pixels present along the vertical and horizontal directions relative to the conversion target pixel (see FIGS. 2(a) and 2(b). Namely, the "different color similarity factors", with which the similarity is judged over a one-pixel pitch, enables a more accurate similarity judgment for a Nyquist frequency level fine image structure with changes occurring in a one-pixel pitch.

(1-1-1-2 Peripheral Additions of Similarity Factors)

Next, peripheral additions of similarity factors are executed. During this process, the arithmetic operations defined in expressions (103) and (104) are executed by using the vertical different color similarity factors $Cv0[x,y]$ and the horizontal different color similarity factors $Ch0[x,y]$ calculated as explained above. The objective of these peripheral additions is to improve the accuracy of the similarity factors by taking into consideration the continuity with the surrounding pixels. It is to be noted that the peripheral additions may be skipped if priority is to be given to simplicity and higher processing speed.

$$Cv[i,j]=(4*Cv0[i,j]+2*(Cv0[i-1,j-1]+Cv0[i+1,j-1]+ \\ Cv0[i-1,j+1]+Cv0[i+1,j+1])+Cv0[i,j-2]+Cv0[i, \\ j+2]+Cv0[i-2,j]+Cv0[i+2,j])/16 \qquad (103)$$

$$Ch[i,j]=(4*Ch1[i,j]+2*(Ch0[i-1,j-1]+Ch0[i+1,j-1]+ \\ Ch0[i-1,j+1]+Ch0[i+1,j+1])+Ch0[i,j-2]+Ch0[i, \\ j+2]+Ch0[i-2,j]+Ch0[i+2,j])/16 \qquad (104)$$

(1-1-2 Similarity Judgment)

Next, the similarity judgment is executed. In this process, a specific manner with which the conversion target pixel manifests similarity is judged by using $Cv[i,j]$ and $Ch[i,j]$ determined as described above. Namely, in the sixth embodiment, a judgment is made as to whether marked similarity manifests along the vertical direction or along the horizontal direction, or if it is not possible to identify either the vertical direction or the horizontal direction as the specific direction along which marked similarity manifests. More specifically, if condition (105) is satisfied, it is judged that specific vertical/horizontal similarity cannot be ascertained and 0 is set for a directional index $HVd[i,j]$. Th0 represents a specific threshold value which may assume a value of 10, for instance, when there are 256 gradations. In other words, if the difference between the vertical similarity factor and the horizontal similarity factor is equal to or smaller than the threshold value Th0, the judgment as to whether marked similarity manifests along the vertical direction or along the horizontal direction cannot be made.

$$|Cv[i,j]-Ch[i,j]| \leq Th0 \quad (105)$$

If condition (105) is not satisfied, i.e., if it is judged that a marked similarity manifests along either the vertical direction or the horizontal direction, a judgment is then made as to whether or not condition (106) is satisfied. If condition (106) is satisfied, it is determined that a marked similarity manifests along the vertical direction and 1 is set for the directional index HVd[i,j]. If, on the other hand, condition (106) is not satisfied, it is determined that a marked similarity manifests along the horizontal direction and −1 is set for the directional index HVd[i,j]. It is to be noted that the smaller the values of the different color similarity factors Cv[i,j] and Ch[i,j], the higher degrees of similarity are indicated.

$$Cv[i,j]<Ch[i,j] \quad (106)$$

Values of the directional index HVd[x,y] are calculated for all the R pixels and B pixels present in the target area in the pre-conversion RGB image data.

(1-2 Color Difference Generation)

(1-2-1 R-positioned Cr Plane Generation)

Next, the generation of a color difference information Cr plane for an R pixel is explained. Color difference information Cr is obtained for the pixels in the post-conversion GCrCb image each corresponding to an R pixel in the pre-conversion RGB image data. The expression used at this time is selected in conformance to the value of the similarity directional index HVd[i,j] determined as described above. When HVd[i,j]=1, expression (107) is used to calculate Cr[i,j], when HVd[i,j]=−1, expression (108) is used to calculate Cr[i,j], and when HVd[i,j]=0, expression (109) is used to calculate Cr[i,j].

$$Cr[i,j]=(2*R[i,j]+R[i,j-2]+R[i,j+2])/4-(G[i,j-1]+G[i,j+1])/2 \quad (107)$$

$$Cr[i,j]=(2*R[i,j]+R[i-2,j]+R[i+2,j])/4-(G[i-1,j]+G[i+1,j])/2 \quad (108)$$

$$Cr[i,j]=(4*R[i,j]+R[i,j-2]+R[i,j+2]+R[i-2,j]+R[i+2,j])/8-(G[i,j-1]+G[i,j+1]+G[i-1,j]+G[i+1,j])/4 \quad (109)$$

(1-2-2 Cr Plane Interpolation)

Next, the Cr plane is interpolated. Color difference information Cr for pixels corresponding to B pixels and G pixels is obtained through interpolation processing by using the color difference information Cr obtained for the pixels corresponding to the R pixels. Expression (110) is used to obtain color difference information Cr for each pixel corresponding to a B pixel, expression (111) is used to obtain color difference information Cr for each pixel corresponding to a G pixel with R pixels set adjacent to it along the vertical direction, and expression (112) is used to obtain color difference information Cr for each pixel corresponding to a G pixel with R pixels set adjacent to it along the horizontal direction.

$$Cr[i,j]=(Cr[i-1,j-1]+Cr[i-1,j+1]+Cr[i+1,j-1]+Cr[i+1,j+1])/4 \quad (110)$$

$$Cr[i,j]=(Cr[i-1,j]+Cr[i+1,j])/2 \quad (111)$$

$$Cr[i,j]=(Cr[i,j-1]+Cr[i,j+1])/2 \quad (112)$$

(1-2-3 B-positioned Cb Plane Generation and Interpolation)

Color difference information Cb is also obtained in a manner similar to that with which the color difference information Cr is obtained as described above. Thus, the color difference information Cr and the color difference information Cb are obtained for each pixel in the target area in the post-conversion GCrCb image data. It is to be noted that the color difference information Cr and the color difference information Cb obtained as described above are mathematically equivalent to color difference information obtained after obtaining color information corresponding to the R, G and B color components for the corresponding pixel in the target area in the pre-conversion RGB image data through interpolation processing.

In addition, the directional index HVd[i,j] set based upon the similarity judgment executed by using the different color similarity factors alone is used in the explanation above, since the occurrence of color artifacts in the vicinity of a Nyquist frequency can be greatly suppressed in this manner.

(2 Color Evaluation)

(2-1 Color Difference Correction)

Prior to the color evaluation, the color information Cr and the color information Cb are corrected to remove any color moire manifesting at the Cr and Cb color difference planes obtained as described above, so as to achieve an accurate color evaluation. While the correction may be executed by using a color difference median filter, a low-pass filter expressed in the following expression (113) and illustrated in FIG. 24 is used in the sixth embodiment. Through this-processing, color moire can be quickly eliminated.

$$TCr1[i,j]=\{4*Cr[i,j]+2*(Cr[i-2,j]+Cr[i+2,j]+Cr[i,j-2]+Cr[i,j+2])+1*(Cr[i-2,j-2]+Cr[i+2,j-2]+Cr[i-2,j+2]+Cr[i+2,j+2])\}/16 \quad (113)$$

TCb1[i,j], too, is determined in a similar manner.

As described above, by ascertaining the structure surrounding each pixel, the color difference information assumed to be distributed with spatial directionality is converted to color difference information indicating accurate gradations for the individual pixels to generate the color difference information Cr and the color difference information Cb. Thus, the color difference information Cr and the color difference information Cb indicate scalar quantities that enable a measurement of the actual hues of the image in units of the individual pixels by almost completely eliminating the structural factors in the image. While the color difference between R and G indicated by the color difference information Cr and the color difference between B and G indicated by the color difference information Cb, which are used to calculate the color index, are already determined, they are provided as scalar quantities for each pixel and thus, it becomes possible to evaluate the color difference between R and B as well. As a result, a color evaluation which is very close to a visual human perception of color is achieved.

(2-2 Color Index Calculation)

Expression (114) presented below is used to calculate the color index Cdiff.

$$Cdiff[i,j]=(|TCr1[i,j]|+|TCb1[i,j]|+|TCr1[i,j]-TCb1[i,j]|)/3 \quad (114)$$

Through the expression, a highly accurate color index can be obtained by separating the disturbance factor attributable to the structure, which poses a problem in the color level evaluation in the related art, from the actual color and also by assessing the color differences manifesting in possible combinations of the all color components. It is to be noted that during this process, too, peripheral additions similar to the peripheral additions of the similarity factors may be executed so as to further improve the accuracy of the color index.

(2-3 Color Judgment)

Next, a color judgment is executed. The continuous color index Cdiff[i,j] explained above is converted to color judgment results indicating a discrete color index BW[i,j] by judging the threshold of the continuous color index Cdiff[i,j], i.e., by ascertaining which of conditions (115) through (118), the color index Cdiff[i,j] satisfies. The individual thresholds Thza, Thab and Thbc should respectively assume values of 2, 5 and 15, for instance, when there are 256 graduations.

$$Cdiff[i,j] \leq Thza \quad (115)$$

$$Thza < Cdiff[i,j] \leq Thab \quad (116)$$

$$Thab < Cdiff[i,j] \leq Thbc \quad (117)$$

$$Thbc < Cdiff[i,j] \quad (118)$$

If condition (115) is satisfied, the pixel is judged to be a fully achromatic image portion and, accordingly, "z" is set for BW[i,j]. If condition (116) is satisfied, the pixel is judged to be an achromatic image portion and, accordingly, "a" is set for BW[i,j]. If condition (117) is satisfied, the pixel is judged to be a lightly saturated image portion and, accordingly, "b" is set for BW[i,j]. If condition (118) is satisfied, the pixel is judged to be a saturated image portion and, accordingly, "c" is set for BW[i,j].

| | |
|---|---|
| (3 | G plane generation) |
| (3-1 | Vertical/horizontal judgment 2) |
| (3-1-1 | Calculation of similarity factors) |
| (3-1-1 | Same color similarity factors) |

Next, using the color index BW[i,j], luminance information G of the post-conversion GCrCb image data is obtained. First, the "same color similarity factors" are calculated for each of the R pixels and B pixels in the pre-conversion RGB image data. A same color similarity factor indicates the level of similarity manifesting between the conversion target pixel and surrounding pixels, which is expressed as a numerical value calculated by using the color information corresponding to a single color component present within a local area containing the conversion target pixel. In this embodiment, the same color similarity factors along the vertical direction and the same color similarity factors along the horizontal direction are ascertained and a judgment is made as to whether a marked similarity manifests along the vertical direction or the horizontal direction.

Based upon the color information present at the G pixels adjacent to the conversion target pixel, a GG similarity factor component Cv1[i,j] along the vertical direction is calculated through expression (119) and a GG similarity factor component Ch1[i,j] along the horizontal direction is calculated through expression (120).

$$Cv1[i,j] = |G[i,j-1] - G[i,j+1]| \quad (119)$$

$$Ch1[i,j] = |G[i-1,j] - G[i+1,j]| \quad (120)$$

Based upon the color information present at pixels corresponding to the color component different from that of the conversion target pixel and also different from the G color component, a BB (RR) similarity factor component Cv2[i,j] along the vertical direction is calculated through expression (121) and a BB (RR) similarity factor component Ch2[i,j] along the horizontal direction is calculated through expression (122).

$$Cv2[i,j] = (|Z[i-1,j-1] - Z[i-1,j+1]| + |Z[i+1,j-1] - Z[i+1,j+1]|)/2 \quad (121)$$

$$Ch2[i,j] = (|Z[i-1,j-1] - Z[i+1,j-1]| + |Z[i-1,j+1] - Z[i+1,j+1]|)/2 \quad (122)$$

The vertical GG similarity factor component Cv1[i,j] and the vertical BB (RR) similarity factor component Cv2[i,j] calculated as explained above are incorporated into expression (123) through which a vertical same color similarity factor Cv0[i,j] is determined for the conversion target pixel [i,j]. In addition, the horizontal GG similarity factor component Ch1[i,j] and the horizontal BB (RR) similarity factor component Ch2[i,j] are incorporated into expression (124) through which a horizontal same color similarity factor Ch0[i,j] is determined for the conversion target pixel [i,j].

$$Cv0[i,j] = (Cv1[i,j] + Cv2[i,j])/2 \quad (123)$$

$$Ch0[i,j] = (Ch1[i,j] + Ch2[i,j])/2 \quad (124)$$

(3-1-1-2 Peripheral Additions of Similarity Factors)

Next, peripheral additions of similarity factors are executed. During this process, the arithmetic operations defined in expressions (125) and (126) are executed by using the vertical same color similarity factors Cv0[x,y] and the horizontal same color similarity factors Ch0[x,y] calculated as explained above. The objective of these peripheral additions is to improve the accuracy of the similarity factors by taking into consideration the continuity with the surrounding pixels, as in the case of the different color similarity factors explained earlier. It is to be noted that the peripheral additions may be skipped if priority is to be given to simplicity and higher processing speed.

$$Cv[i,j] = (4*Cv0[i,j] + 2*(Cv0[i-1,j-1] + Cv0[i+1,j-1] + Cv0[i-1,j+1] + Cv0[i+1,j+1]) + Cv0[i,j-2] + Cv0[i,j+2] + Cv0[i-2,j] + Cv0[i+2,j])/16 \quad (125)$$

$$Ch[i,j] = (4*Ch0[i,j] + 2*(Ch0[i-1,j-1] + Ch0[i+1,j-1] + Ch0[i-1,j+1] + Ch0[i+1,j+1]) + Ch0[i,j-2] + Ch0[i,j+2] + Ch0[i-2,j] + Ch0[i+2,j])/16 \quad (126)$$

(3-1-2 Similarity Judgment)

Next, the similarity judgment is executed. In this process, a specific manner with which the conversion target pixel manifests same color similarity is judged by using Cv[i,j] and Ch[i,j] determined as described above, as in the different color similarity judgment explained earlier. In the sixth embodiment, a judgment is made as to whether marked similarity manifests along the vertical direction or along the horizontal direction, or if it is not possible to identify either the vertical direction or the horizontal direction as the specific direction along which marked similarity manifests. More specifically, if condition (127) is satisfied, it is judged that specific vertical/horizontal similarity cannot be ascertained and 0 is set for a directional index HVs[i,j]. Th1 represents a specific threshold value which may assume a value of 10, for instance, in conjunction with the 256 gradations, i.e., a value substantially equal to the value of Th0 used in conjunction with the different color similarity factors. In other words, if the difference between the vertical similarity factor and the horizontal similarity factor is equal to or smaller than the threshold value Th1, the judgment as to whether marked similarity manifests along the vertical direction or along the horizontal direction cannot be made.

$$|Cv[i,j] - Ch[i,j]| \leq Th1 \quad (127)$$

If condition (127) is not satisfied, i.e., if it is judged that a marked similarity manifests along either the vertical direction or the horizontal direction, a judgment is then made as to whether or not condition (128) is satisfied. If condition (128) is satisfied, it is determined that a marked similarity manifests along the vertical direction and 1 is set for the directional index HVs[i,j]. If, on the other hand, condition (128) is not satisfied, it is determined that a marked similarity manifests along the horizontal direction and −1 is set for the directional index HVs[i,j]. It is to be noted that the smaller the values of the different color similarity factors Cv[i,j] and Ch[i,j], the higher degrees of similarity are indicated.

$$Cv[i,j]<Ch[i,j] \tag{128}$$

Values of the directional index HVs[x,y] are calculated for all the R pixels and B pixels present in the target area in the pre-conversion RGB image data.

(3-2 Directional Index Selection)

Next, a specific type of directional index is selected. Namely, based upon the results of the color judgment explained earlier, either the results of the direction judgment made by using the different color similarity factors or the results of the direction judgment made by using the same color similarity factors are used. If "z" or "a" is set for BW[i,j], HVd[i,j] is selected as HV[i,j]. If "b" or "c" is set for BW[i,j], HVs[i,j] is selected as HV[i,j]. In other words, if the color of the pixel has been judged to be fully achromatic "z" or achromatic "a" in the color judgment, the directional index HVd[i,j] determined by using the different color similarity factors is used. If, on the other hand, the results of the color judgment indicate low saturation (chromatic) "b" or saturation (chromatic) "c", the directional index HVs[i,j] determined based upon the same color similarity factors is used.

The values indicated in the color information present at pixels in an achromatic image area are assumed to manifest differences largely attributable to varying lightness levels at the pixels without reflecting differences in the hue. Accordingly, the similarity manifesting in fine image structures can be judged with a higher degree of accuracy based upon the different color similarity factors with which similarity is judged over a one-pixel pitch. In a chromatic area, on the other hand, the values indicated by the color information present at the pixels manifest differences also attributable to the differences in the hue. For this reason, varying values are measured at pixels with different color filters and thus, the similarity cannot be judged with accuracy based upon the different color similarity factors. Accordingly, it is desirable to judge the similarity manifesting in a chromatic image area with the same color similarity factors.

(3-3 G Calculation)

Based upon the directional index set as described above, luminance information G, i.e., G[i,j], is obtained for each pixel [i,j] corresponding to an R pixel or a B pixel in the pre-conversion RGB image data. Namely, color information corresponding to the G color component missing at the R pixels and the B pixels is obtained through interpolation processing. When the directional index HV[i,j] is set to 1, i.e., when it has been judged that a marked similarity manifests along the vertical direction, G[i,j] is determined by using expression (129). When the directional index HV[i,j] is set to −1, i.e., when it has been judged that a marked similarity manifests along the horizontal direction, G[i,j] is determined by using expression (130). When the directional index HV[i,j] is set to 0, i.e., when it has been judged that a specific direction, i.e., either the vertical direction or the horizontal direction, cannot be identified as the direction along which marked similarity manifests, G[i,j] is determined by using expression (131).

$$G[i,j]=(G[i,j-1]+G[i,j+1])/2+(2*Z[i,j]-Z[i,j-2]-Z[i,j+2])/4 \tag{129}$$

$$G[i,j]=(G[i-1,j]+G[i+1,j])/2+(2*Z[i,j]-Z[i-2,j]-Z[i+2,j])/4 \tag{130}$$

$$G[i,j]=(G[i,j-1]+G[i,j+1]+G[i-1,j]+G[i+1,j])/4+(4*Z[i,j]-Z[i,j-2]-Z[i,j+2]-Z[i-2,j]-Z[i+2,j])/8 \tag{131}$$

(4 Color Image Output)

With the color difference information Cr, the color difference information Cb, and the luminance information G, i.e., Cr[i,j], Cb[i,j] and G[i,j], obtained for each pixel as described above, the conversion of the image data to a desired format of color image data is completed. The post-conversion GCrCb image data may be stored into the memory 13 and began may undergo various types of image processing such as color artifact reduction processing and color correction. The post-conversion GCrCb image data may also be stored into the memory card 16. The image data stored in the memory card 16 may undergo a specific type of colorimetric system conversion processing or a specific type of compression processing (JPEG). It is to be noted that the color difference information Cr[i,j] and the color difference information Cb[i,j] initially stored into the memory 13 are the color difference information generated in (1-2 Color Difference Generation)

To obtain image data in the RGB colorimetric system, i.e., image data requiring color information corresponding to all the color components R, G and B at each pixel in the target area, R[i,j] and B[i,j] are determined through expressions (132) and (133) G[i,j] having been determined as described earlier should be used for these purposes.

$$R[i,j]=Cr[i,j]+G[i,j] \tag{132}$$

$$B[i,j]=Cb[i,j]+G[i,j] \tag{133}$$

As explained above in the 6th embodiment, accurate color difference information is obtained for each pixel and the color evaluation is executed for the individual pixels by using the color difference information obtained in correspondence to the individual pixels. As a result, an accurate color evaluation is achieved for each pixel without being affected by any structural factors in the image. Namely, the structures surrounding the individual pixels in the image are accurately ascertained, and weighted color difference information is collected along the direction in which the highest degree of similarity appears to manifest. As a result, unlike color difference information generated based upon the differences among pixels set along all directions without taking into consideration the specific image structure, the color difference information achieved in the sixth embodiment does not contain color difference information that is collected from a direction along which only a low degree of similarity manifests and may cause color artifacts. Consequently, the color index is not affected by any disturbance attributable to a structural factor in the image.

As a result, the luminance information, which greatly affects the visual perception, can be generated by using the correct type of similarity factors, i.e., the different color similarity factors or the same color similarity factors, and the image data can be converted and restored to a high-quality color image achieving a Nyquist frequency resolution and a resolution of saturated image areas. In addition, since the color difference planes are first generated and the color difference planes are used in the color evaluation based upon the results of which the luminance (G) plane is generated, the need for the unreliable color level calculation executed independently by using the Bayer plane in the related art is eliminated, and simple and high-speed processing is realized. Furthermore, since the color difference information corresponding to the color difference planes generated earlier is directly used in the image data output, it is not necessary to generate new color difference information and, as a result, the processing is executed faster.

Seventh Embodiment

An algorithm that may be adopted to effectively process an image containing chromatic aberration of an optical system or an image manifesting abrupt color changes is explained in reference to the seventh embodiment. Since the structure of the electronic camera 1 achieved in the seventh embodiment is similar to that shown in the functional block diagram presented in FIG. 1 in reference to which the electronic camera corresponding to the first through fourth embodiments has been explained and its explanation is omitted. The explanation of the image conversion processing executed in the seventh embodiment focuses on the difference from the image conversion processing achieved in the sixth embodiment.

The flowchart of the overall image data conversion processing executed by the image processing unit 11 in the seventh embodiment would be similar to that presented in FIG. 22 in reference to which the sixth embodiment has been described. However, details of the G plane generation executed in step S4 and the GCrCb plane output executed in step S5 differ from those of the sixth embodiment. While the G plane generation executed in step S4 is identical to (3 G plane generation) in the sixth embodiment up to (3-1 Vertical/horizontal judgment 2) and (3-2 Directional index selection), it differs from the sixth embodiment in (3-3 G calculation) in which the luminance information G is generated by taking into consideration the diagonal similarity. Accordingly, the seventh embodiment includes an additional processing operation (3-3 Diagonal judgment) executed prior to (3-4 G calculation).

Figure 25:
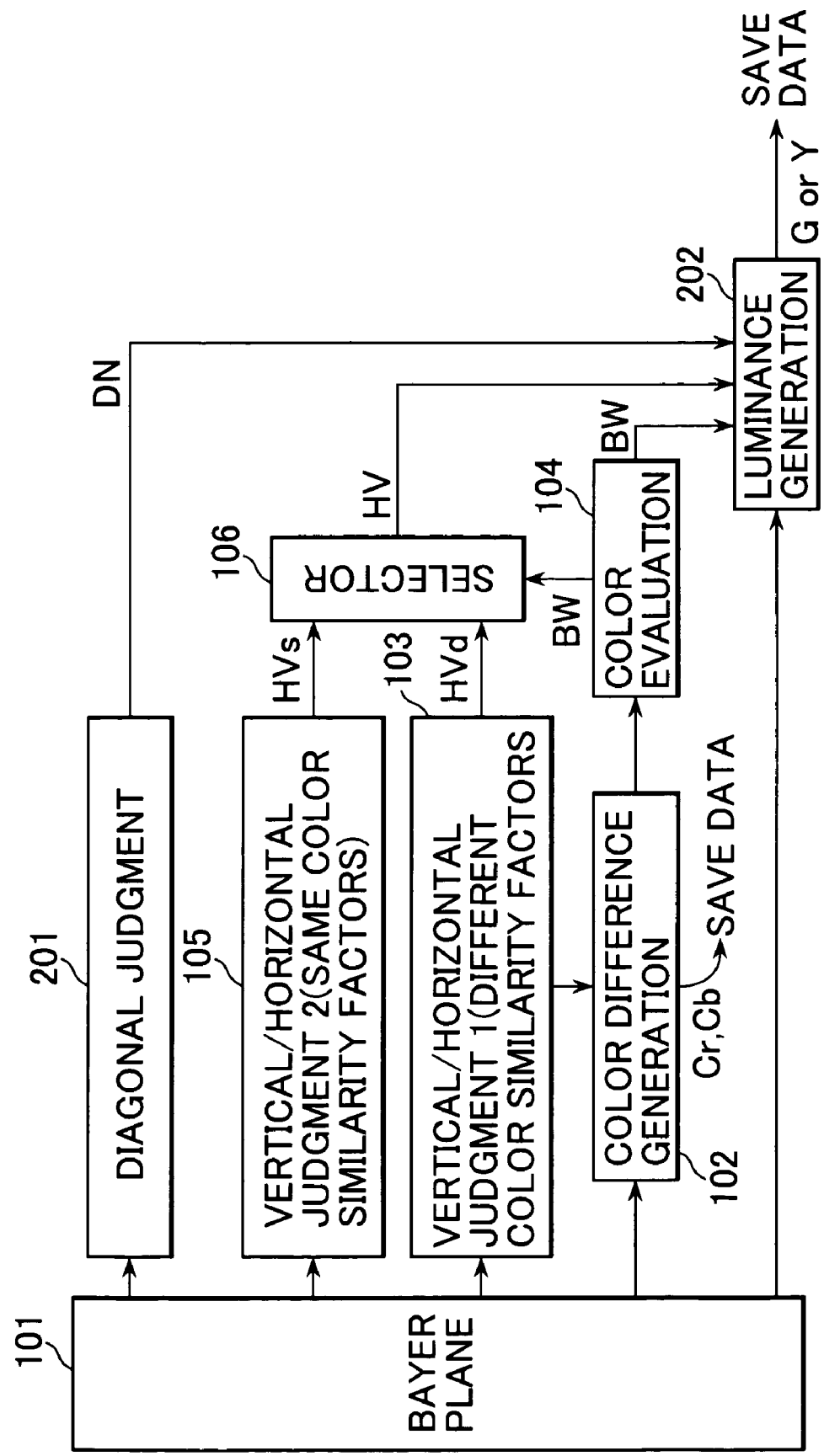
FIG. 25 is a block diagram provided to facilitate and explanation of the relationship among the various types of processing executed in the seventh embodiment.

FIG. 25 is a block diagram illustrating the relationship among different types of processing executed in the seventh embodiment. It differs from the block diagram illustrating the processing in the sixth embodiment in that a diagonal judgment 201 is added and in that an output DN resulting from the diagonal judgment 201, an output HV of the selector 106 and the results BW of the color evaluation 104 are connected to a luminance generation 202, so that an even finer direction judgment can be made by combining the diagonal judgment and the vertical/horizontal judgment and an appropriate arithmetic expression can be used in correspondence to the results of the finer judgment in the luminance generation (G calculation) 202. The results BW of the color evaluation 104 are connected to the luminance generation to be referenced in the selection of the expression so as to further improve the luminance resolution even at image portions for which a definite direction judgment cannot be made. The following is a detailed explanation of the processing.

The (3 G plane generation) is achieved as follows in the seventh embodiment.

| | |
|---|---|
| (3 | G plane generation) |
| (3-1 | Vertical/horizontal judgment 2) |
| (3-1-1 | Calculation of similarity factors) |
| (3-1-1-1 | Same color similarity factors) |
| (3-1-1-2 | Peripheral additions of similarity factors) |
| (3-1-2 | Similarity judgment) |
| (3-2 | Directional index selection) |
| (3-3 | Diagonal judgment) |
| (3-3-1 | Calculation of similarity factors) |
| (3-3-1-1 | Similarity factors) |
| (3-3-1-2 | Peripheral additions of similarity factors) |
| (3-3-2 | Similarity judgment) |
| (3-4 | G calculation) |

The explanation is as follows.

| | |
|---|---|
| (3-3 | Diagonal judgment) |
| (3-3-1 | Calculation of similarity factor) |
| (3-3-1-1 | Similarity factors) |

The similarity manifesting along diagonal directions is judged by using pixel information available within a local area containing the target pixel for each R or B pixel present in the pre-conversion RGB image data. The diagonal directions include a diagonal 45° direction and a diagonal 135° direction. In FIG. 14, [HV,DN]=[0,1] indicates the diagonal 45° direction and [HV,DN]=[0,−1] indicates the diagonal 135° direction. A further explanation is to be provided later in reference to FIG. 14. [x,y] indicates the coordinates of a given pixel and the coordinates of the conversion target pixel are indicated as [i,j]. Color information present at a G pixel is indicated as G[x,y], color information present at an R pixel is indicated as R[x,y], color information present at a B pixel is indicated as B[x,y] and color information present at either an R pixel or a B pixel is summarily indicated as Z[x,y].

First, a BR (RB) similarity factor component $C45\_1$ along the diagonal 45° direction, a BR (RB) similarity factor component $C135\_1$ along the diagonal 135° direction, a GG similarity factor component $C45\_2$ along the diagonal 45° direction, a GG similarity factor component $C135\_2$ along the diagonal 135° direction, a BB (RR) similarity factor component $C45\_3$ along a diagonal 45° direction and a BB (RR) similarity factor component $C135\_3$ along the diagonal 135° direction are respectively determined by using expression (140), expression (141), expression (142), expression (143), expression (144) and expression (145).

BR (RB) Similarity Factor Components $$C45\_1=(|Z[i+1,j-1]-Z[i,j]|+|Z[i-1,j+1]-Z[i,j]|)/2 \quad (140)$$

$$C135\_1=(|Z[i-1,j-1]-Z[i,j]|+|Z[i+1,j+1]-Z[i,j]|)/2 \quad (141)$$

GG Similarity Factor Components $$C45\_2=(|G[i,j-1]-G[i-1,j]|+|G[i+1,j]-G[i,j+1]|)/2 \quad (142)$$

$$C135\_2=(|G[i,j-1]-G[i+1,j]|+|G[i-1,j]-G[i,j+1]|)/2 \quad (143)$$

BB (RR) Similarity Factor Components $$C45\_3=|Z[i+1,j-1]-Z[i-1,j+1]| \quad (144)$$

$$C135\_3=(|Z[i-1,j-1]-Z[i+1,j+1]| \quad (145)$$

As the BR (RB) similarity factor components, similarity factors each indicating the similarity manifesting between the target pixel [i,j] and different color pixels set along a diagonal direction are calculated, as the GG similarity factor components, similarity factors each indicating the similarity between G pixels set along a diagonal direction around the target pixel are calculated, and as BB (RR) similarity factor components, similarity factors each indicating the similarity manifesting between same color pixels set on the two sides of the target pixel along a diagonal direction are calculated.

Using $C45\_1$, $C135\_1$, $C45\_2$, $C135\_2$, $C45\_3$ and $C135\_3$ obtained through the arithmetic operations executed as expressed in expressions (140) through (145) respectively, a 45° similarity factor $C45\_0[i,j]$ is obtained through expression (146) and a 135° similarity factor $C135\_0[i,j]$ is determined through expression (147). It is to be noted that constants a1, a2 and a3 may assume such values that satisfy a1=a2=a3=1, or a1=a2=2 and a3=1.

$$C45\_0[i,j]=(a1*C45\_1+a2*C45\_2+a3*C45\_3)/(a1+a2+a3) \quad (146)$$

$$C135\_0[i,j]=(a1*C135\_1+a2*C135\_2+a3*C135\_3)/(a1+a2+a3) \quad (147)$$

The 45° similarity factor C45_0[x,y] and the 135° similarity factor C135_0[x,y] are determined for the R pixels and the B pixels present in the target area in the pre-conversion RGB image data.

(3-3-1-2 Peripheral Additions of Similarity Factors)

Next, peripheral additions of similarity factors are executed. During this process, the arithmetic operations defined in expressions (147A) and) (147B) are executed by using the 45° similarity factors C45_0[x,y] and the 135° similarity factors C135_0[x,y] calculated as explained above. The objective of these peripheral additions is to improve the accuracy of the similarity factors by taking into consideration the continuity with the surrounding pixels, as in the case of the vertical and horizontal similarity factors. It is to be noted that the peripheral additions may be skipped if priority is to be given to simplicity and higher processing speed.

$$C45[i,j]=(4*C45\_0[i,j]+2*(C45\_0[i-1,j-1]+C45\_0[i+1,j-1]+C45\_0[i-1,j+1]+C45\_0[i+1,j+1])+C45\_0[i,j-2]+C45\_0[i,j+2]+C45\_0[i-2,j]+C45\_0[i+2,j])/16 \quad (147A)$$

$$C135[i,j]=(4*C135\_0[i,j]+2*(C135\_0[i-1,j-1]+C135\_0[i+1,j-1]+C135\_0[i-1,j+1]+C135\_0[i+1,j+1])+C135\_0[i-1,j+1]+C135\_0[i,j-2]+C135\_0[i,j+2]+C135\_0[i-2,j]+C135\_0[i+2,j])/16 \quad (147B)$$

(3-3-2 Similarity Judgement)

Next, the similarity judgment is executed. In this process, a specific manner with which the conversion target pixel manifests similarity is judged by using C45[i,j] and C135[i,j] determined as described above. In this example, a judgment is made as to whether marked similarity manifests along the diagonal 45° direction or along the diagonal 135° direction, or if it is not possible to identify either the 45° direction or the 135° direction as the specific direction along which marked similarity manifests. More specifically, if condition (148) is satisfied, it is judged that specific diagonal 45°/diagonal 135° similarity cannot be ascertained and 0 is set for a directional index DN[i,j]. Th2 is a predetermined threshold value assuming a value substantially equal to the value assumed for Th0 and Th1 used in the vertical/horizontal judgment, e.g., approximately 10 when there are 256 gradations. If the difference between the diagonal 45° similarity factor and the diagonal 135° similarity factor is equal to or smaller than the threshold value Th2, the judgment as to whether marked similarity manifests along the diagonal 45° direction or along the diagonal 135° direction cannot be made.

$$|C45[i,j]-C135[i,j]| \leq Th2 \quad (148)$$

If condition (148) is not satisfied, i.e., if it is judged that a marked similarity manifests along either the diagonal 45° direction or the diagonal 135° direction, a judgment is then made as to whether or not condition (149) is satisfied. If condition (149) is satisfied, it is determined that a marked similarity manifests along the diagonal 45° direction and 1 is set for the directional index DN[i,j]. If, on the other hand, condition (149) is not satisfied, it is determined that a marked similarity manifests along the diagonal 135° direction and −1 is set for the directional index DN[i,j]. It is to be noted that the smaller the values of the similarity factors C45[i,j] and C135[i,j], the higher degrees of similarity are indicated.

$$C45[i,j]<C135[i,j] \quad (149)$$

Values of the directional index DN[x,y] are calculated for all the R pixels and B pixels present in the target area in the pre-conversion RGB image data.

(3-4 G Calculation)

Based upon the vertical/horizontal directional index HV[i,j] and the diagonal directional index DN[i,j] set as explained above, luminance information G, i.e., G[i,j], is obtained for each pixel [i,j] corresponding to an R pixel or a B pixel in the pre-conversion RGB image data. Namely, color information corresponding to the G color component missing at the R pixels and the B pixels is obtained through interpolation processing. Depending upon the specific combination of the vertical/horizontal directional index HV[i,j] and the diagonal directional index DN[i,j], the directionality of the similarity can be identified as one of the following 9 types. FIG. 14 used in the explanation of the first embodiment should be referred to again. FIG. 14 shows varying directional index [HV,DN]. It is to be noted that the directional index [0,0] indicates that no similarity manifests along any of the vertical, horizontal and diagonal directions (i.e., an isolated point), or that similarity manifests along all the directions (i.e., part of a flat image area).

Based upon the directional index [HV,DN], i.e., based upon the specific directionality of the similarity, one of the following expressions (150) through (159) is selected and G[i,j] is calculated by using the selected expression. It is to be noted that if the directional index is [0,0], the expression is selected by further taking into consideration the color index BW[i,j] having been determined through (2-3 Color judgment). However, the color index does not need to be factored in if priority is to be given to simplicity. If BW[i,j]="z", i.e., if the results of the color judgment indicate a fully achromatic image portion, expression (150) is used instead of expression (151) since the correctional terms, i.e., the second and subsequent terms, in expressions (160) and (163), constituting expression (151), achieve correction over 2-pixel pitches and an image such as a black-and-white Nyquist check pattern cannot be accurately corrected through an expression (151). In other words, by selectively using either expression (150) or (151), the addition ratio or the composite ratio of the color information present at the target pixel and the color information at nearby pixels is adjusted based upon the color index BW[i,j]. FIG. 26 shows the positions of the pixels used in the processing in correspondence to the directional index and the color components corresponding to the pixels when the conversion target pixel is an R pixel.

When the directional index is [0,0] and BW[i,j]="z"; expression (150) is used.

When the directional index is [0,0] and BW[i,j]≠"z"; expression (151) is used.

When the directional index is [0,1]; expression [152) is used.

When the directional index is [0,−1]; expression (153) is used.

When the directional index is [1,0]; expression (154) is used.

When the directional index is [1,1]; expression (155) is used.

When the directional index is [1,−1]; expression (156) is used.

When the directional index is [−1,0]; expression (157) is used.
When the directional index is [−1,1]; expression (158) is used.
When the directional index is [−1,−1]; expression (159) is used.

$$G[i,j]=\{Z[i,j]+(Gv+Gh)/2\}/2 \quad (150)$$

$$G[i,j]=(Gv+Gh)/2 \quad (151)$$

$$G[i,j]=(Gv45+Gh45)/2 \quad (152)$$

$$G[i,j]=(Gv135+Gh135)/2 \quad (153)$$

$$G[i,j]=Gv \quad (154)$$

$$G[i,j]=Gv45 \quad (155)$$

$$G[i,j]=Gv135 \quad (156)$$

$$G[i,j]=Gh \quad (157)$$

$$G[i,j]=Gh45 \quad (158)$$

$$G[i,j]=Gh135 \quad (159)$$

Gv, Gh, Gv45, Gh45, Gv135 and Gh135 above should be determined through arithmetic operations executed as expressed in the following expressions (160) through (165).

$$Gv=(G[i,j-1]+G[i,j+1])/2+(2*Z[i,j]-Z[i,j-2]-Z[i,j+2])/8+(2*G[i-1,j]-G[i-1,j-2]-G[i-1,j+2]+2*G[i+1,j]-G[i+1,j-2]-G[i+1,j+2])/16 \quad (160)$$

$$Gv45=(G[i,j-1]+G[i,j+1])/2+(2*Z[i,j]-Z[i,j-2]-Z[i,j+2])/8+(2*Z[i-1,j+1]-Z[i-1,j-1]-Z[i-1,j+3]+2*Z[i+1,j-1]-Z[i+1,j-3]-Z[i+1,j+1])/16 \quad (161)$$

$$Gv135=(G[i,j-1]+G[i,j+1])/2+(2*Z[i,j]-Z[i,j-2]-Z[i,j+2])/8+(2*Z[i-1,j-1]-Z[i-1,j-3]-Z[i-1,j+1]+2*Z[i+1,j+1]-Z[i+1,j-1]-Z[i+1,j+3])/16 \quad (162)$$

$$Gh=(G[i-1,j]+G[i+1,j])/2+(2*Z[i,j]-Z[i-2,j]-Z[i+2,j])/8+(2*G[i,j-1]-G[i-2,j-1]-G[i+2,j-1]+2*G[i,j+1]-G[i-2,j+1]-G[i+2,j+1])/16 \quad (163)$$

$$Gh45=(G[i-1,j]+G[i+1,j])/2+(2*Z[i,j]-Z[i-2,j]-Z[i+2,j])/8+(2*Z[i+1,j-1]-Z[i-1,j-1]-Z[i+3,j-1]+2*Z[i-1,j+1]-Z[i-3,j+1]-Z[i+1,j+1])/16 \quad (164)$$

$$Gh135=(G[i-1,j]+G[i+1,j])/2+(2*Z[i,j]-Z[i-2,j]-Z[i+2,j])/8+(2*Z[i-1,j-1]-Z[i-3,j-1]-Z[i+1,j-1]+2*Z[i+1,j+1]-Z[i-1,j+1]-Z[i+3,j+1])/16 \quad (165)$$

expressions (160) through (165) are now explained. Assuming that an R pixel is undergoing the processing, the first set of parentheses can be regarded to represent a G color component average term, the second set of parentheses can be regarded to represent an R color component correctional term and the third set of parentheses can be regarded to represent a B (G) component correctional term in each expression. While there is a possibility of the R color component correctional term inducing an over-correction along the gradation direction in an image area where the color fluctuates drastically, the B (G) component correctional term working as opposite phase along gradation direction prevents such an over-correction in this embodiment. In addition, while the R color component correctional term is caused to shift spatially if there is a chromatic aberration, the B (G) component correctional term, too, shifts along the direction toward the opposite phase of the R color component correctional term to cancel it out, thereby preventing any adverse effect of the chromatic aberration from manifesting.

When there is a possibility of an image portion for which any directional similarity cannot be identified with the directional index [HV,DN] set to [0,0] being assumed to be a fully achromatic image portion through the color evaluation and the image undergoing the processing is a Nyquist frequency level check pattern, even the check pattern can be resolved by adjusting the contribution ratio of the central pixel and the surrounding pixels set for the G color component generation.

As a result, image data can be converted and restored to a high-quality color image achieving both outstanding Nyquist frequency resolution and outstanding resolution in saturated image areas in the seventh embodiment. In addition, even an image with drastic color changes or an image containing chromatic aberration in an optical system can be converted and restored to a color image with a high degree of tolerance. Furthermore, it has been verified that the processing can be achieved as software processing executed with satisfactory speed.

Eighth Embodiment

In the sixth and seventh embodiments, the G plane generation is achieved by adopting the concept of interpolation processing. In the eighth embodiment, on the other hand, luminance information is generated through a method different from that adopted in the sixth and seventh embodiments.

Figure 27:
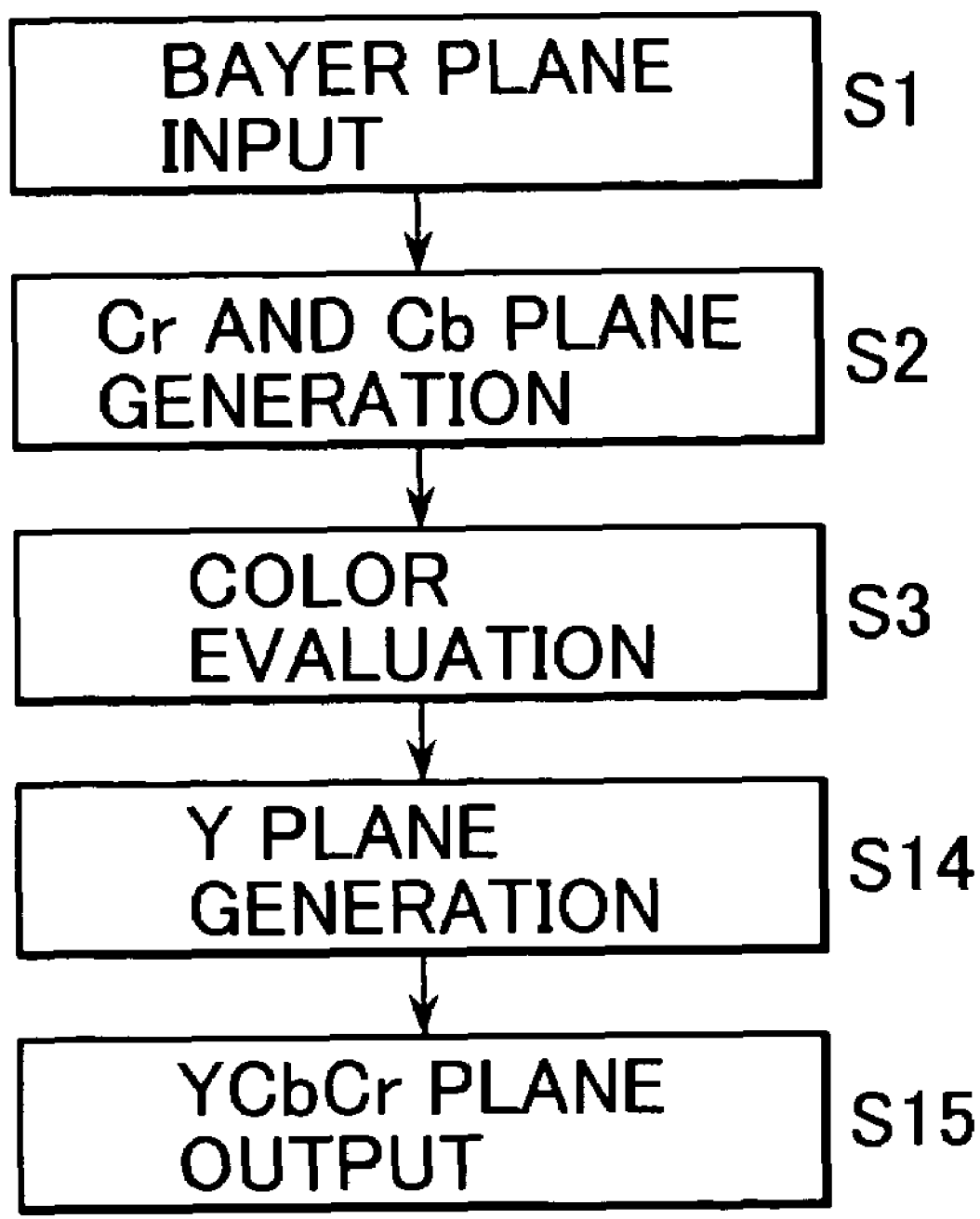
FIG. 27 presents a schematic flowchart of the image data conversion processing executed in the image processing unit in the eighth embodiment.

Since the structure of the electronic camera 1 achieved in the eighth embodiment is similar to that shown in the functional block diagram presented in FIG. 1 in reference to which the electronic camera corresponding to the first through fourth embodiments has been explained and its explanation is omitted. FIG. 27 presents a schematic flowchart of the image data conversion processing executed by the image processing unit 11 in the eighth embodiment. The processing executed in steps S1 through S3 is identical to that executed in the corresponding steps in the sixth embodiment as shown in FIG. 22. The Y-plane generation executed in step S14 and the YCrCb plane output executed in step S15 differentiate the eighth embodiment from the sixth embodiment. Namely, the G plane generation executed in step S4 in the sixth and seventh embodiments is replaced with the Y plane generation executed in step S14 in the eighth embodiment and the GCbCr plane output executed in step S5 in the sixth and seventh embodiments it is replaced with the YCbCr plane output executed in step S15 in the eighth embodiment. FIG. 21(*b*) illustrates the concept of the conversion.

It is to be noted that (3-1 Vertical/horizontal judgment 2), (3-2 Directional index selection) and (3-3 Diagonal judgment) executed in (3 G plane generation) in the seventh embodiment as explained earlier are also executed in the Y plane generation in step S14 in the eighth embodiment. Accordingly, an explanation is given on (Y calculation) and (Edge enhancement) executed as additional processing, which differentiate the eighth embodiment from the seventh embodiment. An explanation is also provided on the YCbCr plane output, i.e., (Color image output). The block diagram showing the relationship among the various types of processing executed in the eighth embodiment would be similar to that presented in FIG. 25 to facilitate the explanation of the seventh embodiment.

(3 Y plane generation) and (4 Color image output) are executed in the eighth embodiment, as indicated below.

| | |
|---|---|
| (3 | Y plane generation) |
| (3-1 | Vertical/horizontal judgment) |
| (3-1-1 | Calculation of similarity factors) |
| (3-1-1-1 | Same color similarity factors) |
| (3-1-1-2 | Peripheral additions of similarity factors) |
| (3-1-2 | Similarity judgment) |
| (3-2 | Directional index selection) |
| (3-3 | Diagonal judgment) |
| (3-3-1 | Calculation of similarity factors) |
| (3-3-1-1 | Similarity factors) |
| (3-3-1-2 | Peripheral additions of similarity factors) |
| (3-3-2 | Similarity judgment) |
| (3-4 | Y calculation) |
| (3-5 | Edge enhancement) |
| (4 | Color image output) |
| (3-4 | Y calculation) |

Luminance information Y is calculated in the eighth embodiment by generating a luminance Y plane through a direct weighted addition of the Bayer plane, instead of through the G plane generation executed in the sixth and seventh embodiments. Namely, the luminance information Y is directly generated by using the color information corresponding to the individual color components constituting the pre-conversion RGB image data that have not yet undergone the interpolation processing. A given set of color information in the pre-conversion RGB image data (Bayer plane data) is indicated as A[x,y].

Based upon the vertical/horizontal directional index HV[i,j] and the diagonal directional index DN[i,j] set as described earlier, luminance information Y, i.e., Y[i,j], is obtained for each pixel [i,j] corresponding to an R pixel or a B pixel in the pre-conversion RGB image data. Depending upon the specific combination of the vertical/horizontal directional index HV[i,j] and the diagonal directional index DN[i,j], the directionality of the similarity can be identified as one of the following 9 types, as in the seventh embodiment (see FIG. 14).

Based upon the directional index [HV,DN], i.e., based upon the specific directionality of the similarity, one of the following expressions (170) through (179) is selected and Y[i,j] is calculated by using the selected expression. It is to be noted that if the directional index is [0,0], the expression is selected by a further taking into consideration the color index BW[i,j] having been determined through (2-3 Color judgment), as in the seventh embodiment. However, the color index does not need to be factored in if priority is to be given to simplicity.

If the conversion target pixel [i,j] is a G pixel, expression (170) is used, whereas if the conversion target pixel [i,j] is not a G pixel, one of expressions (171) through (180) is selected and used in correspondence to the specific directional index setting as indicated below. It is to be noted that FIG. 28 shows the positions of the pixels used in the processing when the conversion target pixel is a G pixel and the coefficient set for the pixels (G-positioned luminance generation coefficient pattern). FIG. 29 shows the positions of the pixels used in the processing in correspondence to different directional index settings when the conversion target pixel is a R pixel or a B pixel and the coefficients set for the pixels (R and B-positioned luminance generation coefficient patterns).

When the directional index is [0,0] and BW[i,j]="z"; expression (171) is used.

When the directional index is [0,0] and BW[i,j]≠"z"; expression (172) is used.

When the directional index is [0,1]; expression (173) is used.

When the directional index is [0,−1]; expression (174) is used.

When the directional index is [1,0]; expression (175) is used.

When the directional index is [1,1]; expression (176) is used.

When the directional index is [1,−1]; expression (177) is used.

When the directional index is [−1,0]; expression (178) is used.

When the directional index is [−1,1]; expression (179) is used.

When the directional index is [−1,−1]; expression (180) is used.

$$Y[i,j]=Y_G \qquad (170)$$

$$Y[i,j]=Y_{RB}\text{UNIa} \qquad (171)$$

$$Y[i,j]=Y_{RB}\text{UNIb} \qquad (172)$$

$$Y[i,j]=Y_{RB}45 \qquad (173)$$

$$Y[i,j]=Y_{RB}135 \qquad (174)$$

$$Y[i,j]=Y_{RB}v \qquad (175)$$

$$Y[i,j]=Y_{RB}v45 \qquad (176)$$

$$Y[i,j]=Y_{RB}v135 \qquad (177)$$

$$Y[i,j]=Y_{RB}h \qquad (178)$$

$$Y[i,j]=Y_{RB}h45 \qquad (179)$$

$$Y[i,j]=Y_{RB}h135 \qquad (180)$$

$Y_G$, $Y_{RB}$UNIa, $Y_{RB}$UNIb, $Y_{RB}$45, $Y_{RB}$135, $Y_{RB}$v45, $Y_{RB}$v135, $Y_{RB}$h, $Y_{RB}$h45 and $Y_{RB}$h135 above should be determined through arithmetic operations executed as expressed in the following expressions (181) through (191).

$$Y_G=\alpha*A[i,j]+(\beta/4)*\{A[i-1,j]+A[i+1,j]+A[i,j-1]+A[i,j+1]\} \qquad (181)$$

$$Y_{RB}\text{UNIa}=p*A[i,j]+q*Y_{RB}\text{UNIb} \qquad (182)$$

$$Y_{RB}\text{UNIb}=(\beta/2)*A[i,j]+\alpha*\{(v1/2)*A[i-1,j]+(v2/2)*A[i+1,j]+(u1/2)*A[i,j-1]+(u2/2)*A[i,j+1]\}+(\beta/2)*\{(s1/2)*A[i-1,j-1]+(s2/2)*A[i+1,j+1]+(t1/2)*A[i+1,j-1]+(t2/2)*A[i-1,j+1]\} \qquad (183)$$

$$Y_{RB}45=(\beta/2)*A[i,j]+\alpha*\{(v1/2)*A[i-1,j]+(v2/2)*A[i+1,j]+(u1/2)*A[i,j-1]+(u2/2)*A[i,j+1]\}+(\beta/2)*\{t1*A[i+1,j-1]+t2*A[i-1,j+1]\} \qquad (184)$$

$$Y_{RB}135=(\beta/2)*A[i,j]+\alpha*\{(v1/2)*A[i-1,j]+(v2/2)*A[i+1,j]+(u1/2)*A[i,j<1]+(u2/2)*A[i,j+1]\}+(\beta/2)*\{s1*A[i-1,j-1]+s2*A[i+1,j+1]\} \qquad (185)$$

$$Y_{RB}v=(\beta/2)*A[i,j]+\alpha*\{u1*A[i,j-1]+u2*A[i,j+1]\}+(\beta/2)*\{(s1/2)*A[i-1,j-1]+(s2/2)*A[i+1,j+1]+(t1/2)*A[i+1,j-1]+(t2/2)*A[i-1,j+1]\} \qquad (186)$$

$$Y_{RB}v45=(\beta/2)*A[i,j]+\alpha*\{u1*A[i,j-1]+u2*A[i,j+1]\}+(\beta/2)*[t1*A[i+1,j-1]+t2*A[i-1,j+1]] \qquad (187)$$

$$Y_{RB}v135=(\beta/2)*A[i,j]+\alpha*\{u1*A[i,j-1]+u2*A[i,j+1]\}+(\beta/2)*\{s1*A[i-1,j-1]+s2*A[i+1,j+1]\} \qquad (188)$$

$$Y_{RB}h=(\beta/2)*A[i,j]+\alpha*\{v1*A[i-1,j]+v2*A[i+1,j]\}+(\beta/2)*\{(s1/2)*A[i-1,j-1]+(s2/2)*A[i+1,j+1]+(t1/2)*A[i+1,j-1]+(t2/2)*A[i-1,j+1]\} \qquad (189)$$

$$Y_{RB}h45=(\beta/2)*A[i,j]+\alpha*\{v1*A[i-1,j]+v2*A[i+1,j]\}+ \\ (\beta/2)*\{t1*A[i+1,j-1]+t2*A[i-1,j+1]\} \quad (190)$$

$$Y_{RB}h135=(\beta/2)*A[i,j]+\alpha*\{v1*A[i-1,j]+v2*A[i+1,j]\}+ \\ (\beta/2)*\{s1*A[i-1,j-1]+s2*A[i+1,j+1]\} \quad (191)$$

It is to be noted that the following restrictions (192) are imposed on the constants (coefficients) used in the expressions. In addition, these constants each assume a positive value or the value of zero.

$$\alpha+\beta=1, p+q=1, u1+u2=1, v1+v2=1, s1+s2=1, t1+t2=1 \quad (192)$$

An example of the settings for the constants generally deemed desirable it is presented below.

$$u1 \approx u2, v1 \approx v2, s1 \approx s2, t1 \approx t2$$

$$(\alpha,\beta)=(1/3,2/3),(4/9,5/9),(5/11,6/11),(1/2,1/2),(5/9,4/9),(3/5,2/5),(2/3,1/3)$$

$$(p,q)=(1/3,2/3),(1/2,1/2)$$

The constants $\alpha$ and $\beta$ are parameters used to determine the ratio of the R data, the G data and the B data in the luminance information and they satisfy a relationship expressed as $Y=\alpha *G+\beta *(R+B)/2$. The constants p and q are parameters used to adjust the color information composite ratio of the central pixel and the nearby pixels contained in the luminance value, whereas $Y_{RB}$UNIa is used to resolve a Nyquist frequency check pattern.

(3-5 Edge Enhancement)

On the Y plane described above, an image that retains fine image structures of the original image intact and achieves a very smooth continuity is formed. For this reason, the edge enhancement processing can be achieved simply by applying a basic fixed filter which does not require that directionality be taken into consideration. The filter used for the edge enhancement may be a laplacian filter defined in expression (193) and illustrated in FIG. 30. Then, the ultimate luminance information Y is obtained through an arithmetic operation expressed in expression (194). The constant K in expression (194) assumes a positive value and is normally set to a value equal to or greater than 1.

$$YH[i,j]=\{8*Y[i,j]-(Y[i-1,j]+Y[i+1,j]+Y[i,j-1]+Y[i,j+1]/Y[i-1,j-1]+Y[i+1,j-1]+Y[i-1,j+1]+Y[i+1,j+1]\}/16 \quad (193)$$

$$Y[i,j]=Y[i,j]+K*YH[i,j] \quad (194)$$

(4 Color Image Output)

With Cr[i,j], Cb[i,j] and Y[i,j] ascertained for each pixel through the processing described above, color image data in the YCrCb colorimetric system are generated. Subsequently, various types of image processing including certain color difference correction processing may be implemented. In addition, if the YCbCr image data need to be converted to image data in the RGB colorimetric system, arithmetic operations should be executed as defined in the following expressions (195) through (197). Through such arithmetic operations, image data in the RGB colorimetric system with color information corresponding to all the color components, R, G and B present at each pixel in the target area can be generated.

$$R[i,j]=Y[i,j]+(1-\beta/2)*Cr[i,j]-(\beta/2)*Cb[i,j] \quad (195)$$

$$G[i,j]=Y[i,j]-(\beta/2)*Cr[i,j]-(\beta/2)*Cb[i,j] \quad (196)$$

$$B[i,j]=Y[i,j]-(\beta/2)*Cr[i,j]+(1-\beta/2)*Cb[i,j] \quad (197)$$

In the eighth embodiment, too, image data constituting any of various types of images including an image that contains chromatic aberration can be converted and restored to a high-quality color image achieving both an outstanding Nyquist frequency resolution and an outstanding resolution in saturated image areas through the luminance plane generation achieved based upon the results of an accurate direction judgment. Furthermore, it has been verified that the processing can be achieved as software processing executed with a satisfactory speed in the eighth embodiment, as well.

Ninth Embodiment

In the ninth embodiment, a color difference correction 2, which differs from the color difference correction 1 in the sixth embodiment is executed in addition to the color difference correction 1 executed in the sixth embodiment, and either of the two different types of color differences resulting from the two different corrections is selectively used as the color difference plane to be ultimately output based upon the results of the color judgment. As a result, a color difference plane without significant color artifacts and achieving faithful color reproduction can be generated separately from the luminance plane.

Figure 31:
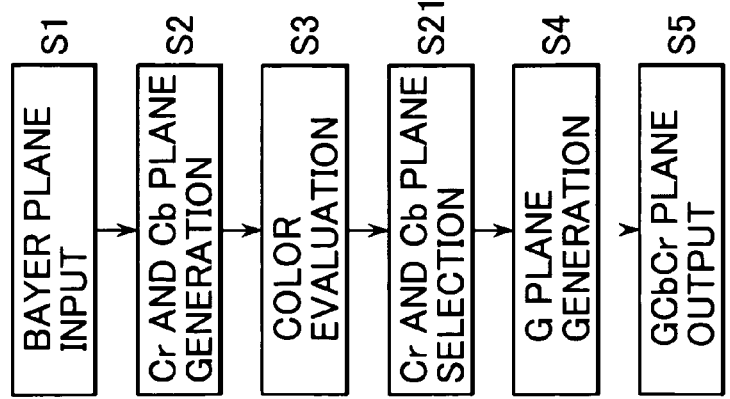
FIG. 31 presents a schematic flowchart of the image data conversion processing executed in the image processing unit in the ninth embodiment.

Since the structure of the electronic camera 1 achieved in the ninth embodiment is similar to that shown in the functional block diagram presented in FIG. 1 in reference to which the electronic camera corresponding to the first through fourth embodiments has been explained and its explanation is omitted. FIG. 31 presents a schematic flowchart of the image data conversion processing executed by the image processing unit 11 in the ninth embodiment. The processing executed in steps S1, S3 and steps S4 and S5 is identical to that executed in the corresponding steps in the sixth embodiment, as shown in FIG. 22. However, a new step S21 executed for Cr and Cb plane selection is inserted between step S3 and step S4 in the ninth embodiment.

Figure 32:
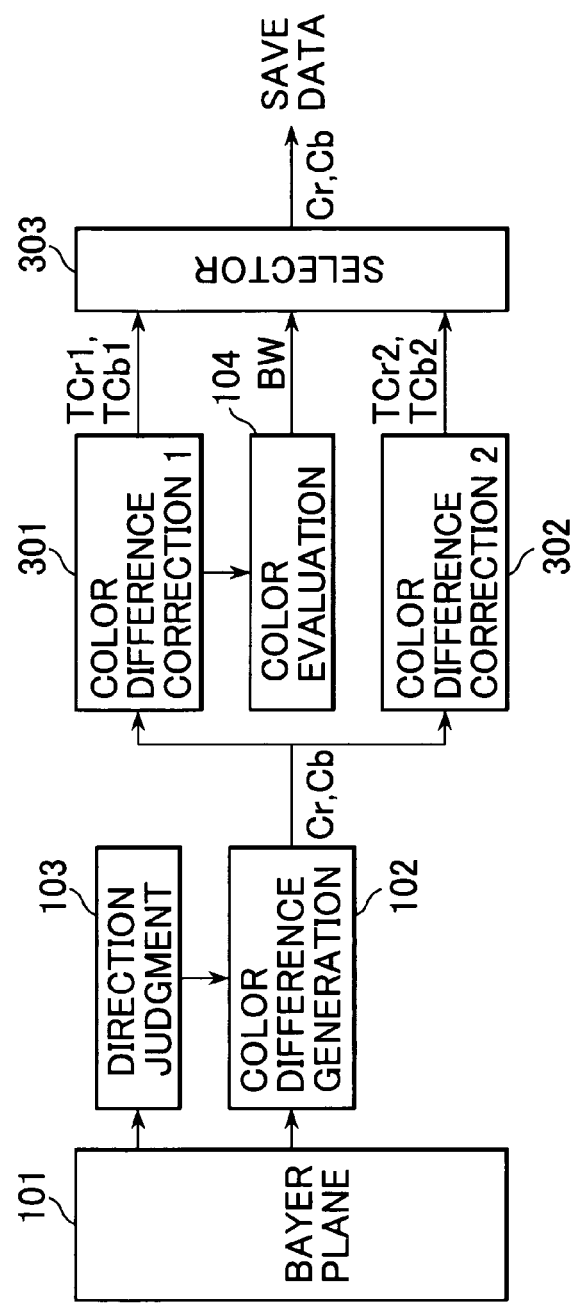
FIG. 32 is a block diagram provided to facilitate an explanation of the relationship among the various types of processing executed in the ninth embodiment.

FIG. 32 is a block diagram provided to facilitate an explanation of the relationship among various types of processing executed in the ninth embodiment. The aspects of the processing corresponding to the Bayer plane 101, the color difference generation 102, the vertical/horizontal judgment 103 and the color evaluation 104 in FIG. 23 provided as reference to the sixth embodiment are extracted and shown in the figure. The color difference correction 1 which is executed as part of the color evaluation 104 in the sixth embodiment is extracted and indicated as a separate color difference correction 1 (301), a new color difference correction 2 (302) is added and outputs TCr1 and TCb1 of the color difference correction 1 (301) and outputs TCr2 and TCb2 of the color difference correction 2 (302) are connected to a selector (303), so as to select the desirable color difference correction, i.e., the color difference correction 1 (301) or the color difference correction 2, based upon the results BW of the color evaluation 104.

The following is an explanation of the newly added processing, i.e., the Cr and Cb plane selection. The image conversion processing is executed as indicated below in the ninth embodiment. It differs from the processing in the sixth embodiment in that (3 Cr and Cb plane selection) is executed before (4 G plane generation).

| | |
|---|---|
| (1 | Cr and Cb plane generation) |
| (2 | Color evaluation) |
| (2-1 | Color difference correction 1) |
| (2-2 | Color index calculation) |
| (2-3 | Color judgment) |
| (3 | Cr and Cb plane selection) |

| | |
|---|---|
| (3-1) | Color difference correction 2) |
| (3-2) | Color difference selection) |
| (4 | G plane generation) |
| (5 | Color image output) |
| (3 | Cr and Cb plane selection) |
| (3-1) | Color difference correction 2) |

The low-pass filter (see FIG. 24) used in (2-1 Color difference correction 1) in (2 Color evaluation) executed as in the sixth embodiment is a wide range filter which is highly affective as a means for minimizing the occurrence of color artifacts and also as a means for color evaluation. However, the color difference planes ultimately output do not exactly achieve a satisfactorily faithful color reproduction in fine color pattern areas. Accordingly, another low-pass filter, i.e., a narrow range low-pass filter, which achieves excellent color reproduction capability for fine color patterns while it does not have superior color artifact reducing capability, is used in the ninth embodiment. More specifically, the color difference correction 2 is executed by using expression (200). FIG. 33 illustrates this narrow range low-pass filter. However, a expression other than expression (200) may instead be used for a lesser low-pass filtering effect, or the data may be allowed to be filtered through without any processing.

$$TCr2[i,j]=\{4*Cr[i,j]+2*(Cr[i-1,j]+Cr[i+1,j]+Cr[i,j-1]+Cr[i,j+1])+1*(Cr[i-1,j-1]+Cr[i+1,j-1]+Cr[i-1,j+1]+Cr[i+1,j+1])\}/16 \quad (200)$$

TCb2[i,j] is calculated through a similar expression.

(3-2 Color Difference Selection)

Next, based upon the results of the color judgment, more reliable color difference planes are selected from the two types of color difference planes achieved through the correction processing executed by adopting the two different methods. More specifically, when BW[i,j]≠"c", TCr1[i,j] and TCb1[i,j] are respectively selected for Cr[i,j] and Cb[i,j]. When BW[i,j]="c", TCr2[i,j] and TCb2[i,j] are respectively selected for Cr[i,j] and Cb[i,j].

Namely, when the results of the color evaluation indicate a lightly saturated image portion or an achromatic image portion, the wide-range low-pass filter with the superior color artifact reducing capability is used, whereas when the results of the color evaluation indicate intense color, the narrow range low-pass filter that achieves excellent color reproduction in fine color pattern areas while slightly lacking in the color artifact reducing capability is used. As a result, color difference planes achieving highly faithful color reproduction in which hardly any color artifacts manifests, can be generated through independent color difference plane processing. Furthermore, the ninth embodiment achieves a simplicity that greatly facilitates a hardware application thereof. It is to be noted that the ninth embodiment may be regarded as a variation of the sixth embodiment, in which the color difference planes are more adaptively processed. This concept may be adopted in the processing executed in the seventh embodiment and the processing executed in the eighth embodiment, as well.

Figure 34:
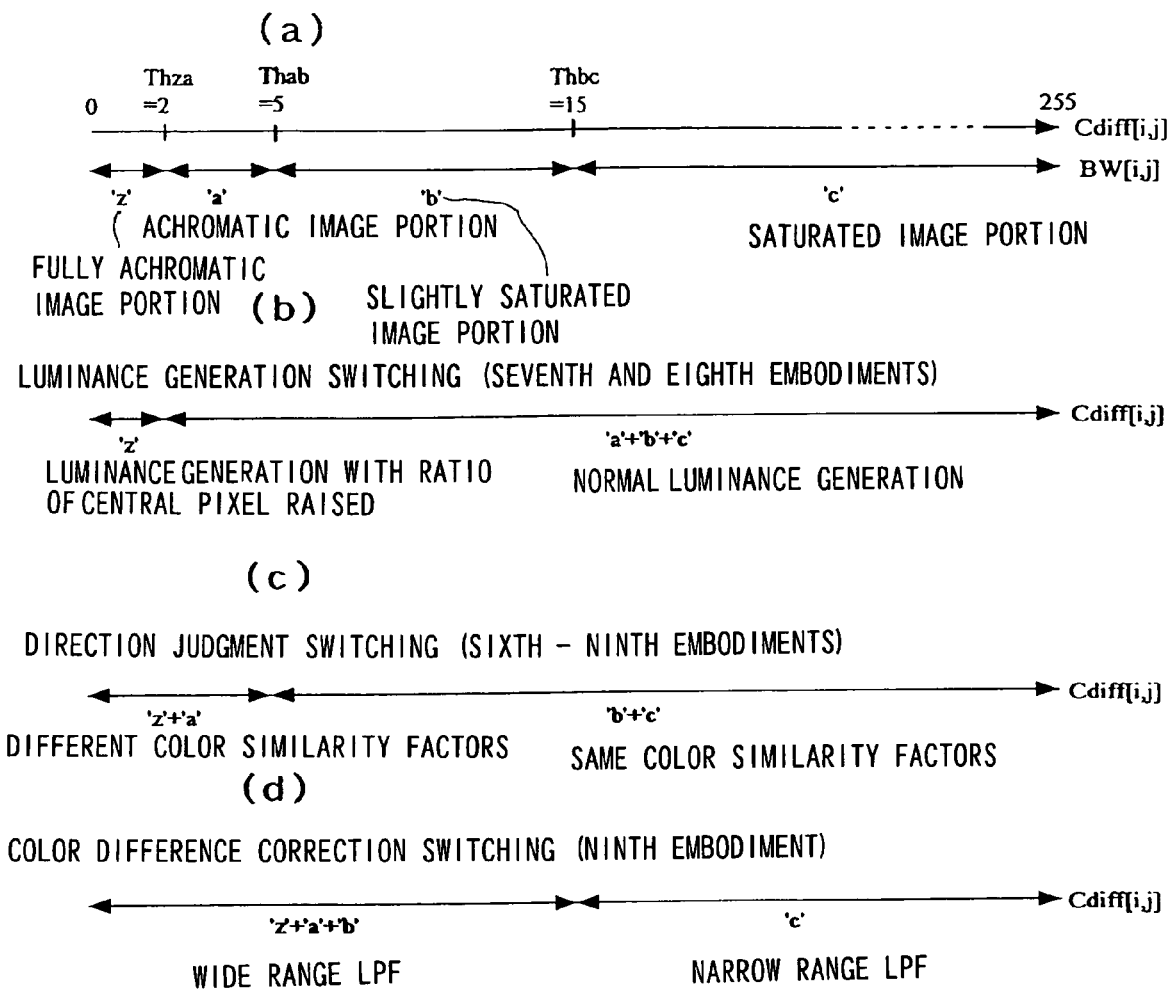
FIG. 34 summarizes the utilization of the color index obtained through the color evaluation in the sixth through ninth embodiments.

FIG. 34 provides a summarized chart illustrating the utilization of the color index determined through the color evaluation executed in the sixth through ninth embodiments as explained above. FIG. 34(a) is provided to facilitate an explanation of the color index BW obtained through the color evaluation in the various embodiments. The image portion becomes more achromatic toward the left side of the figure, whereas its color becomes more intense, i.e., its saturation, hue and color intensity increase, toward the right side.

FIG. 34(b) indicates that the rate at which the information at the central pixel (target pixel) is used in the luminance information generation is increased when the target image portion is judged to be fully achromatic. For instance, when the directional index is [0,0] and BW[i,j]="z", expression (150) is used and when the directional index is [0,0] and BW[i,j]≠"z", expression (151) is used in the seventh embodiment.

FIG. 34(c) indicates that either the different color similarity factors or the same color similarity factors are selectively used in the similarity direction judgment depending upon the results of the color evaluation in the sixth through ninth embodiments. If the results of the color evaluation indicate an achromatic color, the different color similarity factors are used, whereas if the results indicate a chromatic image portion, the same color similarity factors are used.

FIG. 34(d) indicates that either the wide-range low-pass filter or the narrow range low-pass filter is selectively used in the color difference correction based upon the results of the color evaluation.

It is to be noted that while an explanation is given above in reference to the embodiments on an example in which an image in the RGB colorimetric system is converted to an image (in the GCbCr colorimetric system or the YCbCr colorimetric system) constituted of color differences (chrominance) and luminance information, the present invention is not limited to this example. It may instead be adopted to convert an image expressed in another colorimetric system to an image constituted of color differences and luminance information as well. In addition, it may be adopted to convert an image in the RGB colorimetric system through interpolation processing without switching into another colorimetric system.

While an explanation is given above in reference to the embodiments on an example in which the present invention is adopted in conjunction with the RGB colorimetric system with pixels arranged in a Bayer array, the present invention is not limited to this example and it may be adopted in combination with color filters arranged in another type of array.

Furthermore, the specific expressions used in the similarity judgment in the individual embodiments do not necessarily restrict the mode of implementation. In other words, the similarity judgment may be executed by using other appropriate expressions. The specific expressions used in the luminance information calculation in the individual embodiments do not necessarily restrict the mode of implementation either. In other words, the luminance information generation may be executed by using other appropriate expressions.

While a low-pass filter (see FIGS. 24 and 33) is used in a color difference correction and a band pass filter (see FIG. 30) is used for edge enhancement in the embodiments described above, the present invention is not limited to these details and it may be adopted in conjunction with a low-pass filter and a band pass filter assuming different structures.

While the processing is executed in units of individual target areas constituting the image data in the embodiments described above, the present invention is not limited to this example. For instance, the present invention may be adopted in processing executed in units of single pixels or individual pixel groups each constituted of several pixels, or in processing executed over an entire image.

In addition, while the present invention is adopted in an electronic camera in the embodiments described above, the present invention is not limited to this example. It may instead be adopted in a video camera that captures dynamic or moving images or a personal computer or a portable telephone mounted with an image-capturing sensor. In other words, the present invention may be adopted in all types of apparatuses that generate color image data by employing an image-capturing sensor.

Figure 35:
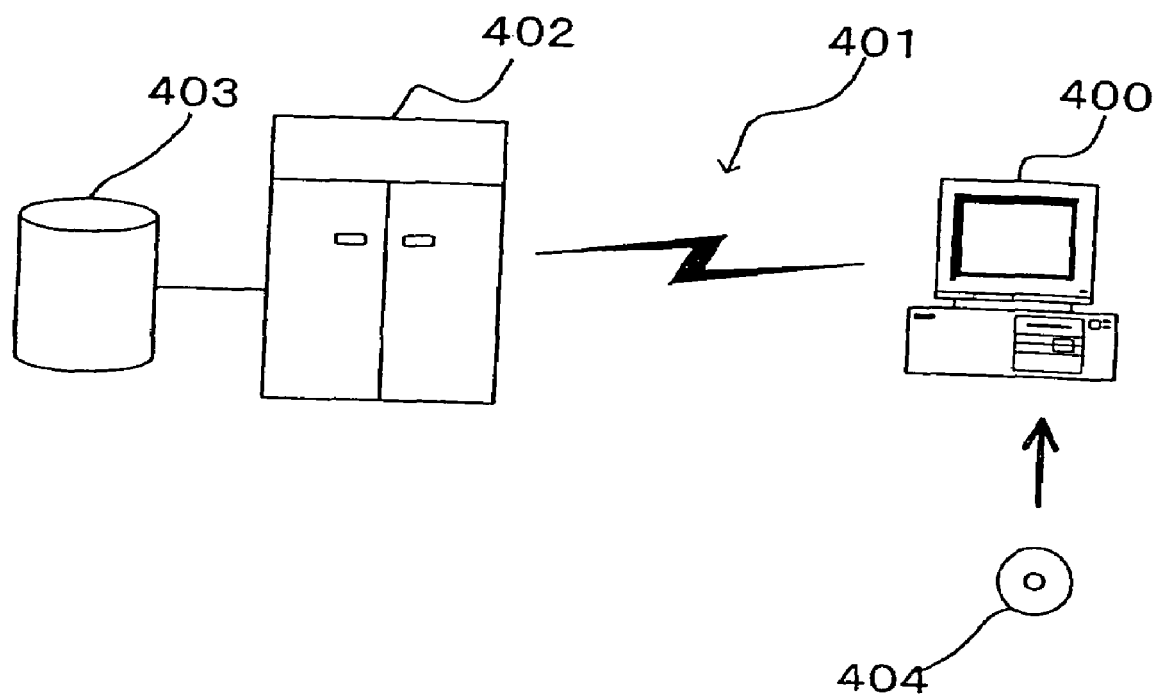

When the present invention is adopted in a personal computer or the like, the program that executes the processing described above may be provided in a recording medium such as a CD-ROM or through a data signal on the Internet or the like. FIG. 35 shows how this may be achieved. A personal computer 400 receives the program via a CD-ROM 404. The personal computer 400 can be connected to a communication line 401. A computer 402 is a server that provides the program stored in a recording medium such as a hard disk 403. The communication line 401 may be a communication line used for an Internet communication, personal computer communication or the like, or it maybe a dedicated communication line. The computer 402 reads out the program from the hard disk 403 and transmits the program to the personal computer 400 via the communication line 401. In other words, it transmits the program via the communication line 401 as a data signal on a carrier wave. Thus, the program can be provided as a computer-readable computer program product adopting any of various modes such as a recording medium and a carrier wave.

The invention claimed is:

1. An image processing method for converting a first image that is expressed in a colorimetric system made up of a plurality of color components and comprises a plurality of pixels each having color information corresponding to one of the color components into a second image that comprises a plurality of pixels each having at least a common type of color information, comprising:
   a color judgment step that includes a color difference information generation step in which color difference information is generated for a processing target pixel in the second image by using color information in the first image through one of at least three different methods and a color evaluation step in which a color evaluation is individually executed for each of processing target pixels in the second image by using the color difference information; and
   an image conversion step in which the first image is converted to the second image based upon results of the color evaluation executed in the color judgment step.

2. An image processing method according to claim 1, wherein:
   the color judgment step further includes a similarity factor calculation step in which similarity factors corresponding to at least two directions are calculated for the processing target pixel in the second image by using the color information in the first image and a similarity judgment step in which a level of similarity manifesting along each direction is determined to be one of at least three levels based upon the similarity factors; and
   in the color difference information generation step, the color difference information is generated by using the color information in the first image through one of at least the three methods each corresponding to specific judgment results obtained in the similarity judgment step.

3. An image processing method according to claim 1, wherein:
   the image conversion step includes
   1) a similarity factor calculation step in which different color similarity factors each constituted of color information corresponding to different color components and same color similarity factors each constituted of color information corresponding to a single color component are calculated along at least two directions for the processing target pixel by using the color information in the first image, and similarity factors are obtained by selectively using either the different color similarity factors or the same color similarity factors based upon the results of the color evaluation;
   2) a similarity judgment step in which levels of similarity manifesting along the individual directions are judged based upon the similarity factors; and
   3) a second image generation step in which color information for the second image is generated by using the color information in the first image based upon judgment results obtained in the similarity judgment step.

4. An image processing method according to claim 1, wherein:
   the image conversion step includes
   1) a similarity factor calculation step in which different color similarity factors each constituted of color information corresponding to different color components and same color similarity factors each constituted of color information corresponding to a single color component are calculated along at least two directions for the processing target pixel by using the color information in the first image and similarity factors are calculated through weighted additions of the different color similarity factors and the same color similarity factors executed by varying a weighting ratio thereof based upon the results of the color evaluation;
   2) a similarity judgment step in which levels of similarity manifesting along the individual directions are judged based upon the similarity factors; and
   3) a second image generation step in which color information for the second image is generated by using the color information in the first image based upon judgment results obtained in the similarity judgment step.

5. An image processing method according to claim 1, wherein:
   the image conversion step includes a second image generation step in which color information for the second image is generated by using color information present at a pixel in the first image corresponding to the processing target pixel and color information present at nearby pixels in the first image with a make-up ratio of the color information adjusted in conformance to the results of the color evaluation.

6. An image processing method according to claim 1, wherein:
   the image conversion step includes
   1) a second image generation step in which color difference information for the second image is generated by using the color information in the first image; and
   2) a color difference information correction step in which the color difference information for the second image is corrected based upon the results of the color evaluation.

7. An image processing method according to claim 1, wherein:
   1) in color difference information generation step executed during the color judgment step, a plurality of types of color difference information are generated for a single processing target pixel; and
   2) in the color evaluation step executed during the color judgment step, the color evaluation is executed by taking into consideration a new type of color difference information generated through a combination of the plurality of types of color difference information.

8. An image processing method according to claim 2, wherein:
in the similarity factor calculation step executed during the color judgment step, different color similarity factors each constituted of color information corresponding to different color components are calculated as similarity factors.

9. An image processing method according to claim 1, wherein:
in the color evaluation step executed during the color judgment step, the color evaluation is executed by incorporating color difference information generated for nearby pixels through the color difference information generation step with the color difference information generated for the processing target pixel.

10. An image processing method according to claim 3, wherein:
in the similarity factor calculation step executed during the image conversion step, the different color similarity factors are mainly used as the similarity factors when a saturation level is judged to be low in the color evaluation, and the same color similarity factors are mainly used as the similarity factors if the saturation level is judged to be high in the color evaluation.

11. An image processing method according to claim 5, wherein:
in the second image generation step executed during the image conversion step, the make-up ratio of the color information present at the pixel in the first image corresponding to the processing target pixel is raised if a saturation level is judged to be low in the color evaluation.

12. An image processing method according to claim 5, wherein:
the image conversion step includes prior to the second image generation step
1) a similarity factor calculation step in which similarity factors along at least two directions are calculated for the processing target pixel by using the color information in the first image, and
2) a similarity judgment step in which levels of similarity manifesting along the individual directions are judged based upon the similarity factors for the processing target pixel; and
the make-up ratio is adjusted based upon the results of the color evaluation only if judgment results obtained through the similarity judgment step indicate substantially equal levels of similarity manifesting along the individual directions.

13. An image processing method according to claim 6, wherein:
in the color difference information correction step executed during the image conversion step, wide range filter processing is executed on the color difference information for the second image when a saturation level is judged to be low in the color evaluation, and narrow range filter processing is executed on the color difference information for the second image when the saturation level is judged to be high in the color evaluation.

14. An image processing method according to claim 1, wherein:
in the color evaluation step executed during the color judgment step, the color difference information is corrected and the color evaluation is executed by using the corrected color difference information.

15. An image processing method according to claim 14, wherein:
in the color evaluation step executed during the color judgment step, low-pass filter processing is executed to correct the color difference information.

16. An image processing method according to claim 1, wherein:
the color judgment step includes after the color evaluation step
1) a color difference information correction step in which the color difference information is corrected based upon the results of the color evaluation, and
2) a color re-evaluation step in which a color evaluation is re-executed in units of individual pixels by using the color difference information having been corrected through the color difference information correction step; and
the first image is converted to the second image based upon results of the color evaluation executed in the color re-evaluation step.

17. An image processing method according to claim 16, wherein:
the color judgment step includes prior to the color difference information correction step
1) a luminance information calculation step in which luminance information is calculated by using the color information in the first image; and
2) a luminance evaluation step in which a luminance evaluation is executed in units of individual pixels by using the luminance information; and
in the color difference information correction step, the color difference information is corrected based upon the results of the color evaluation executed in the color re-evaluation step and results of the luminance evaluation executed in the luminance evaluation step.

18. An image processing method according to claim 16, wherein:
in the color difference information correction step executed during the color judgment step, median filter processing is executed on the color difference information.

19. An image processing method for converting a first image that is expressed in a colorimetric system made up of a plurality of color components and comprises a plurality of pixels each having color information corresponding to one of the color components into a second image that comprises a plurality of pixels each having a plurality of types of color information, comprising:
an image acquisition step in which the first image is obtained;
a color difference information generation step in which color difference information is generated in correspondence to positions of the pixels constituting the second image based upon color information corresponding to the color components of the obtained first image;
a color evaluation step in which a color evaluation is executed in units of individual pixels by using the generated color difference information for the second image;
a luminance information generation step in which luminance information is generated in correspondence to the positions of the pixels constituting the second image based upon results of the color evaluation executed in units of the individual pixels of the second image; and
an output step in which the second image is output by using the color difference information generated in the color difference information generation step and the luminance information generated in the luminance information generation step.

20. An image processing method according to claim 19, wherein:
the color difference information at the position of a given pixel of the second image comprises a plurality of types of color difference information; and
in the color evaluation step, the color evaluation is executed by taking into consideration a new type of color difference information generated through a combination of the plurality of types of color difference information.

21. An image processing method according to claim 20, wherein:
the first image is expressed in a colorimetric system that is made up of a first color component, a second color component and a third color component, with pixels corresponding to the first color component set with a higher pixel density than pixels corresponding to the second color component or pixels corresponding to the third color component;
the plurality of types of color difference information include first color difference information comprising a difference between color information corresponding to the first color component and color information corresponding to the second color component and second color difference information comprising a difference between the color information corresponding to the first color component and color information corresponding to the third color information; and
the new type of color difference information comprises a difference between the second color difference information and the third color difference information.

22. An image processing method according to claim 19, wherein:
in the color evaluation step, the generated color difference information for the second image is corrected and the color evaluation is executed by using the corrected color difference information.

23. An image processing method according to claim 22, wherein:
in the color evaluation step, the generated color difference information for the second image is corrected through low-pass filter processing.

24. An image processing method according to claim 19, further comprising:
a similarity factor calculation step executed before the luminance information generation step, in which different color similarity factors indicating similarity manifesting between a pixel of the first image corresponding to a pixel of the second image and nearby pixels along at least two directions are calculated by using color information corresponding to different color components in a local area containing the pixel and same color similarity factors indicating similarity manifesting between the pixel and nearby pixels along at least the two directions are calculated by using color information corresponding to a single color component in the local area containing the pixel; and
a similarity judgment step executed before the luminance information generation step and after the color evaluation step, in which levels of similarity manifesting along at least the two directions between the pixel of the first image corresponding to the pixel of the second image and the nearby pixels are judged by selectively using either the different color similarity factors or the same color similarity factors calculated in the similarity factor calculation step based upon the results of the color evaluation, wherein:

in the luminance information generation step, the luminance information is generated in correspondence to the position of the pixel of the second image based upon judgment results obtained in the similarity judgment step.

25. An image processing method according to claim 19, wherein:
the plurality of pixels of the first image and the plurality of pixels of the second image correspond to each other in a positional arrangement.

26. An image processing method according to claim 19, wherein:
in the luminance information generation step, the luminance information is generated in correspondence to the position of a pixel of the second image by using color information at a pixel of the first image corresponding to the pixel of the second image and color information present at nearby pixels of the first image, and a make-up ratio of the color information present at the pixel of the first image corresponding to the pixel of the second image and the color information present at nearby pixels of the first image is adjusted based upon the results of the color evaluation executed in units of individual pixels constituting the second image.

27. An image processing method according to claim 19, further comprising:
a similarity judgment step executed before the color difference information generation step, in which levels of similarity manifesting between a pixel of the first image corresponding to a pixel of the second image and nearby pixels of the first image along at least two directions are judged by using color information present in a local area containing the pixel of the first image, wherein:
in the color difference information generation step, color difference information is generated in correspondence to a position of the pixel of the second image based upon judgment results obtained through the similarity judgment step.

28. An image processing method according to claim 27, wherein:
in the similarity judgment step, levels of similarity manifesting between the pixel of the first image corresponding to the pixel of the second image and the nearby pixels of the first image along at least two directions are judged by using color information corresponding to different color components present in the local area containing the pixel of the first image.

29. An image processing method for converting a first image that is expressed in a colorimetric system made up of a plurality of color components and comprises a plurality of pixels each having color information corresponding to at least one of the color components into a second image that comprises a plurality of pixels each having at least a common type of color information that is not present in the first image, comprising:
1) a color difference information generation step in which color difference information is generated by using color information in the first image;
2) a color evaluation step in which a color evaluation is executed in units of individual pixels by using the color difference information;
3) a color difference information correction step in which the color difference information is corrected through a single type of correction selected from a plurality of types of correction based upon results of the color evaluation executed in the color evaluation step; and 4) an output step in which the second image is output by using the corrected color difference information, all executed for a processing target pixel in the second image.

30. An image processing method according to claim 29, wherein:

the plurality of types of correction include a first correction through which the color difference information that has been generated is corrected through wide-range low-pass filter processing and a second correction through which the color difference information that has been generated is corrected through narrow range low-pass filter processing; and in the color difference information correction step, the first correction is selected if the saturation level is judged to be low in the color evaluation and the second correction is selected if the saturation level is judged to be high in the color evaluation.

31. An image processing method according to claim 29, wherein:

the plurality of types of correction include a first correction through which the color difference information that has been generated is corrected through wide-range median filter processing and a second correction through which the color difference information that has been generated is corrected through narrow-range median filter processing; and in the color difference information correction step, the first correction is selected if a saturation level is judged to be low in the color evaluation and the second correction is selected if the saturation level is judged to be high in the color evaluation.

32. An image processing method according to claim 29, wherein:

the color difference information corresponding to a position of a given pixel of the second image comprises a plurality of types of color difference information; and in the color evaluation step, the color evaluation is executed by taking into consideration a new type of color difference information generated through a combination of the plurality of types of color difference information.

33. An image processing method according to claim 32, wherein:

the first image is expressed in a colorimetric system that is made up of a first color component, a second color component and a third color component, with pixels corresponding to the first color component set with a higher pixel density than pixels corresponding to the second color component or pixels corresponding to the third color component;

the plurality of types of color difference information include first color difference information comprising a difference between color information corresponding to the first color component and color information corresponding to the second color component and second color difference information comprising a difference between the color information corresponding to the first color component and color information corresponding to the third color information; and the new type of color difference information comprises a difference between the second color difference information and the third color difference information.

34. An image processing method according to claim 29, wherein:

in the color evaluation step, the color evaluation is executed by incorporating color difference information generated for nearby pixels through the color difference information generation step with the color difference information generated for the processing target pixel.

35. An image processing method according to claim 29, wherein:

in the color evaluation step, the color difference information is corrected and the color evaluation is executed by using the corrected color difference information.

36. An image processing method according to claim 35, wherein:

in the color evaluation step, low-pass filter processing is executed to correct the color difference information.

37. An image processing method according to claim 36, wherein:

the low-pass filter is a wide-range low-pass filter.

38. An image processing method according to claim 29, further comprising:

a similarity judgment step executed before the color difference information generation step, in which levels of similarity manifesting between a pixel of the first image corresponding to a pixel of the second image and nearby pixels of the first image along at least two directions are judged by using color information present in a local area containing the pixel of the first image, wherein:

in the color difference information generation step, color difference information is generated in correspondence to a position of the pixel of the second image based upon judgment results obtained through the similarity judgment step.

39. An image processing method according to claim 38, wherein:

1) in the similarity judgment step, the levels of similarity manifesting along the individual directions are each judged to be one of at least three different levels; and 2) in the color difference information generation step, the color difference information is generated by using the color information in the first image through one of at least three different methods each corresponding to specific judgment results obtained in the similarity judgment step.

40. An image processing method for converting a first image that is expressed in a colorimetric system made up of a plurality of color components and comprises a plurality of pixels each having color information corresponding to at least one of the color components into a second image that comprises a plurality of pixels each having at least a common type of color information that is not present in the first image, comprising:

1) a luminance information generation step in which luminance information is generated by using color information in the first image;

2) a luminance evaluation step in which a luminance evaluation is executed in units of individual pixels by using the luminance information;

3) a second image generation step in which color information for the second image is generated by using the color information of the first image; and 4) a second image correction step in which the color information for the second image is corrected based upon results of the luminance evaluation executed in units of the individual pixels of the second image;

all executed for a processing target pixel of the second image.

41. An image processing method according to claim 40, wherein:

in the luminance evaluation step, the luminance evaluation is executed by calculating a maximum value among values indicated in the luminance information of a plurality of pixels present within a local area containing the processing target pixel and a value representing a variance of the values indicated by the luminance information.

42. An image processing method according to claim 41, wherein:
1) in the luminance evaluation step, one of two decisions that are a decision that a condition in which the maximum value and the variance value of the values indicated by the luminance information are each equal to or greater than a predetermined value is satisfied and a decision that the condition is not satisfied, is made; and
2) in the second image correction step, the color information for the second image is corrected through one of two different types of correction selected in conformance to the decision made with regard to the condition, or the color information is corrected only if the condition is satisfied.

43. An image processing method according to claim 42, wherein:
in the second image correction step, wide range median filter processing is executed if the condition is determined to be satisfied in the luminance evaluation and narrow-range median filter processing is executed if the condition is determined not to be satisfied in the luminance evaluation, or median filter processing is executed only if the condition is determined to be satisfied.

44. A computer-readable recording medium on which is stored an image processing program used to execute the steps of an image processing method according to claim 1 on a computer.

45. A computer-readable recording medium on which is stored an image processing program used to execute the steps of an image processing method according to claim 19 on a computer.

46. A computer-readable recording medium on which is stored an image processing program used to execute the steps of an image processing method according to claim 29 on a computer.

47. A computer-readable recording medium on which is stored an image processing program used to execute the steps of an image processing method according to claim 40 on a computer.

* * * * *